United States Patent
Hatanaka et al.

(10) Patent No.: US 10,890,702 B2
(45) Date of Patent: Jan. 12, 2021

(54) METHOD FOR PRODUCING LAMINATED BODY

(71) Applicant: SUMITOMO CHEMICAL COMPANY, LIMITED, Tokyo (JP)

(72) Inventors: Nobuyuki Hatanaka, Osaka (JP);
Tadahiro Kobayashi, Osaka (JP);
Akira Yokota, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 662 days.

(21) Appl. No.: 14/478,515

(22) Filed: Sep. 5, 2014

(65) Prior Publication Data
US 2015/0070764 A1 Mar. 12, 2015

(30) Foreign Application Priority Data

Sep. 10, 2013 (JP) ................................ 2013-187031
Jan. 31, 2014 (JP) ................................ 2014-017296

(51) Int. Cl.
*G02B 5/30* (2006.01)
*B32B 27/00* (2006.01)
(Continued)

(52) U.S. Cl.
CPC ............ *G02B 5/3041* (2013.01); *B32B 27/00* (2013.01); *G02B 5/3083* (2013.01);
(Continued)

(58) Field of Classification Search
CPC ... G02B 5/4042; G02B 5/3083; G02B 5/3041
(Continued)

(56) References Cited

U.S. PATENT DOCUMENTS 5,730,903 A 3/1998 Okazaki
5,780,629 A 7/1998 Etzbach et al.
(Continued)

FOREIGN PATENT DOCUMENTS

JP 50-83482 7/1975
JP 2-113920 A 4/1990
(Continued)

OTHER PUBLICATIONS

"Liquid Crystal Device Handbook", Chapter 3, 4-3, Chiral Agents for TN and STN, p. 199, edited by Japan Society for the Promotion of Science, 142 Committee, 1989.
(Continued)

*Primary Examiner* — Ricky D Shafer
(74) *Attorney, Agent, or Firm* — Sughrue Mion, PLLC

(57) ABSTRACT

Method for producing a thin optical laminated body. This method is a method for producing a laminated body including a polarization layer, a λ/2 layer, a λ/4 layer, a positive C layer, and a transfer adhesive layer, the laminated body including the polarization layer, the λ/2 layer and the λ/4 layer in this member-described order; including the positive C layer between the polarization layer and the λ/4 layer, or at the side of the λ/4 layer that is opposite to the λ/2-layer-arranged side of the λ/4 layer; and including the transfer adhesive layer between the polarization layer and the λ/4 layer or positive C layer, the method including the step of bonding a bonding body including a substrate and the transfer adhesive layer to an adherend through the transfer adhesive layer, and peeling the substrate from the resultant.

1 Claim, 5 Drawing Sheets

(51) Int. Cl.
  *B32B 38/10* (2006.01)
  *B32B 37/12* (2006.01)
(52) U.S. Cl.
  CPC ........... *B32B 37/1284* (2013.01); *B32B 38/10* (2013.01); *B32B 2307/40* (2013.01)
(58) Field of Classification Search
  USPC .............................. 359/489.07, 489.16, 900
  See application file for complete search history.

(56) References Cited

U.S. PATENT DOCUMENTS

| | | | |
|---|---|---|---|
| 6,217,792 B1 | 4/2001 | Parri et al. | |
| 6,400,433 B1 | 6/2002 | Arakawa et al. | |
| 6,723,395 B2 | 4/2004 | May et al. | |
| 7,317,498 B2 * | 1/2008 | Hara | G02B 5/3041 349/102 |
| 7,443,585 B2 * | 10/2008 | Hara | G02B 5/3016 349/18 |
| 7,522,238 B2 | 4/2009 | Matsuoka | |
| 8,383,212 B2 | 2/2013 | Obata et al. | |
| 8,545,970 B2 | 10/2013 | Doi et al. | |
| 2002/0022093 A1 * | 2/2002 | Kuntz | C09B 67/0098 428/29 |
| 2003/0090012 A1 * | 5/2003 | Allen | G02B 5/3016 264/1.31 |
| 2004/0032677 A1 * | 2/2004 | Su Yu et al. | G02B 5/3016 359/883 |
| 2005/0269020 A1 | 12/2005 | Matsuoka | |
| 2006/0103796 A1 | 5/2006 | Kawamoto et al. | |
| 2007/0056682 A1 * | 3/2007 | Yamada | G02B 5/3083 156/249 |
| 2009/0040434 A1 * | 2/2009 | Kawamoto | G02B 5/3016 349/96 |
| 2009/0237601 A1 | 9/2009 | Shutou et al. | |
| 2010/0201924 A1 * | 8/2010 | Wu | G02F 1/133555 349/102 |
| 2011/0222155 A1 * | 9/2011 | Sakai | G02B 5/3083 359/489.07 |
| 2012/0008224 A1 | 1/2012 | Uchida | |
| 2013/0163081 A1 * | 6/2013 | Cho | G02B 5/3025 359/485.03 |
| 2016/0154157 A1 * | 6/2016 | Cho | G02B 1/11 359/489.07 |

FOREIGN PATENT DOCUMENTS

| | | |
|---|---|---|
| JP | 6-34976 A | 2/1994 |
| JP | 7-30637 A | 1/1995 |
| JP | 7-258170 A | 10/1995 |
| JP | 7-309807 A | 11/1995 |
| JP | 8-231470 A | 9/1996 |
| JP | 9-506088 A | 6/1997 |
| JP | 10-68816 A | 3/1998 |
| JP | 10-90521 A | 4/1998 |
| JP | 2000-206331 A | 7/2000 |
| JP | 2000-515496 A | 11/2000 |
| JP | 2001-4837 A | 1/2001 |
| JP | 2001-21720 A | 1/2001 |
| JP | 2003-137887 A | 5/2003 |
| JP | 2004-117522 A | 4/2004 |
| JP | 2004-138697 A | 5/2004 |
| JP | 2004-226752 A | 8/2004 |
| JP | 2004-226753 A | 8/2004 |
| JP | 2004-226754 A | 8/2004 |
| JP | 2004-226755 A | 8/2004 |
| JP | 2004-226756 A | 8/2004 |
| JP | 2004-226757 A | 8/2004 |
| JP | 2004-226758 A | 8/2004 |
| JP | 2004-226759 A | 8/2004 |
| JP | 2004-226760 A | 8/2004 |
| JP | 2004-226761 A | 8/2004 |
| JP | 2004-226762 A | 8/2004 |
| JP | 2004-226763 A | 8/2004 |
| JP | 2004-226764 A | 8/2004 |
| JP | 2004-226765 A | 8/2004 |
| JP | 2004-309771 A | 11/2004 |
| JP | 2004-309772 A | 11/2004 |
| JP | 2005-70096 A | 3/2005 |
| JP | 2005-309290 A | 11/2005 |
| JP | 2005-338215 A | 12/2005 |
| JP | 2006-163343 A | 6/2006 |
| JP | 2007-140443 A | 6/2007 |
| JP | 2007-169178 A | 7/2007 |
| JP | 2007-176870 A | 7/2007 |
| JP | 2007-188033 A | 7/2007 |
| JP | 2007-269639 A | 10/2007 |
| JP | 2007-269640 A | 10/2007 |
| JP | 2008-129465 A | 6/2008 |
| JP | 2008-183812 A | 8/2008 |
| JP | 2009-53292 A | 3/2009 |
| JP | 2010-270108 A | 12/2010 |
| JP | 2011-6360 A | 1/2011 |
| JP | 2011-207765 A | 10/2011 |
| JP | 2011-242743 A | 12/2011 |
| JP | 2012-33249 A | 2/2012 |
| JP | 2015-40904 A | 3/2015 |
| JP | 2015-40905 A | 3/2015 |
| WO | 03/100115 A1 | 12/2003 |
| WO | 2004/029679 A1 | 4/2004 |

OTHER PUBLICATIONS

"Handbook of Liquid Crystals", Chapter 3.8.6. Network (Fully Cross-Linked), 6.5.1. Liquid Crystal Material, b. Polymerizable Nematic Liquid Crystal Material, edited by Ekisho Binran Henshu Iinkai, Maruzen, Oct. 30, 2000.

Communication dated Aug. 1, 2017 issued by the Japanese Patent Office in counterpart application No. 2014-017296.

Communication dated Mar. 31, 2020 issued by the Korean Patent Office in counterpart Korean Application No. 10-2014-0117427.

Office Action dated Feb. 26, 2018 in corresponding Japanese Patent Application No. 2014-017296 with machine-generated English translation.

* cited by examiner

METHOD FOR PRODUCING LAMINATED BODY

BACKGROUND OF THE INVENTION

Field of the Invention

The present invention relates to a method for producing a laminated body.

Description of the Related Art

International publication WO 2003/100115 describes a circularly polarizing plate including a λ/4 layer, a λ/2 layer and a polarization layer.

In conventional organic EL display devices each containing a circularly polarizing plate, light leakage may be generated in the oblique visual field thereof when the display devices show a black display.

SUMMARY OF THE INVENTION

The present invention is as follows:

[1] A method for producing a laminated body including a polarization layer, a λ/2 layer, a λ/4 layer, a positive C layer, and a transfer adhesive layer;

the laminated body being a laminated body:
including the polarization layer, the λ/2 layer and the λ/4 layer in this member-described order,
including the positive C layer between the polarization layer and the λ/4 layer, or at the side of the λ/4 layer that is opposite to the λ/2-layer-arranged side of the λ/4 layer, and
including the transfer adhesive layer between the polarization layer, and the λ/4 layer or positive C layer; and
the method including the step of bonding a bonding body including a substrate and the transfer adhesive layer to an adherend through the transfer adhesive layer, and peeling the substrate from the resultant.

[2] The method according to item [1] for producing the laminated body including the polarization layer, the transfer adhesive layer, the positive C layer, the λ/2 layer, and the λ/4 layer in this member-described order;
the bonding body being:
a ready-prepared laminated body including the transfer adhesive layer, the positive C layer, and the substrate in this member-described order,
a ready-prepared laminated body including the transfer adhesive layer, the positive C layer, the λ/2 layer, and the substrate in this member-described order, or
a ready-prepared laminated body including the transfer adhesive layer, the positive C layer, the λ/2 layer, the λ/4 layer, and the substrate in this member-described order;
the adherend being an adherend including the polarization layer; and
the method including the step of bonding the transfer adhesive layer side outer surface of the bonding body to the polarization layer side outer surface of the adherend through the transfer adhesive layer, and peeling the substrate from the resultant.

[3] The method according to item [1] for producing the laminated body including the polarization layer, the transfer adhesive layer, the λ/2 layer, the positive C layer, and the λ/4 layer in this member-described order;
the bonding body being:
a ready-prepared laminated body including the transfer adhesive layer, the λ/2 layer, and the substrate in this member-described order,
a ready-prepared laminated body including the transfer adhesive layer, the λ/2 layer, the positive C layer, and the substrate in this member-described order, or
a ready-prepared laminated body including the transfer adhesive layer, the λ/2 layer, the positive C layer, the λ/4 layer, and the substrate in this member-described order;
the adherend being an adherend including the polarization layer; and
the method including the step of bonding the transfer adhesive layer side outer surface of the bonding body to the polarization layer side outer surface of the adherend through the transfer adhesive layer, and peeling the substrate from the resultant.

[4] The method according to item [1] for producing the laminated body including the polarization layer, the transfer adhesive layer, the λ/2 layer, the λ/4 layer, and the positive C layer in this member-described order;
the bonding body being:
a ready-prepared laminated body including the transfer adhesive layer, the λ/2 layer, and the substrate in this member-described order,
a ready-prepared laminated body including the transfer adhesive layer, the λ/2 layer, the λ/4 layer, and the substrate in this member-described order, or
a ready-prepared laminated body including the transfer adhesive layer, the λ/2 layer, the λ/4 layer, the positive C layer, and the substrate in this member-described order;
the adherend being an adherend including the polarization layer; and
the method including the step of bonding the transfer adhesive layer side outer surface of the bonding body to the polarization layer side outer surface of the adherend through the transfer adhesive layer, and peeling the substrate from the resultant.

[5] The method according to item [1] for producing the laminated body including the polarization layer, the λ/2 layer, the λ/4 layer, the transfer adhesive layer, and the positive C layer in this member-described order;
the bonding body being a ready-prepared laminated body including the transfer adhesive layer, the positive C layer, and the substrate in this member-described order;
the adherend being:
an adherend including the λ/4 layer,
a ready-prepared laminated body including the λ/4 layer and the λ/2 layer in this member-described order, or
a ready-prepared laminated body including the λ/4 layer, the λ/2 layer and the polarization layer in this member-described order; and
the method including the step of bonding the transfer adhesive layer side outer surface of the bonding body to the λ/4 layer side outer surface of the adherend through the transfer adhesive layer, and peeling the substrate from the resultant.

[6] The method according to item [1] for producing the laminated body including the polarization layer, the λ/2 layer, the positive C layer, the transfer adhesive layer, and the λ/4 layer in this member-described order;
the bonding body being a ready-prepared laminated body including the transfer adhesive layer, the λ/4 layer, and the substrate in this member-described order;
the adherend being:
an adherend including the positive C layer,
a ready-prepared laminated body including the positive C layer and the λ/2 layer in this member-described order, or
a ready-prepared laminated body including the positive C layer, the λ/2 layer, and the polarization layer in this member-described order; and
the method including the step of bonding the transfer adhesive layer side outer surface of the bonding body to the positive C layer side outer surface of the adherend through the transfer adhesive layer, and peeling the substrate from the resultant.

[7] The method according to item [1] for producing the laminated body including the polarization layer, the positive C layer, the λ/2 layer, the transfer adhesive layer, and the λ/4 layer in this member-described order;

the bonding body being a ready-prepared laminated body including the transfer adhesive layer, the λ/4 layer, and the substrate in this member-described order;

the adherend being:
an adherend including the λ/2 layer,
a ready-prepared laminated body including the λ/2 layer and the positive C layer in this member-described order, or
a ready-prepared laminated body including the λ/2 layer, the positive C layer, and the polarization layer in this member-described order; and the method including the step of bonding the transfer adhesive layer side outer surface of the bonding body to the λ/2 layer side outer surface of the adherend through the transfer adhesive layer, and peeling the substrate from the resultant.

[8] The method according to item [1] for producing the laminated body including the polarization layer, the λ/2 layer, the transfer adhesive layer, the λ/4 layer, and the positive C layer in this member-described order;

the bonding body being:
a bonding body including the transfer adhesive layer, the λ/4 layer, and the substrate, or
a bonding body including the transfer adhesive layer, the λ/4 layer, the positive C layer, and the substrate in this member-described order;

the adherend being:
an adherend including the λ/2 layer, or
a ready-prepared laminated body including the λ/2 layer and the polarization layer in this member-described order; and the method including the step of bonding the transfer adhesive layer side outer surface of the bonding body to the λ/2 layer side outer surface of the adherend through the transfer adhesive layer, and peeling the substrate from the resultant.

[9] The method according to item [1] for producing the laminated body including the polarization layer, the λ/2 layer, the transfer adhesive layer, the positive C layer, and the λ/4 layer in this member-described order;

the bonding body being:
a bonding body including the transfer adhesive layer, the positive C layer, and the substrate, or
a bonding body including the transfer adhesive layer, the positive C layer, the λ/4 layer, and the substrate in this member-described order;

the adherend being:
an adherend including the λ/2 layer, or
a ready-prepared laminated body including the λ/2 layer and the polarization layer in this member-described order; and the method including the step of bonding the transfer adhesive layer side outer surface of the bonding body to the λ/2 layer side outer surface of the adherend through the transfer adhesive layer, and peeling the substrate from the resultant.

[10] The method according to item [1] for producing the laminated body including the polarization layer, the positive C layer, the transfer adhesive layer, the λ/2 layer, and the λ/4 layer in this member-described order;

the bonding body being:
a bonding body including the transfer adhesive layer, the λ/2 layer, and the substrate, or
a bonding body including the transfer adhesive layer, the λ/2 layer, the λ/4 layer, and the substrate in this member-described order;

the adherend being:
an adherend including the positive C layer, or
a ready-prepared laminated body including the positive C layer and the polarization layer in this member-described order; and the method including the step of bonding the transfer adhesive layer side outer surface of the bonding body to the positive C layer side outer surface of the adherend through the transfer adhesive layer, and peeling the substrate from the resultant.

[11] A laminated body, including a polarization layer, a λ/2 layer, a λ/4 layer, a positive C layer, and a transfer adhesive layer; and including the polarization layer, the λ/2 layer and the λ/4 layer in this member-described order, including the positive C layer between the polarization layer and the λ/4 layer, or at the side of the λ/4 layer that is opposite to the λ/2-layer-arranged side of the λ/4 layer, and including the transfer adhesive layer between the polarization layer, and the λ/4 layer or positive C layer.

[12] The laminated body according to item [11], including the polarization layer, the transfer adhesive layer, the positive C layer, the λ/2 layer, and the λ/4 layer in this member-described order.

[13] The laminated body according to item [11], including the polarization layer, the transfer adhesive layer, the λ/2 layer, the positive C layer, and the λ/4 layer in this member-described order.

[14] The laminated body according to item [11], including the polarization layer, the transfer adhesive layer, the λ/2 layer, the λ/4 layer, and the positive C layer in this member-described order.

[15] The laminated body according to item [11], including the polarization layer, the λ/2 layer, the λ/4 layer, the transfer adhesive layer, and the positive C layer in this member-described order.

[16] The laminated body according to item [11], including the polarization layer, the λ/2 layer, the positive C layer, the transfer adhesive layer, and the λ/4 layer in this member-described order.

[17] The laminated body according to item [11], including the polarization layer, the positive C layer, the λ/2 layer, the transfer adhesive layer, and the λ/4 layer in this member-described order.

[18] The laminated body according to item [11], including the polarization layer, the λ/2 layer, the transfer adhesive layer, the λ/4 layer, and the positive C layer in this member-described order.

[19] The laminated body according to item [11], including the polarization layer, the λ/2 layer, the transfer adhesive layer, the positive C layer, and the λ/4 layer in this member-described order.

[20] The laminated body according to item [11], including the polarization layer, the positive C layer, the transfer adhesive layer, the λ/2 layer, and the λ/4 layer in this member-described order.

According to the present invention, at the time when an organic EL display device shows a back display, light leakage can be decreased in any oblique viewing field thereof, and further a thin optical laminated body can be produced.

DETAILED DESCRIPTION OF THE PREFERRED EMBODIMENTS

Figure 1:
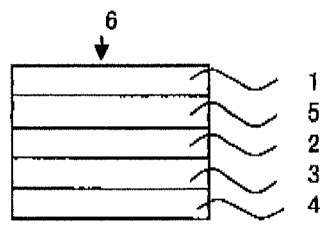
FIG. 1 is a schematic view illustrating a first laminated body yielded by a first production method of the present invention.

The present invention is a method for producing a laminated body including a polarization layer, a $\lambda/2$ layer, a $\lambda/4$ layer, a positive C layer, and a transfer adhesive layer. The laminated body in the method is a laminated body including the polarization layer, the $\lambda/2$ layer and the $\lambda/4$ layer in this member-described order, including the positive C layer between the polarization layer and the $\lambda/4$ layer, or at the side of the $\lambda/4$ layer that is opposite to the $\lambda/2$-layer-arranged side of the $\lambda/4$ layer, and including the transfer adhesive layer between the polarization layer, and the $\lambda/4$ layer or positive C layer. This method includes the step of bonding a bonding body including a substrate and the transfer adhesive layer to an adherend through the transfer adhesive layer, and peeling the substrate from the resultant.

The present invention is also a laminated body including a polarization layer, a $\lambda/2$ layer, a $\lambda/4$ layer, a positive C layer, and a transfer adhesive layer. Furthermore, this laminated body includes the polarization layer, the $\lambda/2$ layer and the $\lambda/4$ layer in this member-described order; includes the positive C layer between the polarization layer and the $\lambda/4$ layer, or at the side of the $\lambda/4$ layer that is opposite to the $\lambda/2$-layer-arranged side of the $\lambda/4$ layer; and includes the transfer adhesive layer between the polarization layer, and the $\lambda/4$ layer or positive C layer.

<Retardation Layer>

Any $\lambda/2$ layer, any $\lambda/4$ layer and any positive C layer are collectively named a retardation layer.

The retardation layer can be formed by applying a retardation-layer-forming composition containing a polymerizable liquid crystal onto a substrate, drying the resultant, orienting the polymerizable liquid crystal, and then polymerizing the liquid crystal.

When a second retardation layer is formed on a first retardation layer, the first retardation layer is usable as a substrate on which the second retardation layer is to be formed. The second retardation layer can be formed by applying a second-retardation-layer-forming composition containing a polymerizable liquid crystal onto the first retardation layer, drying the resultant, orienting the polymerizable liquid crystal, and then polymerizing the liquid crystal.

<Substrate>

When a substrate is included in the laminated body, the substrate is a transparent substrate. When a substrate is transferred to a predetermined member and subsequently removed from the resultant laminated body, the substrate does not need to be a transparent substrate.

The transparent substrate is a substrate having such a transparency that the substrate can transmit light, in particular, visible rays. The transmittance thereof for a light ray having a wavelength of 380 to 780 nm is preferably 80% or more. The substrate may be a translucent resin substrate. Examples of the resin constituting the translucent resin substrate include polyolefins such as polyethylene and polypropylene; cyclic olefin resins such as norbornene-based polymers; polyvinyl alcohol; polyethylene terephthalate; polymethacrylates; polyacrylates; cellulose esters such as triacetylcellulose, diacetylcellulose and cellulose acetate propionate; polyethylene naphthalate; polycarbonates; polysulfones; polyethersulfones; polyetherketones; polyphenylenesulfides; and polyphenylene oxides. From the viewpoint of availability and transparency, preferred are polyethylene terephthalate, polymethacrylates, cellulose esters, cyclic olefin resins, or polycarbonates.

The cellulose esters are each a compound obtained by esterifying hydroxyl groups contained in a cellulose partially or wholly, and are commercially available. A cellulose ester substrate is also commercially available. Examples of the commercially available cellulose ester substrate include products "Fujitac (registered trademark) Film" (manufactured by Fujifilm Corp.); and "KC8UX2M", "KC8UY" and "KC4UY" (manufactured by Konica Minolta Opto, Inc.).

The cyclic olefin resins are commercially available. Examples of the commercially available cyclic olefin resins include products "Topas" ((registered trademark) manufactured by Ticona GmbH (in German)), "Arton" ((registered trademark) manufactured by JSR Corp.), "ZEONOR" ((registered trademark) manufactured by Zeon Corp.), "ZEONEX" ((registered trademark) manufactured by Zeon Corp.), and "Apel" ((registered trademark) manufactured by Mitsui Chemicals, Inc.). A substrate is obtainable by making any one of the cyclic olefin resins into a film form by a known method such as a solvent casting method or a melt-extruding method. A cyclic olefin resin substrate is also commercially available. Examples of the commercially available cyclic olefin resin substrate include products "S Sheena" ((registered trademark) manufactured by Sekisui Chemical Co., Ltd.), "SCA 40" ((registered trademark) manufactured by Sekisui Chemical Co., Ltd.), "ZEONOR FILM" ((registered trademark) manufactured by Optes Inc.), and "Arton Film" ((registered trademark) manufactured by JSR Corp.).

When any one of the cyclic olefin resins is a copolymer made from a cyclic olefin, and a linear olefin or an aromatic compound having a vinyl group, the content by percentage of structural units originating from the cyclic olefin is usually 50% or less by mole, preferably from 15 to 50% by mole of the entire structural units of the copolymer. Examples of the linear olefin include ethylene, and propylene. Examples of the aromatic compound having a vinyl group include styrene, α-methylstyrene, and alkyl-substituted styrenes. When the cyclic olefin resin is a terpolymer made from a cyclic olefin, a linear olefin, and an aromatic compound having a vinyl group, the content by percentage of structural units originating from the linear olefin is usually from 5 to 80% by mole of the entire structural units of the terpolymer and the content by percentage of structural units originating from the aromatic compound having the vinyl group is usually from 5 to 80% by mole of the entire structural units of the terpolymer. The terpolymer has an advantage that in the production thereof, the use amount of the cyclic olefin, which is expensive, can be made relatively small.

When the substrate is included in the laminated body, the substrate is preferably a substrate small in retardation. Examples of the substrate small in retardation include products "Zero Tac" ((registered trademark) manufactured by Konica Minolta Opto, Inc.) and "Z Tac" (manufactured by Fujifilm Corp.), and other cellulose ester substrates each having no retardation. An undrawn cyclic olefin resin substrate is also preferred.

A surface treatment may be applied to the oriented-film-and-retardation-layer formed side outer surface of the substrate before the oriented film is formed over the outer surface, the oriented film and the retardation layer being to be later detailed. Examples of the method for the surface treatment include a method I) of treating a surface of the substrate with corona or plasma in a vacuum or in the atmosphere; a method II) of treating a surface of the substrate with a laser; a method of treating a surface of the substrate with ozone; a method III) of subjecting a surface of the substrate to saponifying treatment or flame treatment; a method IV) of painting a coupling agent onto a surface of the substrate to conduct primer treatment; and a graft polymerization method V) of causing a reactive monomer or a polymer having reactivity to adhere onto a surface of the substrate, and then radiating radial rays, plasma or ultraviolet rays thereto to cause a reaction of the monomer or polymer. Of these examples, the method I) is preferred.

The method of treating a surface of the substrate with corona or plasma is, for example, a method i) of setting the substrate between opposed electrodes under a pressure close to the atmospheric pressure, and then generating corona or plasma to conduct surface treatment of the substrate therewith;

a method ii) of causing a gas to flow into the gap between opposed electrodes, making the gas into plasma between the electrodes, and blowing the plasma-state gas onto the substrate; or a method iii) of generating glow discharge plasma under a low pressure to conduct surface treatment of the substrate therewith.

Of these methods, preferred are the methods i) and ii). Usually, these surface treatments with corona or plasma is conducted in a commercially available surface treatment apparatus.

A hard coat treatment, an antistatic treatment or some other treatment may be applied to the oriented-film-and-retardation-layer not-formed side outer surface of the substrate, the oriented film and the retardation layer being to be later detailed. The substrate may contain an additive such as an ultraviolet absorbent as far as the additive does not affect the performance thereof.

If the thickness of the substrate is too small, the substrate is lowered in strength and likely to be poor in workability. Thus, the thickness is usually from 5 to 300 μm, preferably from 10 to 200 μm.

A retardation property can be given to the substrate by drawing the substrate in a known drawing manner. For example, prepared is a roll in which the substrate is wound on a roll body (substrate-wound member), and then the substrate is continuously unwound from this substrate-wound member. The unwound substrate is carried to a heating furnace. The set temperature of the heating furnace ranges from "a temperature (° C.) close to the glass transition temperature of the substrate" to "the glass transition temperature+100" (° C.), preferably from "a temperature (° C.) close to the glass transition temperature of the substrate" to the glass transition temperature+50" (° C.). When the substrate is drawn into the advancing direction of the substrate or a direction orthogonal to the advancing direction in this heating furnace, monoaxial or biaxial thermal drawing is conducted (as the drawing) in the state of adjusting the carrying direction of the substrate or the tension thereon to incline the substrate into any angle. The draw ratio is usually from 1.1 to 6, preferably from 1.1 to 3.5. The method for drawing the substrate obliquely is not particularly limited as far as the method is a method of inclining the orientation axis continuously into a desired angle. The drawing method may be a known method described in JP-A-50-83482 or JP-A-02-113920. The thickness of the drawn substrate is decided in accordance with the thickness of the substrate before the drawing, and the draw ratio.

The substrate to which a retardation property is given by the drawing can be rendered a λ/2 layer or a λ/4 layer.

<Oriented Film>

An oriented film may be formed on/over the substrate. The oriented film is a film having an orientation regulating force for orienting a polymerizable liquid crystal, which will be detailed later, into a desired direction.

The oriented film is preferably an oriented film having such a solvent resistance that the film is not dissolved by the painting of a composition of the polymerizable liquid crystal onto the film, or some other operation, and having a heat resistance against heating treatment for removing the solvent or orienting the polymerizable liquid crystal. Examples of the oriented film include an oriented film containing an orienting polymer, an optically oriented film, and a groove oriented film having a surface in which an irregularity pattern or plural grooves are formed and oriented.

The thickness of the oriented film is usually from 10 to 10000 nm, preferably from 10 to 1000 nm, more preferably 500 nm or less, even more preferably from 10 to 200 nm.

<Oriented Film Containing Orienting Polymer (=Orienting-Polymer-Containing Oriented Film)>

Examples of the orienting polymer include polyamides and gelatins, which each have amide bonds, polyimides, which each have imide bonds, polyamic acids, which are each a hydrolyzate of a polyimide, polyvinyl alcohol, alkyl-modified polyvinyl alcohol, polyacrylamide, polyoxazole, polyethyleneimine, polystyrene, polyvinyl pyrrolidone, polyacrylic acid, and polyacrylates. Of these examples, preferred is polyvinyl alcohol. Two or more orienting polymers may be used together.

The orienting-polymer-containing oriented film is usually obtained by applying an orienting polymer composition, in which the orienting polymer is dissolved in a solvent, onto the substrate, and then removing the solvent from the resultant workpiece, or by applying the same orienting polymer composition onto the substrate, removing the solvent from the workpiece, and then rubbing the resultant.

Examples of the solvent include water; alcohol solvents such as methanol, ethanol, ethylene glycol, isopropyl alcohol, propylene glycol, methylcellosolve, butylcellosolve, and propylene glycol monomethyl ether; ester solvents such as ethyl acetate, butyl acetate, ethylene glycol methyl ether acetate, γ-butyrolactone, propylene glycol methyl ether acetate, and ethyl lactate; ketone solvents such as acetone, methyl ethyl ketone, cyclopentanone, cyclohexanone, methyl amyl ketone, and methyl isobutyl ketone; aliphatic hydrocarbon solvents such as pentane, hexane and heptane; aromatic hydrocarbon solvents such as toluene, and xylene; nitrile solvents such as acetonitrile; ether solvents such as tetrahydrofuran, and dimethoxyethane; and chlorinated hydrocarbon solvents such as chloroform, and chlorobenzene. Such solvents may be used in any combination of two or more thereof.

The concentration of the orienting polymer in the orienting polymer composition may be any concentration as far as the orienting polymer can be completely dissolved in the solvent. The concentration is preferably from 0.1 to 20%, more preferably from 0.1 to 10% in terms of the concentration of a solid in the (composition) solution. The "solid" means the whole of components obtained by removing the solvent from the orienting polymer composition.

The orienting polymer composition is commercially available. Examples of the commercially available orienting polymer composition include products Sunever ((registered trademark) manufactured by Nissan Chemical Industries, Ltd.), and Optmer ((registered trademark) manufactured by JSR Corp.).

Examples of the method for applying the orienting polymer composition to the substrate include spin coating, extrusion coating, gravure coating, die coating, slit coating, and bar coating methods; an applicator method and other coating or applying methods; printing methods such as flexography; and other known methods. When the retardation layer is produced by a continuous production method in a roll-to-roll manner, which will be detailed later, the method to be adopted for the production is usually a gravure coating or die coating method, or a printing method such as flexography.

Examples of the method for removing the solvent contained in the orienting polymer composition include natural drying, ventilation drying, heat drying, and reduced-pressure drying methods.

In order to supply orientation regulating force onto the oriented film, the oriented film is optionally subjected to rubbing treatment by a rubbing method.

The method for the supply of the orientation regulating force to the oriented film by the rubbing method is, for example, a method of bringing a rubbing-cloth-wound rubbing roll that is being rotated into contact with a film of the orienting polymer that is formed on a surface of the substrate by applying the orienting polymer composition onto the substrate, and annealing the resultant.

Plural regions (patterns) different from each other in liquid crystal orientation direction can be formed by performing masking when the rubbing treatment is conducted.

For the supply of the orientation regulating force to the oriented film, optically orienting treatment is conducted, as required.

<Optically Oriented Film>

Usually, the optically oriented film is obtained by applying, onto the substrate, an optically-oriented-film-forming composition containing a polymer or monomer having an optically reactive group and a solvent, and then radiating polarized light (preferably, polarized ultraviolet rays) to the resultant. The optically oriented film is more preferred (than the oriented film) since the selection of the polarization direction of the radiated polarized light makes it possible to control the direction of the orientation regulating force at will.

The optically reactive group is a group irradiated with light to generate liquid crystal orienting performance. Specifically, the group may be a group related to a photoreaction from which liquid crystal orienting performance originates. Examples of the photoreaction include orientation-inducing or isomerization reaction of a molecule, dimerization reaction, optically crosslinking reaction, and photodecomposition reaction, the reactions being caused by irradiation with light. Particularly preferred is a group related to dimerization reaction, or optically crosslinking reaction since the group is excellent in orienting performance. The optically reactive group is preferably a group having an unsaturated bond, particularly, a double bond. The reactive group is in particular preferably a group having at least one selected from the group consisting of a carbon-carbon double bond (C=C bond), a carbon-nitrogen double bond (C=N bond), a nitrogen-nitrogen double bond (N=N bond), and a carbon-oxygen double bond (C=O bond).

Examples of the optically reactive group having a C=C bond include vinyl, polyene, stilbene, stilbazole, stilbazolium, chalcone, and cinnamoyl groups. Examples of the optically reactive group having a C=N bond include groups each having an aromatic Schiff base, aromatic hydrazone, or some other structure. Examples of the optically reactive group having a N=N bond include azobenzene, azonaphthalene, aromatic heterocyclic azo, bisazo, and formazan groups, and groups each having an azoxybenzene structure. Examples of the optically reactive group having a C=O bond include benzophenone, coumarin, anthraquinone, and maleimide groups. These groups may each have a substituent such as an alkyl, alkoxy, aryl, allyoxy, cyano, alkoxycarbonyl, hydroxyl, sulfonate, or halogenated alkyl group.

Of these examples, preferred are optically reactive groups related to optically dimerization reaction. Cinnamoyl and chalcone groups are preferred since the groups easily give an optically oriented film relatively small in absorbed radiation dose of polarized light necessary for optical orientation, and excellent in thermal stability and aging stability. The optically-reactive-group-having polymer is in particular preferably a polymer having a cinnamoyl group in which the terminal of polymer side chain has a cinnamic acid structure.

By applying the above-mentioned optically-oriented-film-forming composition onto the substrate, an optical orientation inducing layer can be formed on the substrate. Examples of the solvent contained in this composition are equivalent to the examples of the solvent contained in the above-mentioned orienting polymer composition. The solvent is selectable therefrom in accordance with the solubility of the optically-reactive-group-having polymer or monomer.

The content by percentage of the optically-reactive-group-having polymer or monomer in the optically-oriented-film-forming composition is adjustable in accordance with the species of the polymer or monomer, and a target thickness of the optically oriented film, and is preferably at least 0.2% by mass, and is more preferably from 0.3 to 10% by mass. The optically-oriented-film-forming composition may contain a different polymeric material such as polyvinyl alcohol or polyimide, and/or a photosensitizer as far as they do not remarkably damage properties of the optically oriented film to be obtained.

Examples of the method for applying the optically-oriented-film-forming composition onto the substrate are equivalent to the examples of the method for applying the orienting polymer composition onto the substrate. Examples of the method for removing the solvent from the applied optically-oriented-film-forming composition are equivalent to the examples of the method for removing the solvent from the orienting polymer composition.

The manner for radiating the polarized light may be a manner of radiating the polarized light directly onto a product obtained by removing the solvent from the optically-oriented-film-forming composition applied onto the substrate, or a manner of radiating the polarized light to the same product from the substrate side of the product, so as to be transmitted into the applied optically-oriented-film-forming composition. Rays of the polarized light are in particular preferably rays substantially parallel to each other. The wavelengths of the polarized light to be radiated are preferably in the range of wavelengths giving optical energy that can be absorbed into the optically reactive group of the optically-reactive-group-having polymer or monomer. Specifically, UV (ultraviolet)) rays having a wavelength of 250 to 400 nm are particularly preferred. Examples of a light source for radiating such polarized light rays include a xenon lamp, a high pressure mercury lamp, a super high pressure mercury lamp, a metal halide lamp, and ultraviolet lasers such as KrF and ArF laser. Of these examples, more preferred are a high pressure mercury lamp, a super high pressure mercury lamp, and a metal halide lamp. These lamps are convenient since the emission intensity of an ultraviolet ray having a wavelength of 313 nm is large. By radiating light from the light source to penetrate through an appropriate polarization layer into the applied optically-oriented-film-forming composition, polarized UV rays are radiated to the composition. Examples of the polarization layer include a polarizing filter, a Glan-Thompson prism, a Glan-Taylor prism, other polarizing prisms, and a wire-grid type polarization layer.

Plural regions (patterns) different from each other in liquid crystal orientation direction can be formed by performing masking when the polarized light radiation is conducted.

<Groove Oriented Film>

The groove oriented film is a film in which liquid crystal orientation is obtained by an irregularity pattern or plural grooves formed in its surface. When liquid crystal molecules are put onto a substrate having grooves that are arranged at regular intervals and are each in the form of a straight line, the liquid crystal molecules are oriented in the direction along the grooves.

Examples of the method for yielding the groove oriented film include a method of radiating light through an exposure mask having slits periodically patterned to a surface of a photosensitive polyimide product, and then developing and rinsing the polyimide product to remove an unnecessary polyimide film moiety of the polyimide product, thereby forming an irregularity pattern; a method of forming a UV curable resin layer onto a plate-like original disc having a grooved surface, transferring the resin layer onto a substrate, and then curing the resin layer; a method of carrying a substrate on which a UV curable resin layer is formed, pushing a roll-form original disc having grooves onto the outer surface of the UV curable resin layer to form irregularities, and then curing the resin; and respective methods described in JP-A-06-34976 and JP-A-2011-242743.

Of these methods, preferred is the method of pushing a roll-form original disc having grooves onto the outer surface of the UV curable resin layer to form irregularities, and then curing the resin. The roll-form original disc is preferably made of stainless (SUS) steel from the viewpoint of the endurance thereof.

The UV curable resin may be a monofunctional acrylate, a polyfunctional acrylate, or a mixture of the two.

The monofunctional acrylate is a compound having one selected from the group consisting of an acryloyloxy group ($CH_2$=CH—COO—), and a methacryloyloxy group ($CH_2$=C($CH_3$)—COO—) (hereinafter, one selected therefrom may be referred to as a (meth)acryloyloxy group). The word "(meth)acrylate" denotes an acrylate or a methacrylate.

Examples of the monofunctional acrylate having one (meth)acryloyloxy group include alkyl(meth)acrylates having 4 to 16 carbon atoms, β-carboxyalkyl(meth)acrylates having 2 to 14 carbon atoms, alkylated phenyl(meth)acrylates having 2 to 14 carbon atoms, methoxypolyethylene glycol(meth)acrylate, phenoxypolyethylene glycol(meth)acrylate, and isobornyl(meth)acrylate.

The polyfunctional acrylate is usually a compound having 2 to 6 (meth)acryloyloxy groups.

Examples of the bifunctional acrylates, which each have 2 (meth)acryloyloxy groups, include 1,3-butanediol di(meth)acrylate, 1,3-butanediol(meth)acrylate, 1,6-hexanediol di(meth)acrylate, ethylene glycol di(meth)acrylate, diethylene glycol di(meth)acrylate, neopentyl glycol di(meth)acrylate, triethylene glycol di(meth)acrylate, tetraethylene glycol di(meth)acrylate, polyethylene glycol diacrylate, bis(acryloyloxyethyl) ether of bisphenol A, ethoxylated bisphenol A di(meth)acrylate, propoxylated neopentyl glycol di(meth)acrylate, ethoxylated neopentyl glycol di(meth)acrylate, and 3-methylpentanediol di(meth)acrylate.

Examples of the polyfunctional acrylate having 3 to 6 (meth)acryloyloxy groups include trimethylolpropane tri(meth)acrylate, pentaerythritol tri(meth)acrylate, tris(2-hydroxyethyl)isocyanurate tri(meth)acrylate, ethoxylated trimethylolpropane tri(meth)acrylate, propoxylated trimethylolpropane tri(meth)acrylate, pentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, tripentaerythritol octa(meth)acrylate, a reaction product made from pentaerythritol tri(meth)acrylate and an acid anhydride, a reaction product made from dipentaerythritol penta(meth)acrylate and an acid anhydride, a reaction product made from tripentaerythritol hepta(meth)acrylate and an acid anhydride, caprolactone-modified trimethylolpropane tri(meth)acrylate, caprolactone-modified pentaerythritol tri(meth)acrylate, caprolactone-modified tris (2-hydroxyethyl)isocyanurate tri(meth)acrylate, caprolactone-modified pentaerythritol tetra(meth)acrylate, caprolactone-modified dipentaerythritol penta(meth)acrylate, caprolactone-modified dipentaerythritol hexa(meth)acrylate, caprolactone-modified tripentaerythritol tetra(meth)

acrylate, caprolactone-modified tripentaerythritol penta(meth)acrylate, caprolactone-modified tripentaerythritol hexa(meth)acrylate, caprolactone-modified tripentaerythritol hepta(meth)acrylate, caprolactone-modified tripentaerythritol octa(meth)acrylate, a reaction product made from caprolactone-modified pentaerythritol tri(meth)acrylate and an acid anhydride, a reaction product made from caprolactone-modified dipentaerythritol penta(meth)acrylate and an acid anhydride, and a reaction product made from caprolactone-modified tripentaerythritol hepta(meth)acrylate and an acid anhydride.

The wording "caprolactone-modified" means that a ring-opened body of caprolactone or a ring-opened polymer thereof is introduced into a moiety between the alcohol-originating moiety of a (meth)acrylate compound and a (meth)acryloyloxy group thereof.

The polyfunctional acrylate is commercially available. Examples of a commercially available product thereof include products A-DOD-N, A-HD-N, A-NOD-N, APG-100, APG-200, APG-400, A-GLY-9E, A-GLY-20E, A-TMM-3, A-TMPT, AD-TMP, ATM-35E, A-TMMT, A-9550, A-DPH, HD-N, NOD-N, NPG, and TMPT (manufactured by Shin-Nakamura Chemical Co., Ltd.), "ARONIXs M-220, M-325, M-240, M-270, M-309, M-310, M-321, M-350, M-360, M-305, M-306, M-450, M-451, M-408, M-400, M-402, M-403, M-404, M-405, and M-406" (each manufactured by Toagosei Co., Ltd.); and "EBECR-YLs 11, 145, 150, 40, 140, and 180", and DPGDA, HDDA, TPGDA, HPNDA, PETIA, PETRA, TMPTA, TMPEOTA, DPHA and EBECRYL series (each manufactured by Daicel-Cytec Co., Ltd.).

Each convex portion of the groove oriented film preferably has a width of 0.05 to 5 µm, and each concave portion thereof preferably has a width of 0.1 to 5 µm. The depth of steps between the convex and concave portions is preferably 2 µm or less, and is more preferably from 0.01 to 1 µm. When these properties are in the respective ranges, a liquid crystal orientation small in disorder can be obtained.

<Retardation Layer>

The above-defined retardation layer is formed by applying a retardation-layer-forming composition containing a polymerizable liquid crystal onto the oriented film, drying the resultant workpiece, orienting the polymerizable liquid crystal, and then polymerizing this liquid crystal. The polymerizable liquid crystal is a compound having a polymerizable group and having liquid crystal property.

<Polymerizable Liquid Crystal>

The liquid crystal orientation of the polymerizable liquid crystal is controlled by respective properties of the oriented film and the polymerizable liquid crystal.

When the oriented film is made of, for example, a material expressing, as orientation regulating force, horizontal orientation regulating force, the polymerizable liquid crystal can attain horizontal orientation or hybrid orientation. When the oriented film is made of a material expressing vertical orientation regulating force, the polymerizable liquid crystal can attain vertical orientation or oblique orientation.

When the oriented film is made of an orienting polymer, the orientation regulating force is adjustable at will in accordance with the surface state or rubbing conditions. When the oriented film is an optically oriented film, the force is adjustable at will in accordance with polarized light radiating conditions and others. The liquid crystal orientation is also controllable by selecting the surface tension, the liquid crystal property or some other property of the polymerizable liquid crystal.

The polymerizable group means a group related to polymerization reaction, and is preferably a photopolymerizable group. The photopolymerizable group is a group related to polymerization reaction by active radicals generated from a photopolymerization initiator that will be detailed later, an acid or some other. Examples of the polymerizable group include vinyl, vinyloxy, 1-chlorovinyl, isopropenyl, 4-vinylphenyl, acryloyloxy, methacryloyloxy, oxyranyl, and oxetanyl groups. Of these examples, preferred are acryloyloxy, methacryloyloxy, vinyloxy, oxyranyl, and oxetanyl groups, and more preferred is an acryloyloxy group. The liquid crystal property of the polymerizable liquid crystal may be thermotropic liquid crystal or lyotropic liquid crystal. Thermotropic liquid crystal can be classified into nematic liquid crystal and smectic liquid crystal in accordance with the order degree thereof, and may be any one of these two liquid crystal species. The retardation-layer-forming composition may contain two or more polymerizable liquid crystal species.

[Rodlike Liquid Crystal]

The polymerizable liquid crystal is preferably a nematic liquid crystal having thermotropic property since the liquid crystal can easily be made into a film. Examples of the polymerizable liquid crystal include compounds each having a polymerizable group out of compounds described in "3.8.6 Network (Completely Crosslinked Type)" and "6.5.1 Liquid Crystal Material, b. Polymerizable Nematic Liquid Crystal Material" in "Liquid Crystal Handbook" (edited by Liquid Crystal Handbook Editorial Committee, and published by Maruzen Publishing Co., Ltd. on Oct. 30, 2000); and polymerizable liquid crystals described in JP-A-2010-31223, JP-A-2010-270108, JP-A-2011-6360, and JP-A-2011-207765.

Such a compound is called a rodlike liquid crystal. Examples of the rodlike liquid crystal include respective compounds represented by formulae (I-1) to (I-4), formulae (II-1) to (II-4), formulae (III-1) to (III-26), formulae (IV-1) to (IV-26), formulae (V-1) to (V-2), and formulae (VI-1) to (VI-6) illustrated below. In these formulae, k1s and k2s each independently represent an integer of 2 to 12.

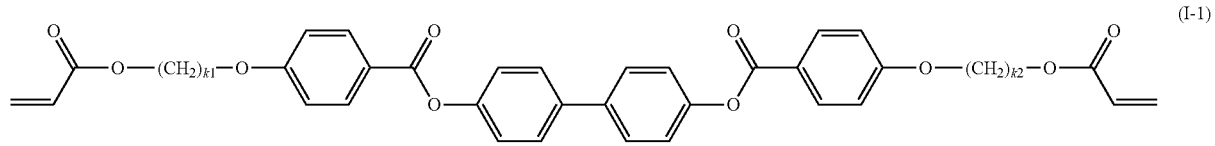

(I-1)

-continued
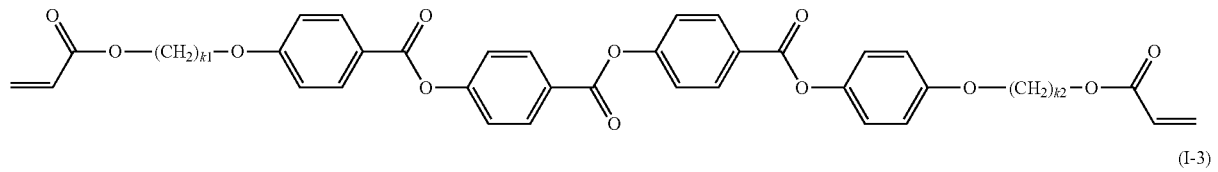
(I-2)
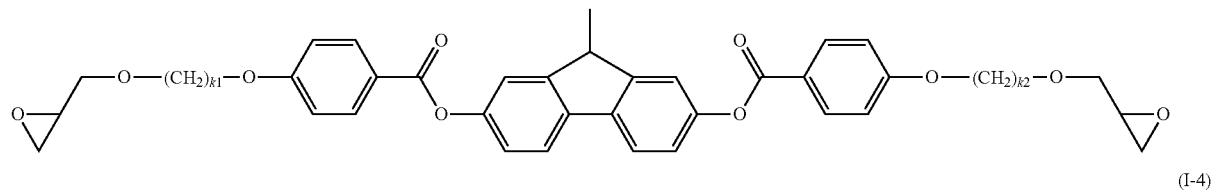
(I-3)
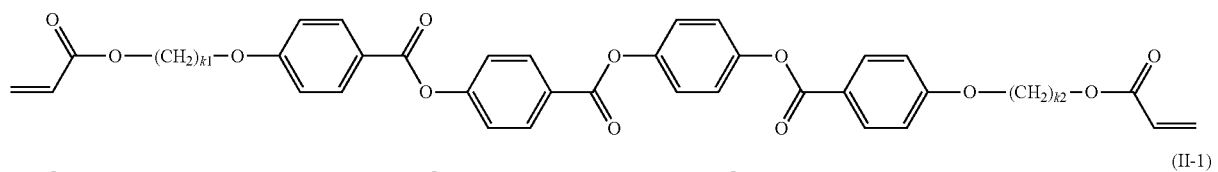
(I-4)
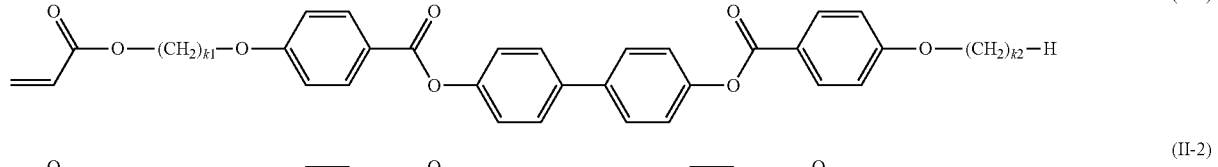
(II-1)
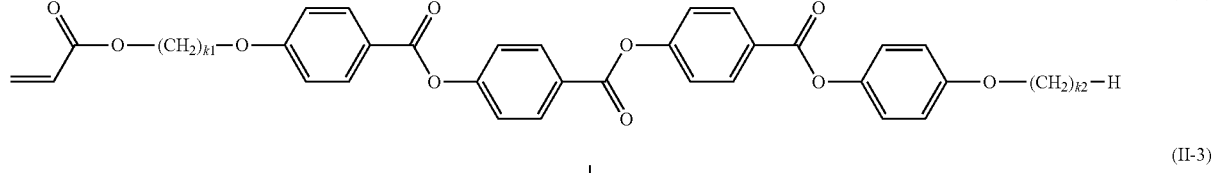
(II-2)
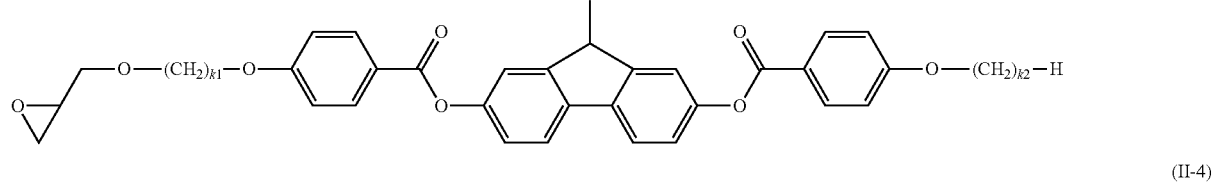
(II-3)
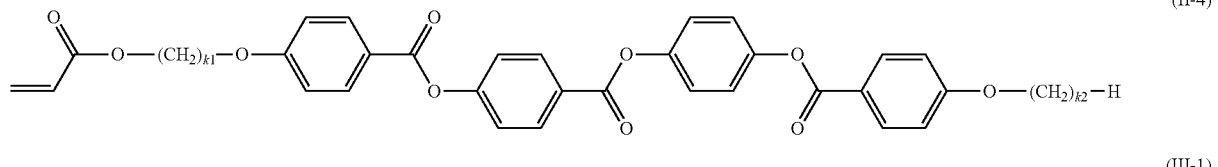
(II-4)
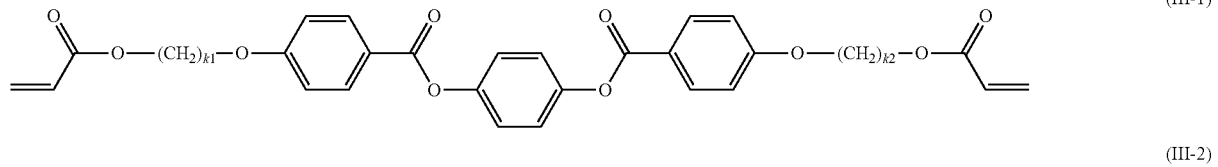
(III-1)
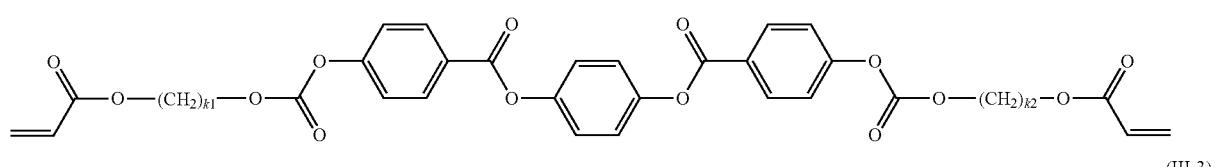
(III-2)
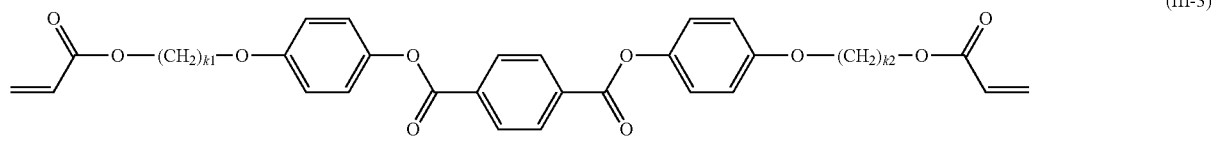
(III-3)

-continued
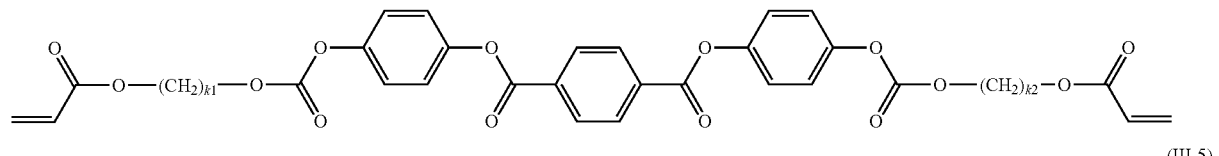
(III-4)
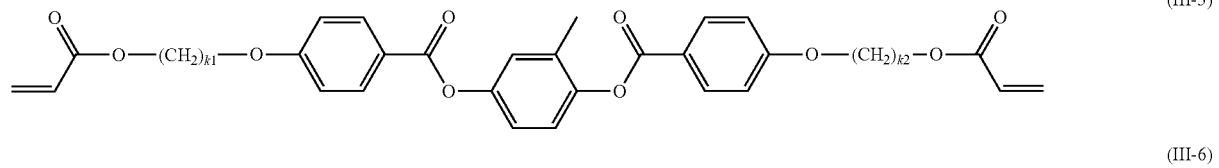
(III-5)
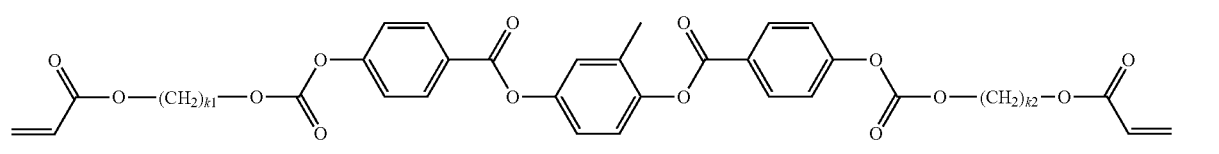
(III-6)
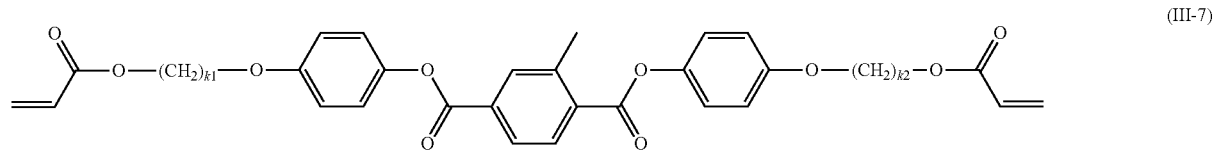
(III-7)
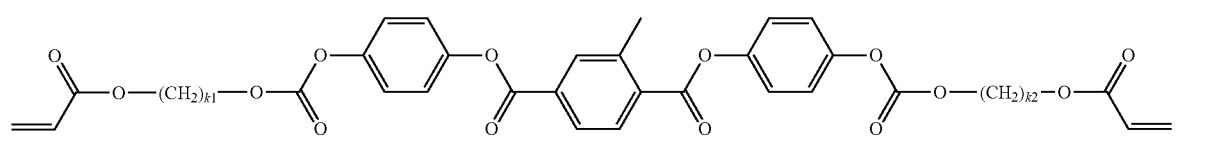
(III-8)
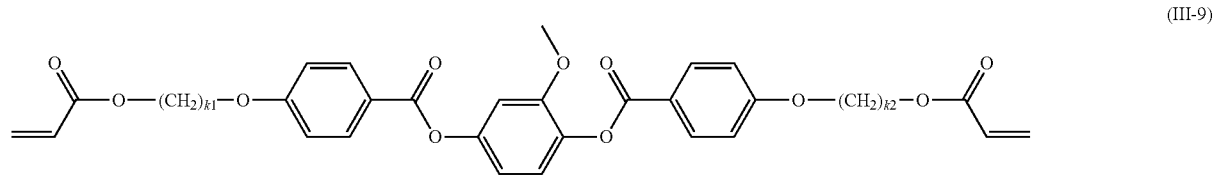
(III-9)
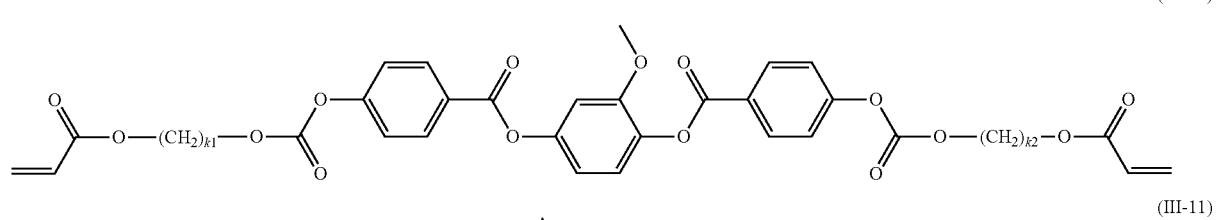
(III-10)
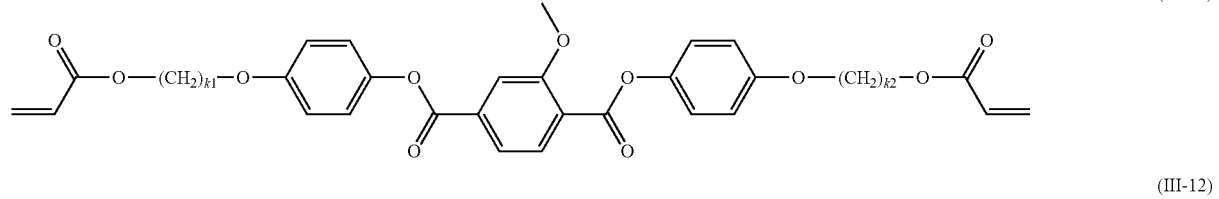
(III-11)
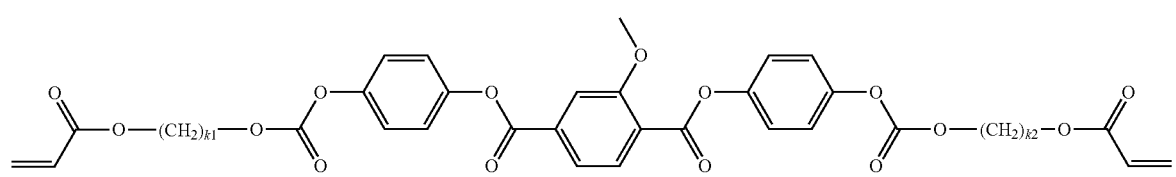
(III-12)

-continued
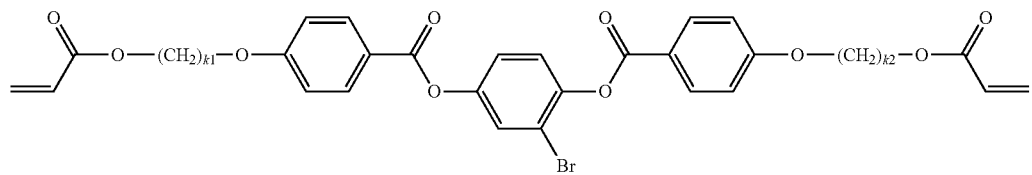 (III-13)
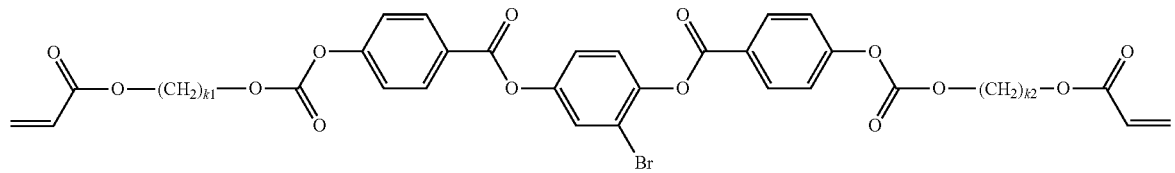 (III-14)
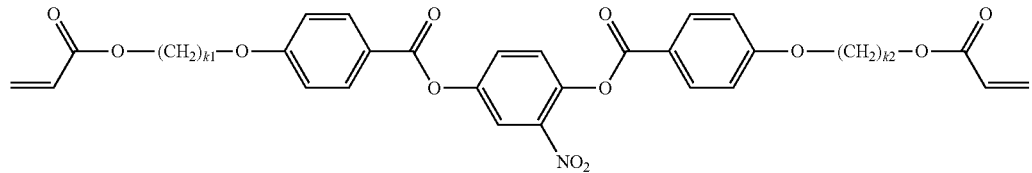 (III-15)
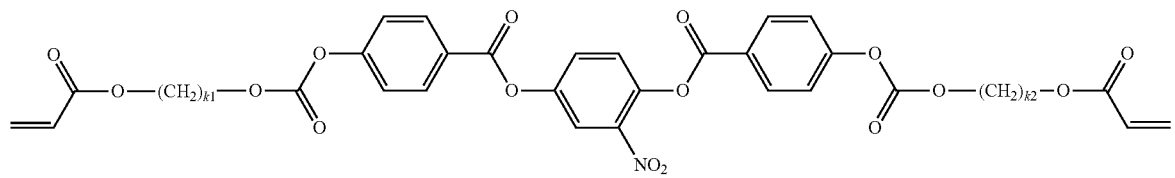 (III-16)
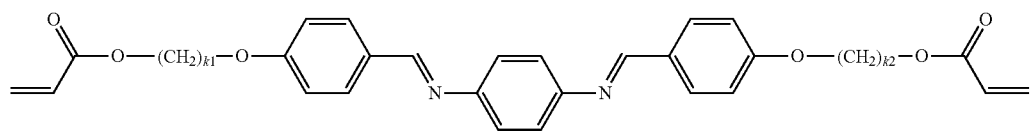 (III-17)
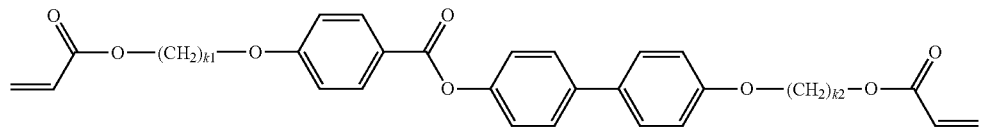 (III-18)
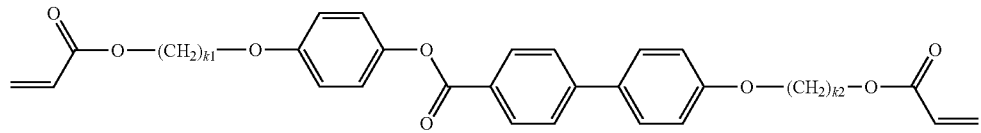 (III-19)
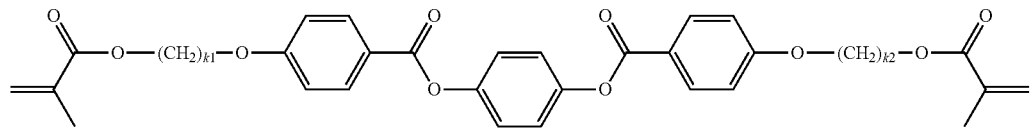 (III-20)
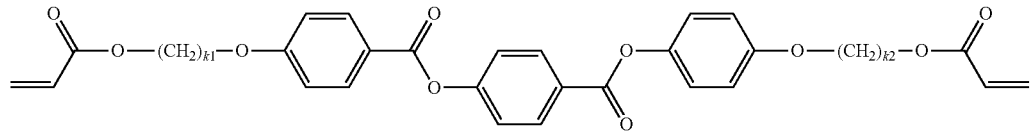 (III-21)
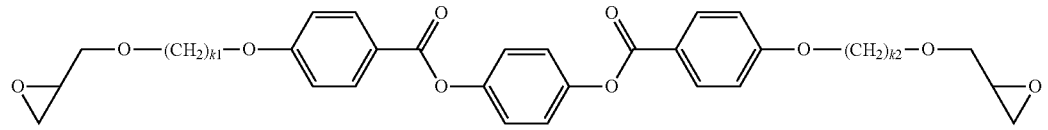 (III-22)

-continued
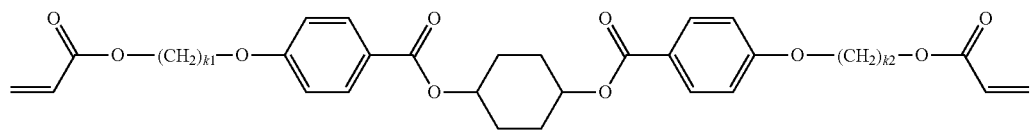
(III-23)
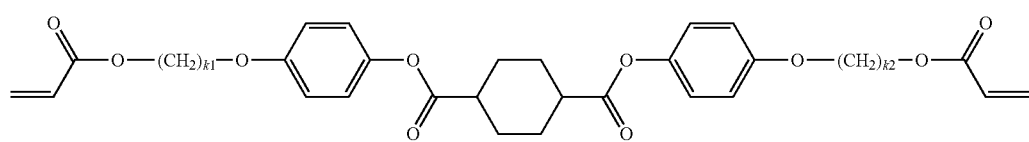
(III-24)
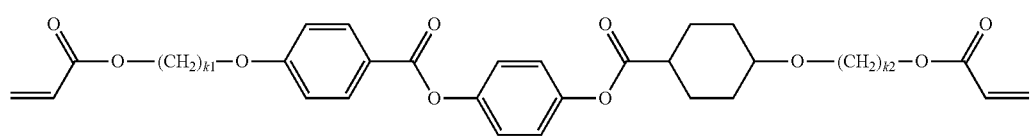
(III-25)
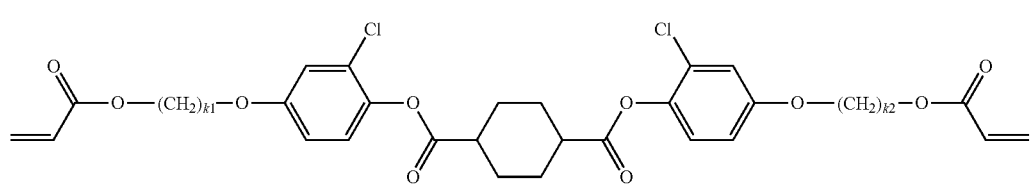
(III-26)
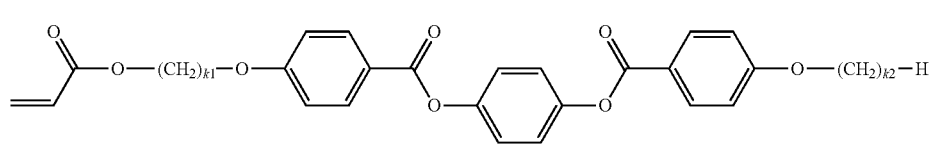
(IV-1)
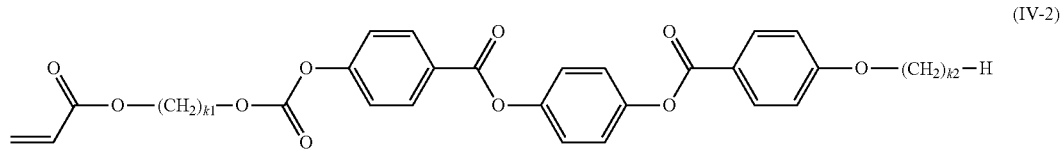
(IV-2)
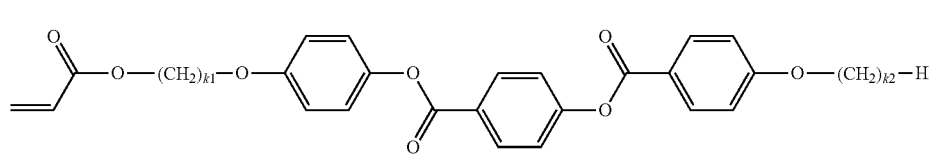
(IV-3)
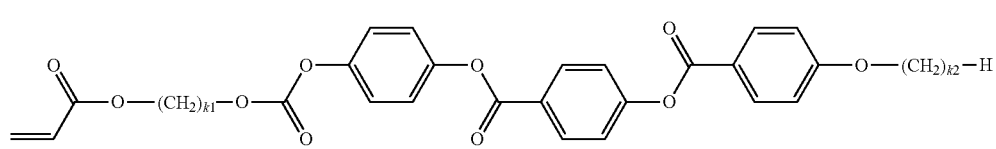
(IV-4)
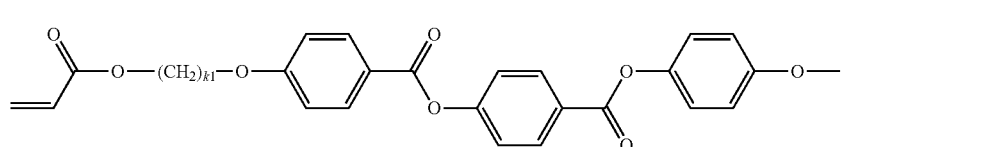
(IV-5)
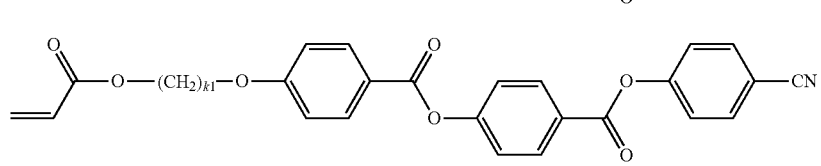
(IV-6)
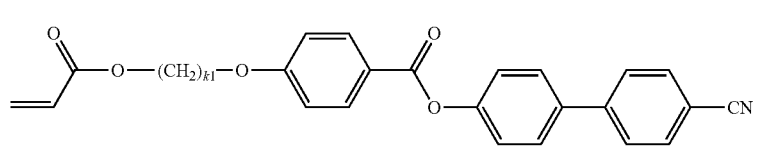
(IV-7)

-continued
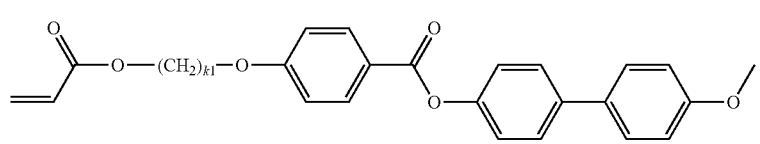
(IV-8)
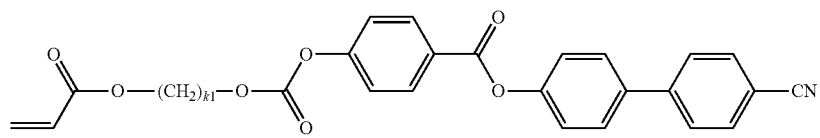
(IV-9)
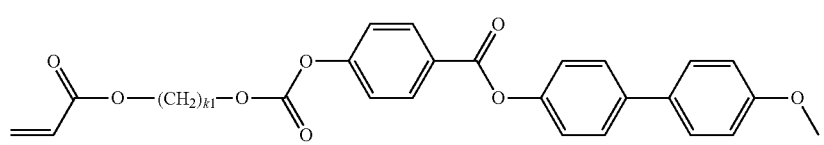
(IV-10)
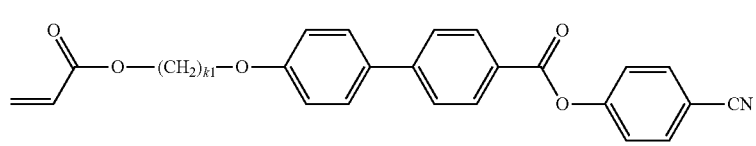
(IV-11)
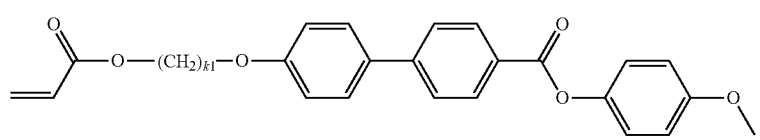
(IV-12)
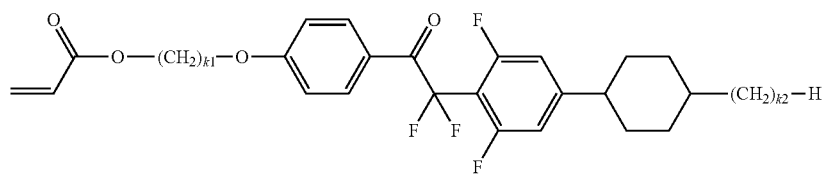
(IV-13)
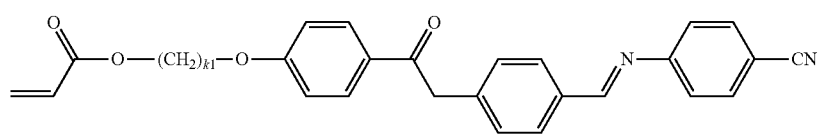
(IV-14)
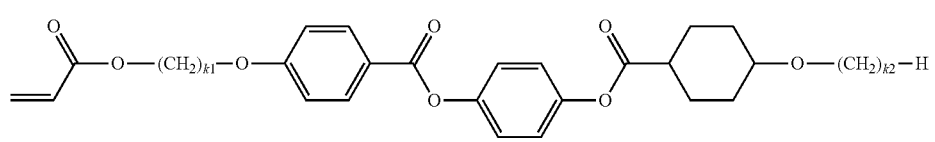
(IV-15)
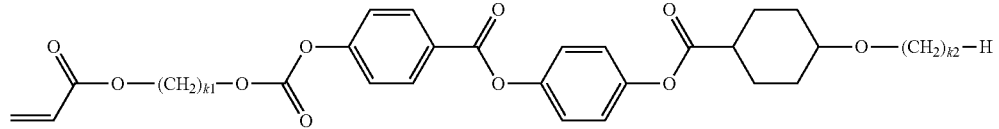
(IV-16)
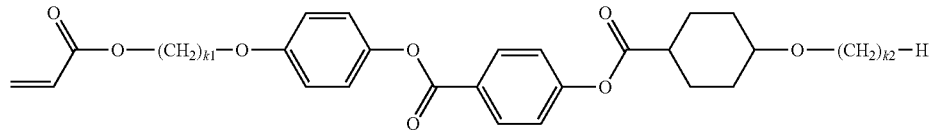
(IV-17)
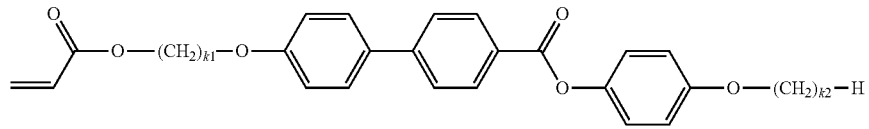
(IV-18)

-continued
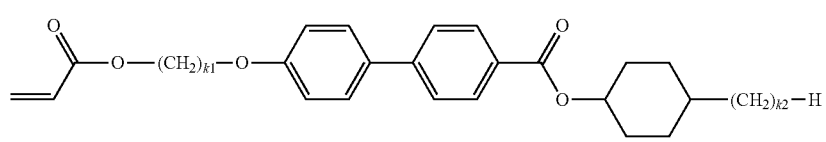
(IV-19)
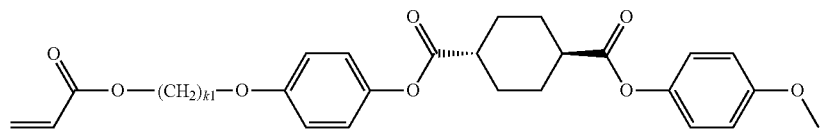
(IV-20)
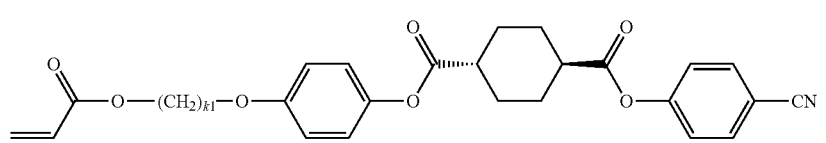
(IV-21)
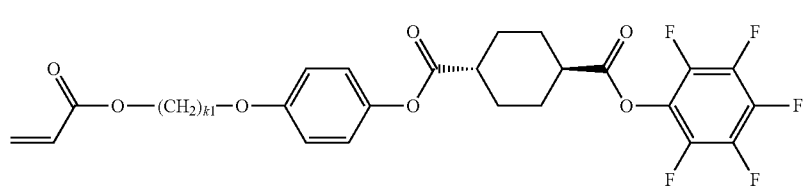
(IV-22)
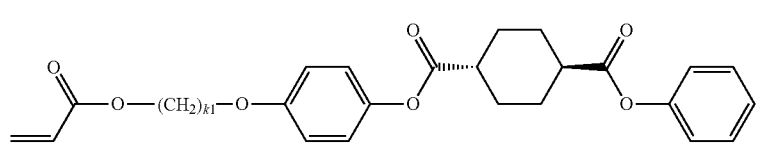
(IV-23)
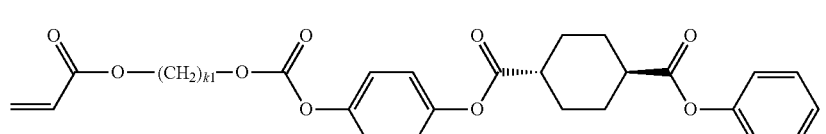
(IV-24)
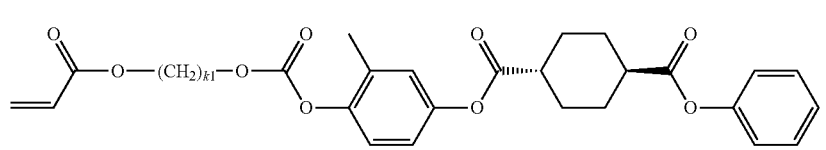
(IV-25)
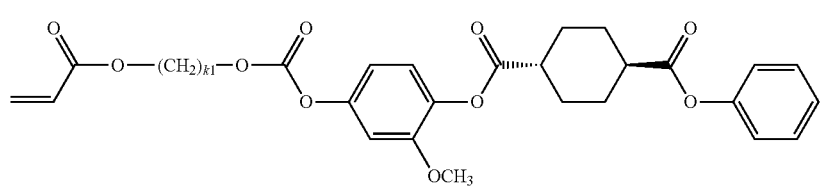
(IV-26)
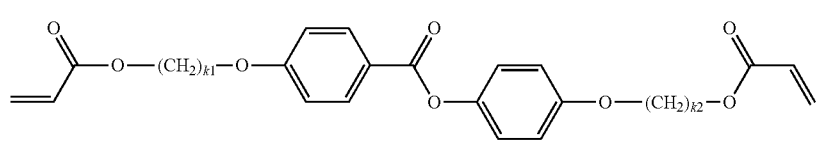
(V-1)
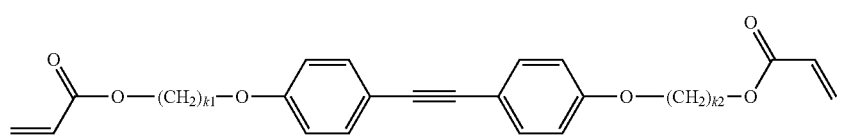
(V-2)
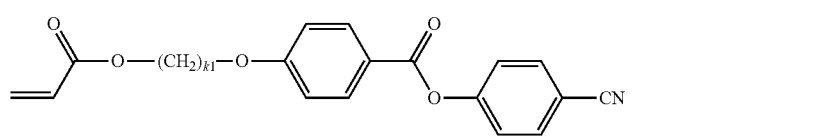
(VI-1)

-continued

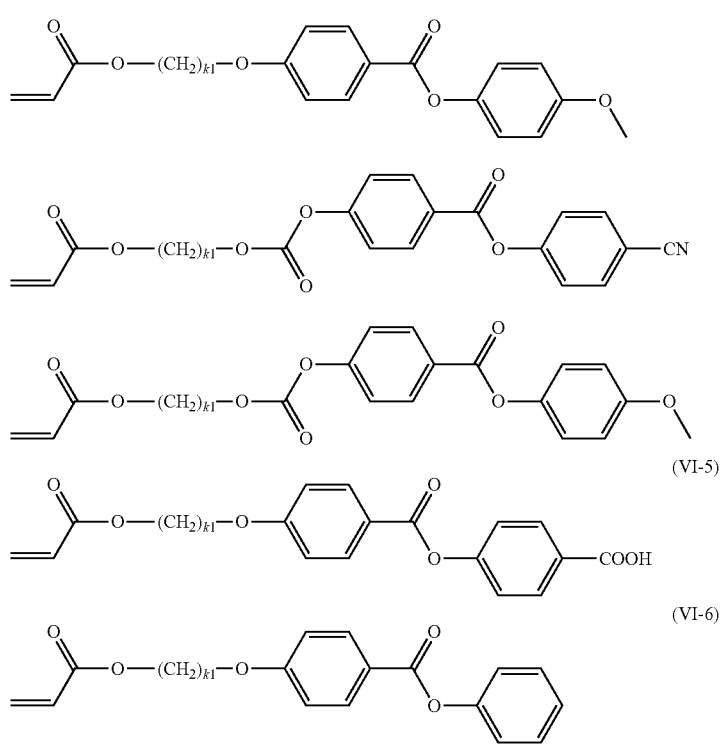

[Discotic Liquid Crystal]

The polymerizable liquid crystal may be a compound having a disc-like skeleton and a polymerizable group, and having liquid crystal property, and may be a compound containing a group represented by formula (W) illustrated below. Such a compound is called a discotic liquid crystal.

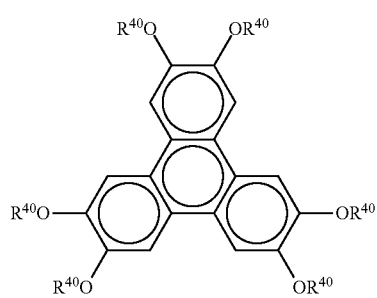

In formula (W), $R^{40}$s each independently represent a group represented by any one of the following formulae (W-1) to (W-5):

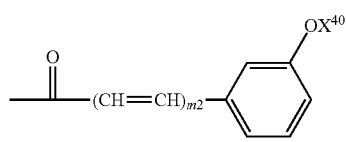

-continued

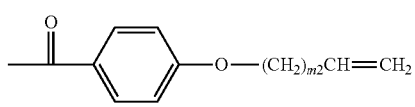

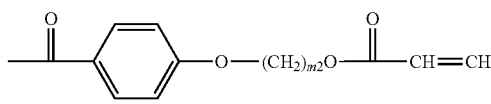

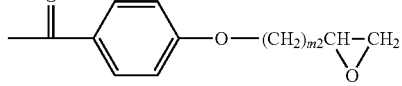

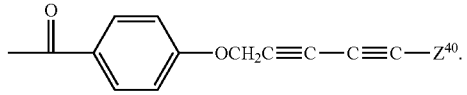

$X^{40}$ and $Z^{40}$ each independently represent an alkanediyl group having 1 to 12 carbon atoms. Any hydrogen atom contained in the alkanediyl group may be substituted with an alkoxy group having 1 to 5 carbon atoms, and any hydrogen atom contained in the alkoxy group may be substituted with a halogen atom. Any —CH$_2$— contained in the alkanediyl group may be replaced by —O—, or CO—. The symbol m2 represents an integer of 2 to 12.

Examples of the discotic liquid crystal include compounds described in "6.5.1 Liquid Crystal Material, b. Polymerizable Nematic Liquid Crystal Material" with FIG. 6.21 in "Liquid Crystal Handbook" (edited by Liquid Crystal Handbook Editorial Committee, and published by Maruzen Publishing Co., Ltd. on Oct. 30, 2000); and polymerizable liquid crystals described in JP-A-07-258170, JP-A-07-30637, JP-A-07-309807, JP-A-08-231470, and others.

The retardation-layer-forming composition may contain, besides the polymerizable liquid crystal, a polymerization initiator, a polymerization inhibitor, a photosensitizer, a levelling agent, a chiral agent, a reactive additive, a solvent and others. The composition preferably contains a polymerization initiator.

[Polymerization Initiator]

The polymerization initiator is preferably a photopolymerization initiator, particularly a photopolymerization initiator that generates radicals by irradiation with light.

Examples of the photopolymerization initiator include benzoin compounds, benzophenone compounds, benzyl ketal compounds, α-hydroxyketone compounds, α-aminoketone compounds, α-acetophenone compounds, triazine compounds, iodonium salts and sulfonium salts. Specific examples thereof include products Irgacure (registered trademark) 907, 184, 651, 819, 250 and 369 (all the products are manufactured by Ciba Japan K.K.); Seikuol (registered trademark) BZ, Z, BEE (all the products are manufactured by Seiko Chemical Co., Ltd.); Kayacure (registered trademark) BP100 (manufactured by Nippon Kayaku Co., Ltd.); UVI-6992 (manufactured by the Dow Chemical Co.); Adeka Optomer (registered trademark) SP-152, and SP-170 (all the products are manufactured by Adeka Corp.); TAZ-A and TAZ-PP (all the products are manufactured by Nihon Siber Hegner K.K.), and TAZ-104 (manufactured by Sanwa Chemical Co., Ltd.). Of these examples, preferred are α-acetophenone compounds. Examples of the α-acetophenone compounds include 2-methyl-2-morpholino-1-(4-methylsulfanylphenyl)propane-1-one, 2-dimethylamino-1-(4-morpholinophenyl)-2-benzylbutane-1-one, and 2-dimethylamino-1-(4-morpholinophenyl)-2-(4-methylphenylmethyl)butane-1-one. Preferred are 2-methyl-2-morpholino-1-(4-methylsulfanylphenyl)propane-1-one, and 2-dimethylamino-1-(4-morpholinophenyl)-2-benzylbutane-1-one. Commercially available product examples of the α-acetophenone compounds include products Irgacure (registered trademark) 369, 379EG, and 907 (all the product are manufactured by BASF Japan Ltd.), and Seikuol (registered trademark) BEE (manufactured by Seiko Chemical Co., Ltd.).

The content of the polymerization initiator in the composition is usually from 0.1 to 30 parts by mass, preferably from 0.5 to 10 parts by mass for 100 parts by mass of the polymerizable liquid crystal therein. When the content is in this range, the polymerizable liquid crystal can be polymerized without disturbing the liquid crystal orientation of this liquid crystal. Thus, the content range is favorable.

[Polymerization Inhibitor]

Examples of the polymerization inhibitor include hydroquinone and hydroquinone analogues each having, as a substituent, an alkyl ether or the like; catechol compounds each having, as a substituent, an alkyl ether or the like, such as butylcatechol; radical capturing agents such as pyrogallol compounds, and 2,2,6,6-tetramethyl-1-piperidinyloxy radicals; thiophenol compounds; β-naphthylamine compounds; and β-naphthol compounds.

The content of the polymerization inhibitor in the composition is usually from 0.1 to 30 parts by mass, preferably from 0.5 to 10 parts by mass for 100 parts by mass of the polymerizable liquid crystal therein. When the content is in this range, the liquid crystal orientation of the polymerizable liquid crystal is not easily disturbed, and the polymerizable liquid crystal can be polymerized without disturbing the liquid crystal orientation of this liquid crystal. Thus, the content range is favorable.

[Photosensitizer]

Examples of the photosensitizer include xanthone, and xanthone analogues such as thioxanthone; anthracene, and anthracene analogues such as anthracene having a substituent such as an alkylether group; phenothiazine; and rubrene. The use of the photosensitizer makes it possible to enhance the sensitivity of the photopolymerization initiator.

The content of the photosensitizer in the composition is usually from 0.1 to 30 parts by mass, preferably from 0.5 to 10 parts by mass for 100 parts by mass of the polymerizable liquid crystal.

[Levelling Agent]

Examples of the levelling agent include organic modified silicone oil based and polyacrylate based levelling agents, and perfluoroalkyl-containing levelling agents. Specific examples thereof include products DC3PA, SH7PA, DC11PA, SH28PA, SH29PA, SH30PA, ST80PA, ST86PA, SH8400, SH8700, and FZ2123 (all the products are manufactured by Dow Corning Toray Co., Ltd.); KP321, KP323, KP324, KP326, KP340, KP341, X22-161A, and KF6001 (all the products are manufactured by Shin-Etsu Chemical Co., Ltd.); TSF400, TSF401, TSF410, TSF4300, TSF4440, TSF4445, TSF-4446, TSF4452, and TSF4460 (all the products are manufactured by Momentive Performance Materials Japan LLC); Fluorinert (registered trademark) FC-72, FC-40, FC-43, and FC-3283 (all the products are manufactured by Sumitomo 3M Limited); Megafac (registered trademark) R-08, R-30, R-90, F-410, F-411, F-443, F-445, F-470, F-477, F-479, F-482, and F-483 (all the products are manufactured by DIC Corp.); Eftop (trade name) EF301, EF303, EF351, and EF352 (all the products are manufactured by Mitsubishi Material Electronic Chemicals Co., Ltd.); Surflon (registered trademark) S-381, S-382, S-383, S-393, SC-101, SC-105, KH-40, and SA-100 (all the products are manufactured by AGC Seimi Chemical Co., Ltd.); E1830 and E5844 ((trade names) manufactured by Daikin Fine Chemical Laboratory, Ltd.); and BM-1000, BM-1100, BYK-352, BYK-353, and BYK-361N ((trade names) manufactured by BM Chemie GmbH). Such levelling agents may be used in any combination of two or more thereof.

The use of the levelling agent makes it possible to yield a smoother retardation layer, and to control the fluidity of the retardation-layer-forming composition or adjust the cross-linkage density of the retardation layer in the production process of the retardation layer.

The content of the levelling agent in the composition is usually from 0.1 to 30 parts by mass, preferably from 0.1 to 10 parts by mass for 100 parts by mass of the polymerizable liquid crystal.

[Chiral Agent]

The chiral agent may be a known chiral agent (for example, agents described in "Liquid Crystal Device Handbook", Chapter 3, 4-3, Chiral Agents for TN and STN, p. 199, edited by the Japan Society for the Promotion of Science, Committee No. 142, 1989).

As the chiral agent, a compound containing an asymmetric carbon atom can be mentioned. Also mentioned are an axially asymmetric compound or planarly asymmetric compound, which contains no asymmetric carbon atom. Examples of the axially asymmetric compound or planarly asymmetric compound include binaphthyl, helicene, paracyclophane, and derivatives of these compounds.

Specific examples of the chiral agent include compounds as described in JP-A-2007-269640, JP-A-2007-269639, JP-A-2007-176870, JP-A-2003-137887, JP-A-2000-515496, JP-A-2007-169178, and JP-A-09-506088. The chiral agent is preferably a product Paliocolor (registered trademark) LC756 manufactured by BASF Japan Ltd.

The content of the chiral agent in the composition is usually from 0.1 to 30 parts by mass, preferably from 1.0 to 25 parts by mass for 100 parts by mass of the polymerizable liquid crystal therein. When the content is in this range, the liquid crystal orientation of the polymerizable liquid crystal is not easily disturbed, and the polymerizable liquid crystal can be polymerized without disturbing the liquid crystal orientation of this liquid crystal. Thus, the content range is favorable.

[Reactive Additive]

When a substrate is included in the laminated body of the present invention, a reactive additive is incorporated into the retardation-layer-forming composition, thereby making it possible to improve the adhesiveness between the resultant retardation layer and the substrate. The reactive additive is preferably a compound having a carbon-carbon unsaturated bond and an active hydrogen reactive group. The wording "active hydrogen reactive group" means a group reactive with a group having an active hydrogen such as a carboxyl group (—COOH), hydroxyl group (—OH) or amino group (—NH$_2$). Examples thereof include glycidyl, oxazoline, carbodiimide, aziridine, imide, isocyanato, thioisocyanato, and maleic anhydride groups.

It is preferred that the reactive additive has at least two active hydrogen reactive groups. The active hydrogen reactive groups may be the same or different.

Examples of the carbon-carbon unsaturated bond that the reactive additive has include a carbon-carbon double bond, a carbon-carbon triple bond, or a combination of the two; and preferable one is a carbon-carbon double bond. It is preferred that the carbon-carbon unsaturated bond is a vinyl group and/or a (meth)acrylic group. The active hydrogen reactive group is preferably at least one selected from the group consisting of epoxy, glycidyl and isocyanato groups. Particularly preferably the reactive additive has an acrylic group and an isocyanato group.

Examples of the reactive additive include compounds each having a (meth)acrylic group and an epoxy group, such as methacryloxy glycidyl ether and acryloxy glycidyl ether; compounds each having a (meth) acrylic group and an oxetane group, such as oxetane acrylate and oxetane methacrylate; compounds each having a (meth)acrylic group and a lactone group, such as lactone acrylate and lactone methacrylate; compounds each having a vinyl group and an oxazoline group, such as vinyl oxazoline, and isopropenyl oxazoline; and oligomers each made from a compound having a (meth)acrylic group and an isocyanato group, such as isocyanatomethyl acrylate, isocyanatomethyl methacrylate, 2-isocyanatoethyl acrylate, and 2-isocyanatoethyl methacrylate. Other examples thereof include compounds each having a vinyl group or vinylene group, and an acid anhydride, such as methacrylic anhydride, acrylic anhydride, maleic anhydride, and vinylmaleic anhydride. Of these examples, preferred are methacryloxy glycidyl ether, acryloxy glycidyl ether, isocyanatomethyl acrylate, isocyanatomethyl methacrylate, vinyl oxazoline, 2-isocyanatoethyl acrylate, 2-isocyanatoethyl methacrylate, and the above-mentioned oligomers. Particularly preferred are isocyanatomethyl acrylate, 2-isocyanatoethyl acrylate, and the oligomers.

As the reactive additive having, as its active hydrogen reactive group, an isocyanato group, preferred are reactive additives each represented by the following formula (Y):

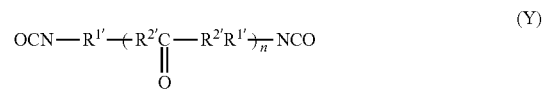

wherein n represents an integer of 1 to 10, $R^{1'}$'s each independently represent a bivalent aliphatic or alicyclic hydrocarbon group having 2 to 20 carbon atoms, or a bivalent aromatic hydrocarbon group having 5 to 20 carbon atoms; and one of two $R^{2'}$ in each of the recurring units is a group represented by —NH— and the other is a group represented by >N—C(=O)—$R^{3'}$ wherein $R^{3'}$ represents a hydroxyl group, or a group having a carbon-carbon unsaturated bond. At least one of $R^{3'}$'s is a group having a carbon-carbon unsaturated bond.

Of the reactive additives represented by the formula (Y), particularly preferred is a compound represented by the following formula (YY) in which n has the same meaning as described above:

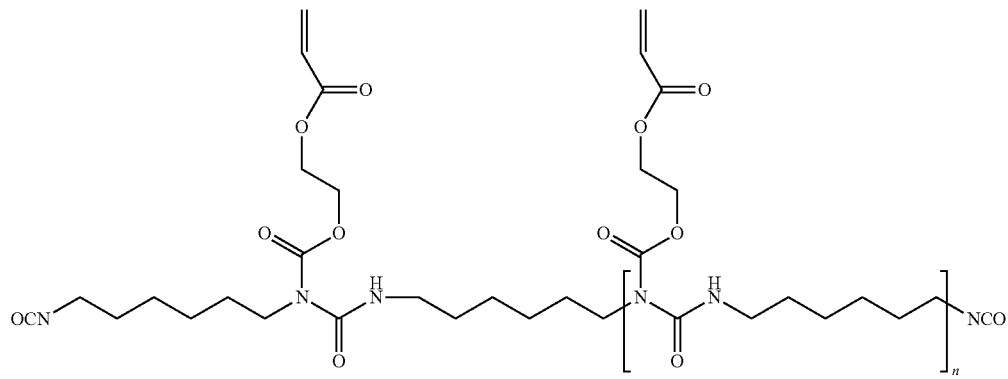

As the compound (YY), a commercially available product is usable as it is, or in the state of being purified if necessary. An example of the commercially available product is a product Laromer (registered trademark) LR-9000 (manufactured by the company BASF).

The content of the reactive additive in the composition is usually from 0.1 to 30 parts by mass, preferably from 0.1 to 5 parts by mass for 100 parts by mass of the polymerizable liquid crystal.

[Solvent]

The retardation-layer-forming composition preferably contains a solvent, in particular, an organic solvent to make the operability of this composition for retardation layer production good. The organic solvent is preferably an organic solvent in which the polymerizable liquid crystal, and other constituent components for the retardation-layer-forming composition are soluble, more preferably a solvent which is inactive to the polymerization reaction of the polymerizable liquid crystal, the solvent in which the polymerizable liquid crystal and other constituent components, for the retardation-layer-forming composition, are soluble. Specific examples thereof include alcohol solvents such as methanol, ethanol, ethylene glycol, isopropyl alcohol, propylene glycol, methylcellosolve, butylcellosolve, propylene glycol monomethyl ether, and phenol; ester solvents such as ethyl acetate, butyl acetate, ethylene glycol methyl ether acetate, γ-butyrolactone, propylene glycol methyl ether acetate, ethyl lactate, and N-methyl-2-pyrrolidinone; ketone solvents such as acetone, methyl ethyl ketone, cyclopentanone, cyclohexanone, methyl amyl ketone, and methyl isobutyl ketone; non-chlorinated aliphatic hydrocarbon solvents such as pentane, hexane and heptane; non-chlorinated aromatic hydrocarbon solvents such as toluene, and xylene; nitrile solvents such as acetonitrile; ether solvents such as tetrahydrofuran, and dimethoxyethane; and chlorinated hydrocarbon solvents such as chloroform, and chlorobenzene. Such organic solvents may be used in any combination of two or more thereof. Of these examples, preferred are alcohol solvents, ester solvents, ketone solvents, non-chlorinated aliphatic hydrocarbon solvents and non-chlorinated aromatic hydrocarbon solvents.

The content of the solvent in the retardation-layer-forming composition is preferably from 10 to 10000 parts by mass, more preferably from 100 to 5000 parts by mass for 100 parts by mass of a solid therein. The concentration of the solid in the retardation-layer-forming composition is preferably from 2 to 50% by mass, more preferably from 5 to 50% by mass. The "solid" means the whole of components obtained by removing the solvent from the retardation-layer-forming composition.

<Method for Producing Retardation Layer>

Examples of the method for applying the retardation-layer-forming composition include extrusion coating, direct gravure coating, reverse gravure coating, CAP coating, slit coating, and die coating methods; and a method of attaining the application, using a coater such as a dip coater, a bar coater, or a spin coater. Preferred are CAP coating, inkjet coating, dip coating, slit coating, die coating, and bar-coater-used coating methods since these methods make it possible to attain the application continuously in a roll-to-roll manner. When this composition is applied in a roll-to-roll manner, it is possible to form an oriented film on a substrate, and form a retardation layer continuously onto the outer surface of the resultant oriented film.

Examples of the method for the drying include the same methods as used for the drying when the oriented film is formed. Of these examples, preferred are natural drying and heat drying. The drying temperature is preferably from 0 to 250° C., more preferably from 50 to 220° C., even more preferably from 80 to 170° C. The drying period is preferably from 10 seconds to 60 minutes, more preferably from 30 seconds to 30 minutes.

The polymerizable liquid crystal may be polymerized to be cured. About a retardation layer obtained by polymerizing the polymerizable liquid crystal, the liquid crystal orientation of the polymerizable liquid crystal is fixed so that the retardation layer is not easily affected by a birefringence change by heat.

The method for polymerizing the polymerizable liquid crystal is preferably photopolymerization. Photopolymerization makes it possible to attain polymerization at a low temperature. Thus, the choice of the substrate is enlarged from the viewpoint of heat resistance. Photopolymerization reaction is usually conducted by irradiation with visible rays, ultraviolet rays or a laser, preferably ultraviolet rays.

When the applied retardation-layer-forming composition contains a solvent, the irradiation with the light is conducted preferably after the removal of the solvent by drying the applied composition. The drying may be conducted simultaneously with the irradiation with the light. Preferably, almost all of the solvent is removed before the irradiation with the light.

<Retardation Layer Properties>

When the resultant retardation layer shows a liquid crystal phase such as a nematic phase, the retardation layer has a birefringence based on mono-domain orientation.

The thickness of the retardation layer is adjustable in accordance with the usage thereof. The thickness is preferably from 0.1 to 10 μm. In order to make the layer small in photoelasticity, the thickness is more preferably from 0.2 to 5 μm.

About the retardation layer, optical properties thereof are adjustable in accordance with the orientation state of the polymerizable liquid crystal or a drawing method therefor. When the retardation layer is formed by orienting the polymerizable liquid crystal, the orientation state is adjusted in accordance with the species of the polymerizable liquid crystal.

When the polymerizable liquid crystal is a rodlike liquid crystal on a substrate, the orientation thereof for making its optical axis horizontal to the plane of the substrate is defined as horizontal orientation and the orientation for making the optical axis vertical to the substrate plane is defined as vertical orientation. The optical axis is defined as follows: a refractive index ellipsoid formed by the orientation of the polymerizable liquid crystal is supposed; and in a case where the ellipsoid is cut out along a direction orthogonal to some axis, this axis is the optical axis when the cut-out cross section becomes a circle, that is, the respective refractive indexes in predetermined three directions become equal to each other. When the rodlike liquid crystal is oriented horizontally or vertically to the substrate, the optical axis is consistent with the long axis direction of molecules thereof. In the case of any rodlike liquid crystal, its slow axis is present along a direction horizontal to the orientation direction.

When the polymerizable liquid crystal is a discotic liquid crystal on a substrate, the orientation for making the optical axis horizontal to the plane of the substrate is defined as horizontal orientation and the orientation for making the optical axis vertical to the substrate plane is defined as vertical orientation. In the case of any discotic liquid crystal, its slow axis is present along a direction vertical to the direction along which its discotic plane is oriented.

When a retardation layer is formed by drawing, the slow axis direction thereof is varied in accordance with the method for drawing. Its slow axis and optical axis are decided in accordance with the drawing method, such as monoaxial, biaxial, or oblique drawing. For example, when a positively orienting birefringence material is monoaxially drawn, its slow axis is present in the direction of the drawing.

<In-Plane Retardation Value $R_e(\lambda)$ of Retardation Layer>

A retardation layer giving a desired in-plane retardation can be produced by adjusting the thickness of the retardation layer (and the draw ratio when this layer is a drawn film). The in-plane retardation value $R_e(\lambda)$ of the resultant retardation layer is specified in accordance with the following equation (4):

$$R_e(\lambda)=d\times\Delta n(\lambda) \quad (4)$$

wherein $R_e(\lambda)$ represents the in-plane retardation value at a wavelength of $\lambda$ nm; d, the film thickness; and $\Delta n(\lambda)$, the birefringence of this layer at the wavelength of $\lambda$ nm.

In order to obtain a desired value $R_e(\lambda)$, it is advisable to adjust the value $\Delta n(\lambda)$ and the film thickness d.

When a refractive index ellipsoid formed by the orientation of the polymerizable liquid crystal is supposed, the refractive indexes in the three directions, that is, $n_x$, $n_y$, and $n_z$ are defined as follows: $n_x$ represents the main refractive index of the refractive index ellipsoid formed by the retardation layer, this index being in a direction parallel to the plane of the substrate; $n_y$, the refractive index of the same ellipsoid in a direction parallel to the substrate plane and orthogonal to the $n_x$ direction; and $n_z$, the refractive index of the same ellipsoid in a direction vertical to the substrate plane.

When the optical axis of any rodlike liquid crystal is oriented horizontally to the substrate plane, the retardation layer becomes a positive A layer satisfying $n_x>n_y\cong n_z$ so that the $n_x$ direction is consistent with the slow axis direction.

When the optical axis of any discotic liquid crystal is oriented horizontally to the substrate plane, the retardation layer becomes a negative A layer satisfying $n_x<n_y\cong n_z$ so that the $n_y$ direction is consistent with the slow axis direction.

When the retardation layer is a $\lambda/4$ layer, the in-plane retardation value $R_e(550)$ is from 113 to 163 nm, preferably from 130 to 150 nm. When the retardation layer is a $\lambda/2$ layer, the value $R_e(550)$ is from 250 to 300 nm, preferably from 265 to 285 nm.

<Thickness Direction Retardation Value $R_{th}$>

In accordance with the orientation state of the polymerizable liquid crystal, a retardation layer expressing a thickness direction retardation can be formed. The wording "expressing a thickness direction retardation" denotes that shown is a property that the thickness direction retardation value $R_{th}$ according to an equation (8) described below is negative (−). The thickness direction retardation value $R_{th}$ can be calculated, using the retardation value $R_{40}$ measured in the state of inclining the in-plane fast axis at 40 degrees to act as an inclined axis, and the in-plane retardation value $R_e$. Specifically, the thickness direction retardation value $R_{th}$ can be calculated by using the following values: the in-plane retardation value $R_e$, the retardation value $R_{40}$, which is measured in the state of inclining the fast axis at 40 degrees to act as an inclined axis, the retardation layer thickness d, and the average refractive index $n_0$ of the retardation layer, so as to calculate the refractive indexes $n_x$, $n_y$ and $n_z$ in accordance with equations (9) to (11) described below; and then substituting these refractive indexes for the equation (8) described below.

$$R_{th}=[(n_x-n_y)/2-n_z]\times d \quad (8),$$

$$R_e=(n_x-n_y)\times d \quad (9),$$

$$R_{40}=(n_x-n_y')\times d/\cos(\phi) \quad (10), \text{ and}$$

$$(n_x+n_y+n_z)/3=n_0 \quad (11)$$

wherein $\phi=\sin^{-1}[\sin(40°)/n_0]$, and $$n_y'=n_y\times n_z/[n_y^2\times\sin^2(\phi)+n_z^2\times\cos^2(\phi)]^{1/2}.$$

$n_x$, $n_y$, and $n_z$ have the same definitions as described above.

When the optical axis of a rodlike liquid crystal is oriented vertically to the substrate plane, or the optical axis of a discotic liquid crystal is oriented horizontally to the substrate plane, the thickness direction retardation is expressed. When the polymerizable liquid crystal is a discotic liquid crystal, the optical axis is parallel to the substrate plane; thus, when the in-plane retardation value $R_e$ is decided, the thickness is fixed so that the thickness direction retardation value $R_{th}$ is decided into a single value. When the polymerizable liquid crystal is a rodlike liquid crystal, the optical axis is vertical to the substrate plane; thus, by adjusting the thickness of the retardation layer, the thickness direction retardation value $R_{th}$ is adjustable without changing the in-plane retardation value $R_e$.

Examples of the retardation layer formed by drawing so as to express a thickness direction retardation include a drawn film described in JP-A-2008-129465, which has a refractive index relationship of $n_x<n_y<n_z$; and known multilayered extruded films. Even when the retardation layer is a layer satisfying the refractive index relationship of $n_x<n_y<n_z$, the value $n_z$ becomes relatively large to produce substantially the same advantageous effect as produced by the relationship of $n_x\cong n_y<n_z$.

When the optical axis of a rodlike liquid crystal is oriented vertically to the substrate plane, the retardation layer becomes a positive C layer satisfying a relationship of $n_x\cong n_y<n_z$ so that the $n_z$ direction is consistent with the slow axis direction.

When the optical axis of a discotic liquid crystal is oriented in parallel to the substrate plane, the retardation layer becomes a negative A layer satisfying a relationship of $n_x<n_y\cong n_z$ so that the $n_y$ direction is consistent with the slow axis direction.

The in-plane retardation value $R_e(550)$ of the positive C layer is usually from 0 to 10 nm, preferably from 0 to 5 nm. The thickness direction retardation value $R_{th}$ is usually from −10 to −300 nm, preferably from −20 to −200 nm.

When the polymerizable liquid crystal is a rodlike liquid crystal, a broad band $\lambda/4$ layer satisfying expressions (12) and (13) described below can be obtained in the case of laminating a film obtained by drawing a polymer having a specific structure onto a $\lambda/2$ layer and a $\lambda/4$ layer as retardation layers to have a specific slow axis relationship.

The broad band $\lambda/4$ layer means a retardation layer expressing, for a light ray having each wavelength in the visible ray range, a retardation value of ¼ of the wavelength. By a uniform polarization conversion property of this layer, the layer makes it possible to restrain light leakage when an organic EL display device (having this layer) shows a black display, as will be detailed later.

About the broad band $\lambda/4$ layer, the in-plane retardation value $R_e$ thereof further satisfies an expression (14) described below.

$$\Delta n(459)/\Delta n(550)\leq 1.00 \quad (12)$$

$$1.00\leq\Delta n(650)/\Delta n(550) \quad (13)$$

$$100<R_e(550)<160 \quad (14)$$

In the expressions (12) and (13), the value Δn(λ) is obtained by measuring the retardation of the retardation layer and dividing the measured value by the thickness of this layer. At this time, the measurement is made about a product in which the film is formed on a substrate which itself has no retardation, such as a glass substrate, thereby making it possible to determine substantial properties of the retardation layer.

The above-mentioned film, which is obtained by drawing a specific-structure-having-polymer, may be a commercially available drawn film made of a polycarbonate resin. A specific example thereof is a product "Pure-Ace (registered trademark) WR" (manufactured by Teijin Ltd.).

The method for yielding the above-mentioned broad band λ/4 layer by laminating the two retardation layers, the respective in-plane retardations of which are λ/2 and λ/4, to have a specific slow axis relationship may be a known method.

JP-A-10-68816 and JP-A-10-90521 each disclose a retardation film obtained by laminating two polymer films having anisotropy onto each other.

JP-A-10-68816 discloses a broad band λ/4 layer obtained by bonding a λ/4 layer and a λ/2 layer onto each other in the state of causing their optical axes to cross each other.

JP-A-10-90521 discloses a broad band λ/4 layer obtained by laminating at least two retardation plates each having an in-plane retardation value of 160 to 320 nm onto each other to make their slow axes neither parallel nor orthogonal to each other.

JP-A-2001-4837, JP-A-2001-21720 and JP-A-2000-206331 each disclose a method of laying at least two retardation layers each made of a liquid crystal compound to produce a broad band λ/4 layer.

JP-A-2001-4837 discloses a method of orienting a discotic liquid crystal to make its optical axis parallel to the plane of a substrate (beneath the liquid crystal), thereby forming a retardation layer.

<Polarization Layer>

The polarization layer is usually produced through the step of drawing a polyvinyl alcohol based resin film monoaxially, the step of dyeing the polyvinyl alcohol based resin film with a dichromatic dye to cause the dichromatic dye to be adsorbed into the film, the step of treating the dichromatic-dye-adsorbed polyvinyl alcohol based resin film with an aqueous boric acid solution, and the step of washing the boric-acid-treated resin film with water, or through the step of applying a dye having absorption anisotropy onto a predetermined member. It is preferred to bond a transparent protective film onto at least one surface of the resultant polarization layer through an adhesive layer.

The polyvinyl alcohol based resin is obtained by saponifying a polyvinyl acetate based resin. The polyvinyl acetate based resin may be polyvinyl acetate which is a homopolymer of vinyl acetate, or a copolymer made from vinyl acetate and a different monomer copolymerizable therewith. Examples of the different monomer copolymerizable with the vinyl acetate include unsaturated carboxylic acids, olefins, vinyl ethers, unsaturated sulfonic acids, and acrylamides each having an ammonium group.

The saponification degree of the polyvinyl alcohol based resin is usually from 85 to 100% by mole, preferably 98% or more by mole. The polyvinyl alcohol based resin may be modified, and examples thereof include polyvinyl formal and polyvinyl acetal, in each of which the resin has been modified with an aldehyde. The polymerization degree of the polyvinyl alcohol based resin is usually from 1,000 to 10,000, preferably from 1,500 to 5,000.

By making the polyvinyl alcohol based resin into a film form, the resultant film is usable as an original film for a polarization layer. The polyvinyl alcohol based resin can be made into the film form by a known method. The film thickness of the original film made of the polyvinyl alcohol based resin is preferably from 10 to 150 μm.

The monoaxial drawing of the polyvinyl alcohol based resin film may be performed before the dyeing thereof with the dichromatic dye, at the same time of the dyeing, or after the dyeing. When the monoaxial drawing is performed after the dyeing, the monoaxial drawing may be performed before or while the boric acid treatment is conducted. Over these steps, the monoaxial drawing may be performed. The monoaxial drawing may be performed between rolls different in peripheral speed, or may be performed using a heated roll. The monoaxial drawing may be drying drawing which is performed in the atmosphere, or wet drawing which is performed in the state of using a solvent to swell the polyvinyl alcohol based resin film. The draw ratio is usually from 3 to 8.

The dyeing of the polyvinyl alcohol based resin film with the dichromatic dye is performed by, for example, a method of immersing the polyvinyl alcohol based resin film in an aqueous solution containing the dichromatic dye. Examples of the dichromatic dye include iodine, and dichromatic organic dyes. Examples of the dichromatic organic dyes include dichromatic direct dyes each made of a disazo compound, such as C. I. DIRECT RED 39; and dichromatic direct dyes each made of, e.g., a trisazo compound or a tetrakisazo compound. The polyvinyl alcohol based resin film is preferably subjected to immersion treatment into water before the dyeing treatment.

When the dichromatic dye is iodine, typically the polyvinyl alcohol based resin film is dyed by immersing this film into an aqueous solution containing iodine and potassium iodide. The iodine content in the aqueous solution is usually from 0.01 to 1 part by mass for 100 parts by mass of water therein. The potassium iodide content therein is usually from 0.5 to 20 parts by mass for 100 parts by mass of the water. The temperature of the aqueous solution is usually from 20 to 40° C. The period for the immersion in the aqueous solution (dyeing period) is usually from 20 to 1,800 seconds.

When the dichromatic dye is a dichromatic organic dye, typically the polyvinyl alcohol based resin film is dyed by immersing this film into an aqueous solution containing a water-soluble dichromatic organic dye. The dichromatic organic dye content in the aqueous solution is usually from $1\times10^{-4}$ to 10 parts by mass, preferably from $1\times10^{-3}$ to 1 part by mass, more preferably from $1\times10^{-3}$ to $1\times10^{-2}$ parts by mass for 100 parts by mass of water therein. The aqueous solution may contain, as a dye aid, an inorganic salt such as sodium sulfate. The temperature of the aqueous solution of the dichromatic dye is usually from 20 to 80° C. The period for the immersion in the aqueous solution (dyeing period) is usually from 10 to 1,800 seconds.

The boric acid treatment after the dyeing with the dichromatic dye can be usually conducted by a method of immersing the dyed polyvinyl alcohol based resin film in an aqueous boric acid solution. The boric acid content in this aqueous boric acid solution is usually from 2 to 15 parts by mass, preferably from 5 to 12 parts by mass for 100 parts by mass of water therein. When iodine is used as the dichromatic dye, this aqueous boric acid solution preferably contains potassium iodide. In this case, the potassium iodide content in the solution is usually from 0.1 to 15 parts by mass, preferably from 5 to 12 parts by mass for 100 parts by mass of water in the solution. The period for the immersion in the aqueous boric acid solution is usually from 60 to 1,200 seconds, preferably from 150 to 600 seconds, more preferably from 200 to 400 seconds. The temperature for the boric acid treatment is usually 50° C. or higher, preferably from 50 to 85° C., more preferably from 60 to 80° C.

The polyvinyl alcohol based resin film after the boric acid treatment is usually subjected to water washing treatment. The water washing treatment may be conducted by, for example, a method of immersing the boric-acid-treated polyvinyl alcohol based resin film in water. The temperature of water in the water washing treatment is usually from 5 to 40° C. The immersion period is usually from 1 to 120 seconds.

After the water washing, the film is dried to yield a polarization layer. A means for the drying may be a hot-wind drying machine, or a far infrared heater. The temperature for the drying is usually from 30 to 100° C., preferably from 50 to 80° C. The period for the drying is usually from 60 to 600 seconds, preferably from 120 to 600 seconds. By the drying, the water content by percentage in the polarization layer is decreased into such a degree that the layer is practically usable. The water content by percentage is usually from 5 to 20% by mass, preferably from 8 to 15% by mass. If the water content by percentage is less than 5% by mass, the flexibility of the polarization layer is lost so that the polarization layer may be damaged or broken after dried. If the water content by percentage is more than 20% by mass, the polarization layer may be deteriorated in thermal stability.

The thickness of the polarization layer is usually from 5 to 40 μm.

The above-mentioned polarization layer, which is produced by applying a dye having absorption anisotropy onto a predetermined member is, for example, a polarization layer obtained by applying, on the member, a composition containing a dichromatic dye having liquid crystal property, or a composition containing a dichromatic dye and a polymerizable liquid crystal compound.

This polarization layer, produced by applying a dye having absorption anisotropy, is more preferred as the layer is smaller in thickness. However, if this layer is too thin, the layer is lowered in strength to tend to be poor in workability. The thickness of the polarization layer is usually 20 μm or less, preferably 5 μm or less, more preferably from 0.5 to 3 μm.

Specific examples of the polarization layer, produced by applying a dye having absorption anisotropy, include films described in JP-A-2012-33249 or the like.

A transparent protective film may be laminated onto at least one surface of the polarization layer through an adhesive layer. The transparent protective film is preferably any film equivalent to the above-mentioned transparent substrate.

<Adhesive Layer>

In the case of bonding the above-defined or described polarization layer and transparent protective film, plural retardation layers, retardation layer and polarization layer to each other, or bonding a circularly polarizing plate including the above-defined retardation layer and polarization layer to a display through an adhesive layer, the bonding is attained through an adhesive, or a sticker (binder).

When such a transparent protective film is bonded to each of the surfaces of any one of these polarization layers, it is preferred from the viewpoint of productivity and costs to use the same adhesive.

[Adhesive]

Examples of the adhesive include a water based adhesive, in which an adhesive component is dissolved or dispersed in water, and a composition curable by the receipt of a radiated active energy ray (hereinafter the composition may be referred to as an active-energy-ray-curable adhesive).

[Water Based Adhesive]

The water based adhesive is, for example, a composition containing, as a main component, a polyvinyl alcohol based resin or urethane resin, and also containing a crosslinking agent, such as an isocyanate compound or epoxy compound, or a curable compound for improving the adhesive in adhesiveness. The thickness of the adhesive layer is usually from 0.001 to 5 μm, preferably from 0.01 to 2 μm, more preferably from 0.01 to 1 μm after the layer is dried.

When the main component of the adhesive is a polyvinyl alcohol based resin, examples of the polyvinyl alcohol based resin include modified polyvinyl alcohol based resins such as partially saponified polyvinyl alcohol and wholly saponified polyvinyl alcohol, carboxyl-modified polyvinyl alcohol, acetoacetyl-modified polyvinyl alcohol, methylol-modified polyvinyl alcohol, and amino-modified polyvinyl alcohol. An aqueous solution of such a polyvinyl alcohol based resin is an adhesive. The concentration of the polyvinyl alcohol based resin in the adhesive is usually from 1 to 10 parts by mass, preferably from 1 to 5 parts by mass for 100 parts by mass of water therein.

The adhesive, which is made of an aqueous solution of a polyvinyl alcohol based resin, may contain a curable compound such as a polyhydric aldehyde, a water-soluble epoxy resin, a melamine based compound, a zirconia based compound, or a zinc compound for improving adhesiveness.

The water-soluble epoxy resin is, for example, a water-soluble polyamide epoxy resin obtained by causing epichlorohydrin to react with a polyamidepolyamine obtained by a reaction between a polyalkylenepolyamine, such as diethylenetriamine or triethylenetetramine, and a dicarboxylic acid such as adipic acid. Examples of a commercially available product of the polyamide epoxy resin include products "Sumirez Resin 650" and "Sumirez Resin 675" (manufactured by Sumika Chemtex Co., Ltd.), and "WS-525" (manufactured by Japan PMC Corp.). The content of the water-soluble epoxy resin in the adhesive is usually from 1 to 100 parts by mass, preferably from 1 to 50 parts by mass for 100 parts by mass of the polyvinyl alcohol based resin therein.

When the main component of the adhesive is a urethane resin, the urethane resin is preferably a polyester based ionomer type urethane resin. The polyester based ionomer type urethane resin is a urethane resin having a polyester skeleton and having an introduced ionic component (hydrophilic component). The ionomer type urethane resin is emulsified in water to turn to an emulsion even when an emulsifier is not used therefor. A water based adhesive containing the polyester based ionomer type urethane resin preferably contains, as a crosslinking agent, a water-soluble epoxy compound.

When the polarization layer and the transparent protective film are bonded to each other through a water based adhesive, the water based adhesive is injected into a gap between the polarization layer and the transparent protective film and then water therein is evaporated by the aforementioned drying method while a thermal crosslinking reaction of the adhesive is advanced. In this way, a sufficient adhesiveness can be given to the two.

[Active-Energy-Ray-Curable Adhesive]

The active-energy-ray-curable adhesive is cured by the receipt of a radiated active energy ray. Examples of the active-energy-ray-curable adhesive include a cation-polymerizable active-energy-ray-curable adhesive containing an epoxy compound and a cation polymerization initiator, a radical-polymerizable active-energy-ray-curable adhesive containing an acrylic curable component and a radical polymerization initiator, an active-energy-ray-curable adhesive containing both of a cation-polymerizable curable component, such as an epoxy compound, and a radical-polymerizable curable component, such as an acrylic compound, and further containing a cation polymerization initiator and a radical polymerization initiator, and an electron-beam-curable type active-energy-ray-curable adhesive, which is cured by irradiation with an electron beam. The electron-beam-curable type active-energy-ray-curable adhesive does not contain any initiator.

Of these examples, the cation-polymerizable active-energy-ray-curable adhesive, which contains an epoxy compound and a cation polymerization initiator, is preferred. It is preferred that the active-energy-ray-curable adhesive does not substantially contain any solvent.

The following active-energy-ray-curable adhesive makes it possible to save drying facilities ordinarily required for any adhering step: an adhesive which contains a cation-polymerizable epoxy compound selected as a compound that is itself in the form of a liquid at room temperature, has an appropriate fluidity even in the absence of any solvent, and gives an appropriate curing bonding strength, and which is obtained by giving this epoxy compound a cation polymerization initiator selected to be suitable for the epoxy compound. Moreover, the adhesive can be promoted in curing speed to improve the production speed of the laminated body by the radiation of an appropriate active energy ray radiation dose.

Examples of the epoxy compound include a glycidyl etherized product of an aromatic compound or linear compound that has a hydroxyl group; a glycidyl aminated product of a compound having an amino group; an epoxidized product of a linear compound having a C═C bond; and an alicyclic epoxy compound in which a glycidyloxy group or epoxyethyl group is bonded directly or through an alkylene to a saturated carbon ring, or in which an epoxy group is bonded directly to a saturated carbon ring. About the epoxy compound, two or more different species thereof may be used together. Of these compounds, the alicyclic epoxy compound is preferred since the compound is excellent in cation polymerizability.

The glycidyl etherized product of an aromatic compound or linear compound that has a hydroxyl group can be produced by a method of causing the hydroxyl group of the aromatic compound or linear compound to undergo addition condensation with epichlorohydrin under a basic condition. Examples of the glycidyl etherized product of an aromatic compound or linear compound that has a hydroxyl group include a diglycidyl ether of any bisphenol, any aromatic polycyclic epoxy resin, and a diglycidyl ether of any alkylene glycol or polyalkylene glycol.

Examples of the diglycidyl ether of any bisphenol include a glycidyl etherized product of bisphenol A, and oligomer products therefrom; a glycidyl etherized product of bisphenol F, and oligomer products therefrom; a glycidyl etherized product of 3,3',5,5'-tetramethyl-4,4'-bisphenol, and oligomer products therefrom.

Examples of the aromatic polycyclic epoxy resin include a glycidyl etherized product of a phenol novolak resin, a glycidyl etherized product of a cresol novolak resin, a glycidyl etherized product of a phenol aralkyl resin, a glycidyl etherized product of a naphthol aralkyl resin, and a glycidyl etherized product of a phenol dicyclopentadiene resin, and further include a glycidyl etherized product of any trisphenol, and oligomer products therefrom.

Examples of the diglycidyl ether of any alkylene glycol or polyalkylene glycol include a glycidyl etherized product of ethylene glycol, a glycidyl etherized product of diethylene glycol, a glycidyl etherized product of 1,4-butanediol, and a glycidyl etherized product of 1,6-hexanediol.

The glycidyl aminated product of any compound having an amino group can be produced by causing the amino group of this compound to undergo addition condensation with epichlorohydrin under a basic condition. The compound having an amino group may simultaneously have a hydroxyl group. Examples of the glycidyl aminated product of any compound having an amino group include a glycidyl aminated product of 1,3-phenylenediamine, and oligomer products therefrom; a glycidyl aminated product of 1,4-phenylenediamine, and oligomer products therefrom; a glycidyl aminated product and a glycidyl etherized product of 3-aminophenol, and oligomer products therefrom; and a glycidyl aminated product and a glycidyl etherized product of 4-aminophenol, and oligomer products therefrom.

The epoxidized product of any liner compound having a C═C bond can be produced by a method of epoxidizing the C═C bond of the linear compound with a peroxide under a basic condition. Examples of the linear compound having a C═C bond include butadiene, polybutadiene, isoprene, pentadiene, and hexadiene, and further include terpenes each having a double bond. A noncyclic monoterpene, out of these terpenes, is, for example, linalool. Examples of the peroxide used for the epoxidization include hydrogen peroxide, peracetic acid, and tert-butylhydroperoxide.

Examples of the alicyclic epoxy compound, in which a glycidyloxy or epoxyethyl group is bonded directly or through an alkylene to a saturated carbon ring, include a glycidyl etherized product of a hydrogenated polyhydroxy compound obtained by hydrogenating an aromatic ring of an aromatic compound having a hydroxyl group, such as a bisphenol as described above; a glycidyl etherized product of a cycloalkane compound having a hydroxyl group; and an epoxidized product of a cycloalkane compound having a vinyl group.

The epoxy compound may be obtained as a commercially available product. Examples thereof include products "jER" series (manufactured by Mitsubishi Chemical Corp.), "Epiclon" (manufactured by DIC Corp.), "Epotohto" (manufactured by Tohto Kasei Co., Ltd.), "Adekaresin" (manufactured by Adeka Corp.), "Denacol" (manufactured by Nagase ChemteX Corp.), "Dow Epoxy" (manufactured by the Dow Chemical Co.), and "Tepic" (manufactured by Nissan Chemical Industries, Ltd.).

The alicyclic epoxy compound in which an epoxy group is bonded directly to a saturated carbon ring can be produced by, for example, a method of preparing a nonaromatic cyclic compound having in its ring a C═C bond, and using a peroxide to epoxidize the C═C bond thereof under a basic condition. Examples of the nonaromatic cyclic compound having in its ring a C═C bond include compounds having a cyclopentene ring, compounds having a cyclohexene ring, and polycyclic compounds having a cyclopentene or cyclohexene ring to which at least two carbon atoms are bonded, so as to form an additional ring. The nonaromatic cyclic compound having in its ring a C═C bond may have another C═C bond outside the ring. Examples of the nonaromatic cyclic compound having in its ring a C═C bond include cyclohexene, 4-vinylcyclohexene and limonene and α-pinene, which are monocyclic monoterpenes.

The alicyclic epoxy compound in which an epoxy group is bonded directly to a saturated carbon ring may be a compound in which at least two alicyclic structures each having an epoxy group bonded directly to its ring are bonded to each other through an appropriate linking group. Examples of the linking group include an ester bond, an ether bond, and an alkylene bond.

Specific examples of the alicyclic epoxy compound in which an epoxy group is bonded directly to a saturated carbon ring include 3,4-epoxycyclohexylmethyl 3,4-epoxy-cyclohexanecarboxylate, 1,2-epoxy-4-vinylcyclohexane,
1,2-epoxy-4-epoxyethylcyclohexane,
1,2-epoxy-1-methyl-4-(1-methylepoxyethyl)cyclohexane,
3,4-epoxycyclohexylmethyl(meth)acrylate,
an adduct of 2,2-bis(hydroxymethyl)-1-butanol and 4-epoxyethyl-1,2-epoxycyclohexane,
ethylene bis(3,4-epoxycyclohexanecarboxylate),
oxydiethylene bis(3,4-epoxycyclohexanecarboxylate),
1,4-cyclohexanedimethyl bis(3,4-epoxycyclohexanecarboxylate), and
3-(3,4-epoxycyclohexylmethoxycarbonyl)propyl 3,4-epoxycyclohexanecarboxylate.

The alicyclic epoxy compound in which an epoxy group is bonded directly to a saturated carbon ring may also be obtained as a commercially available product. Examples thereof include products "Celloxide" series and "Cyclomer" ((trade name) manufactured by Daicel Corp.), and "Cyracure UVR" series ((trade name) manufactured by the Dow Chemical Co.).

The curable adhesive containing an epoxy compound may further contain an active-energy-ray-curable compound other than any epoxy compound. Examples of the active-energy-ray-curable compound other than any epoxy compound include an oxetane compound and an acrylic compound. It is preferred to use the oxetane compound together with the epoxy compound since the curing speed in cation polymerization may be promoted.

The oxetane compound is a compound having a 4-membered ring ether, and examples thereof include:
1,4-bis[(3-ethyloxetane-3-yl)methoxymethyl]benzene,
3-ethyl-3-(2-ethylhexyloxymethyl)oxetane,
bis(3-ethyl-3-oxetanylmethyl)ether,
3-ethyl-3-(phenoxymethyl)oxetane,
3-ethyl-3-(cyclohexyloxymethyl)oxetane,
phenol novolak oxetane, and
1,3-bis[(3-ethyloxetane-3-yl)methoxy]benzene.

The oxetane compound may be obtained as a commercially available product. Examples thereof include products "Aron Oxetane" series (manufactured by Toagosei Co., Ltd.), and "ETERNACOLL" series (manufactured by Ube Industries, Ltd.), these designations being trade names.

It is preferred that the curable compound containing an epoxy compound or oxetane compound contains no organic solvent. Other components that constitute the adhesive, such as a cation polymerization initiator or a sensitizer, are also preferably ones containing no organic solvent rather than ones dissolved in an organic solvent.

The cation polymerization initiator is a compound which generates a cation species by the receipt of one or more radiated active energy rays, such as ultraviolet rays. The cation polymerization initiator may be any initiator as far as the initiator can give the adhesive an adhesive strength and curing speed required for the adhesive. Examples thereof include aromatic diazonium salts; onium salts such as an aromatic iodonium salt and an aromatic sulfonium salt; and an iron-arene complex. About the cation polymerization initiator, different species thereof may be used together.

Examples of the aromatic diazonium salt include:
benzenediazonium hexafluoroantimonate,
benzenediazonium hexafluorophosphate, and
benzenediazonium hexafluoroborate.

Examples of the aromatic iodonium salt include:
diphenyliodoium tetrakis(pentafluorophenyl)borate,
diphenyliodoium hexafluorophosphate,
diphenyliodoium hexafluoroantimonate, and
bis(4-nonylphenyl)iodonium hexafluorophosphate.

Examples of the aromatic sulfonium salt include:
triphenylsulfonium hexafluorophosphate,
triphenylsulfonium hexafluoroantimonate,
triphenylsulfonium tetrakis(pentafluorophenyl)borate,
diphenyl(4-phenylthiophenyl)sulfonium hexafluoroantimonate,
4,4'-bis(diphenylsulfonio)diphenylsulfide bishexafluorophosphate,
4,4'-bis[di(β-hydroxyethoxyphenyl)sulfonio]diphenylsulfide bishexafluoroantimonate,
4,4'-bis[di(β-hydroxyethoxyphenyl)sulfonio]diphenylsulfide bishexafluorophosphate,
7-[di(p-toluyl)sulfonio]-2-isopropylthioxanthone hexafluoroantimonate,
7-[di(p-toluyl)sulfonio]-2-isopropylthioxanthone tetrakis (pentafluorophenyl)borate,
4-phenylcarbonyl-4'-diphenylsulfoniodiphenylsulfide hexafluorophosphate,
4-(p-tert-butylphenylcarbonyl)-4'-diphenylsulfonio diphenylsulfide hexafluoroantimonate, and
4-(p-tert-butylphenylcarbonyl)-4'-di(p-toluyl) sulfoniodiphenylsulfide tetrakis(pentafluorophenyl)borate.

Examples of the iron-arene complex include:
xylene-cyclopentadienyliron (II) hexafluoroantimonate,
cumene-cyclopentadienyliron (II) hexafluorophosphate, and
xylene-cyclopentadienyliron (II) tris(trifluoromethylsulfonyl)metanide.

The cation polymerization initiator is preferably the aromatic sulfonium salt since the salt has an ultraviolet absorption property even in the wavelength range of 300 nm or more to be excellent in curing performance and be capable of giving an adhesive layer good in mechanical strength and adhesive strength.

The cation polymerization initiator may be obtained as a commercially available product. Examples thereof include products "Kayarad" series (manufactured by Nippon Kayaku Co., Ltd.), "Cyracure UVI" series (manufactured by the Dow Chemical Co.), Optical Acid Generator "CPI" series (manufactured by San-Apro Ltd.), Optical Acid Generator "TAZ", "BBI" and "DTS" (manufactured by Midori Kagaku Co, Ltd.), "Adeka Optomer" series (manufactured by Adeka Corp.), and "RHODORSIL" (manufactured by Rhodia), these designations being each a trade name.

The amount of the cation polymerization initiator is usually from 0.5 to 20 parts by mass, preferably from 1 to 15 parts by mass for 100 parts by mass of the active-energy-ray-curable adhesive. If the amount is less than 0.5 part by mass, the adhesive layer may be insufficiently cured to be lowered in mechanical strength and adhesive strength. If the amount is more than 20 parts by mass, the initiator is too large in quantity so that the amount of ionic substances increases in the adhesive layer. Thus, the adhesive layer may be heightened in hygroscopicity to be lowered in endurance after bonding is attained through this layer.

The electron-beam-curable type active-energy-ray-curable adhesive contains no photopolymerization initiator. The ultraviolet-curable type active-energy-ray-curable adhesive preferably contains an optical radical generator. Examples of the optical radical generator include any hydrogen-withdrawing type optical radical generator, and any cleavage type optical radical generator.

Examples of the hydrogen-withdrawing type optical radical generator include naphthalene derivatives, such as 1-methylnaphthalene, 2-methylnaphthalene, 1-fluoronaphthalene, 1-chloronaphthalene, 2-chloronaphthalene, 1-bromonaphthalene, 2-bromonaphthalene, 1-iodonaphthalene, 2-iodonaphthalene, 1-naphthol, 2-naphthol, 1-methoxynaphthalene, 2-methoxynaphthalene, and 1,4-dicyanonaphthalene; anthracene, and anthracene derivatives, such as 1,2-benzanthracene, 9,10-dichloroanthracene, 9,10-dibromoanthracene, 9,10-diphenylanthracene, 9-cyanoanthracene, 9,10-dicyanoanthracene, and 2,6,9,10-tetracyanoanthracene; pyrene derivatives; carbazole, and carbazole derivatives, such as 9-methylcarbazole, 9-phenylcarbazole, 9-prope-2-ynyl-9H-carbazole, 9-propyl-9H-carbazole, 9-vinylcarbazole, 9H-carbazole-9-ethanol, 9-methyl-3-nitro-9H-carbazole, 9-methyl-3,6-dinitro-9H-carbazole, 9-octanoylcarbazole, 9-carbazolemethanol, 9-carbazolepropionic acid, 9-carbazolepropionitrile, 9-ethyl-3,6-dinitro-9H-carbazole, 9-ethyl-3-nitrocarbazole, 9-ethylcarbazole, 9-isopropylcarbazole, 9-(ethoxycarbonylmethyl)carbazole, 9-(morpholinomethyl)carbazole, 9-acetylcarbazole, 9-allylcarbazole, 9-benzyl-9H-carbazole, 9-carbazoleacetic acid, 9-(2-nitrophenyl)carbazole, 9-(4-methoxyphenyl)carbazole, 9-(1-ethoxy-2-methyl-propyl)-9H-carbazole, 3-nitrocarbazole, 4-hydroxycarbazole, 3,6-dinitro-9H-carbazole, 3,6-diphenyl-9H-carbazole, 2-hydroxycarbazole, and 3,6-diacetyl-9-ethylcarbazole; benzophenone, and benzophenone derivatives, such as 4-phenylbenzophenone, 4,4'-bis(dimethoxy)benzophenone, 4,4'-bis(dimethylamino)benzophenone, 4,4'-bis(diethylamino)benzophenone, methyl 2-benzoylbenzoate, 2-methylbenzophenone, 3-methylbenzophenone, 4-methylbenzophenone, 3,3'-dimethyl-4-methoxybenzophenone, and 2,4,6-trimethyl-benzophenone; aromatic carbonyl compounds; [4-(4-methylphenylthio)phenyl]-phenylmethanone; xanthone; thioxanthone, and thioxanthone derivatives, such as 2-chlorothioxanthone, 4-chlorothioxanthone, 2-isopropylthioxanthone, 4-isopropylthioxanthone, 2,4-dimethylthioxanthone, 2,4-diethylthioxanthone, 1-chloro-4-propoxythioxanthone; and coumarin derivatives.

The cleavage type optical radical generator is an optical radical generator of a type that receives one or more radiated active energy rays to be cleaved, thereby generating radicals. Examples thereof include benzoin ether derivatives, acetophenone derivatives and other arylalkyl ketones, oxime ketones, acylphosphine oxides, S-phenyl thiobenzoates, titanocenes, and respective derivatives obtained by polymerizing these compounds. Examples of a commercially available product of the cleavage type optical radical generator include 1-(4-dodecylbenzoyl)-1-hydroxy-1-methylethane, 1-(4-isopropylbenzoyl)-1-hydroxy-1-methylethane, 1-benzoyl-1-hydroxy-1-methylethane, 1-[4-(2-hydroxyethoxy)-benzoyl]-1-hydroxy-1-methylethane, 1-[4-(acryloyloxyethoxy)-benzoyl]-1-hydroxy-1-methylethane, diphenyl ketone, phenyl-1-hydroxy-cyclohexyl ketone, benzyl dimethyl ketal, bis(cyclopentadienyl)-bis(2,6-difluoro-3-pyrryl-phenyl)titanium, ($\eta$6-isopropylbenzene)-($\eta$5-cyclopentadienyl)-iron (II) hexafluorophosphate, trimethylbenzoyldiphenylphosphine oxide, bis(2,6-dimethoxy-benzoyl)-(2,4,4-trimethyl-pentyl)-phosphine oxide, bis(2,4,6-trimethylbenzoyl)-2,4-dipenthoxyphenylphosphine oxide, bis(2,4,6-trimethylbenzoyl)phenyl-phosphine oxide, (4-morpholinobenzoyl)-1-benzyl-1-dimethylaminopropane, and 4-(methylthiobenzoyl)-1-methyl-1-morpholinoethane. About the optical radical generator, different species thereof may be used together.

The cleavage type optical radical generator is more preferred from the viewpoint of the stability of the optical radical generator itself, and the curing performance thereof. Out of species of the cleavage type optical radical generator, acylphosphine oxides are preferred. More preferred examples thereof include trimethylbenzoyldiphenylphosphine oxide ("DAROCURE TPO" ((trade name) manufactured by Ciba Japan K.K.), bis(2,6-dimethoxy-benzoyl)-(2,4,4-trimethyl-pentyl)-phosphine oxide ("CGI 403" ((trade name) manufactured by Ciba Japan K.K.), and bis(2,4,6-trimethylbenzoyl)-2,4-dipentoxyphenylphosphine oxide ("Irgacure 819" ((trade name) manufactured by Ciba Japan K.K.).

The active-energy-ray-curable adhesive may contain a sensitizer. When the adhesive contains the sensitizer, the adhesive is improved in reactivity so that the adhesive layer may be further improved in mechanical strength and adhesive strength. Examples of this sensitizer are identical with the examples of the above-mentioned sensitizer.

The amount of the sensitizer is preferably from 0.1 to 20 parts by mass for 100 parts by mass of the whole of the active-energy-ray-curable adhesive.

Various additives are blendable into the active-energy-ray-curable adhesive as far as the advantageous effects thereof are not damaged. Examples of the blendable additives include an ion trapping agent, an antioxidant, a chain transfer agent, a tackifier, a thermoplastic resin, a filler, a fluidity adjustor, a plasticizer, and an antifoaming agent.

The active-energy-ray-curable adhesive is applicable onto a film by any one of the same coating methods as described above. At this time, the viscosity of the active-energy-ray-curable adhesive may be any viscosity as far as the viscosity makes it possible to attain a method selected from the various methods. The viscosity at a temperature of 25° C. is preferably from 10 to 30,000 mPa·sec, more preferably from 50 to 6,000 mPa·sec. If the viscosity is too small, an even and homogeneous adhesive-applied film tends not to be easily obtained. If the viscosity is too large, the adhesive does not flow easily so that in the same manner an even and homogeneous adhesive-applied film tends not to be easily obtained. The viscosity referred to herein is a value obtained by adjusting the temperature of the adhesive to 25° C. and then measuring the adhesive at 60 rpm, using a B type viscometer.

In the present invention, the active energy ray(s) is/are defined as one or more energy rays capable of decomposing a compound capable of generating an active species to generate the active species. Examples of the active energy ray(s) include visible rays, ultraviolet rays, infrared rays, an X ray, an $\alpha$ ray, a $\beta$ ray, a $\gamma$ ray, and an electron beam.

About the active-energy-ray-curable adhesive of an electron beam curable type, it is sufficient for conditions for radiating an electron beam to be conditions making it possible to cure the active-energy-ray-curable adhesive. About the electron beam radiation, the accelerating voltage therefor is preferably from 5 to 300 kV, more preferably from 10 to 250 kV. If the accelerating voltage is less than 5 kV, the electron beam does not reach the adhesive so that the adhesive may not be sufficiently cured. If the accelerating voltage is more than 300 kV, the beam penetrates too intensely through an optical laminated body including the adhesive so that the electron beam may rebound. Thus, its transparent protective film or polarizer may be damaged. The absorbed radiation dose is usually from 5 to 100 kGy, preferably from 10 to 75 kGy. If the absorbed radiation dose is less than 5 kGy, the adhesive is insufficiently cured. If the absorbed radiation dose is more than 100 kGy, the transparent protective film or polarizer may be damaged so that the laminated body is lowered in mechanical strength or yellowed. As a result, the laminated body may not obtain a desired optical property.

The electron beam radiation is usually performed in an inert gas. The radiation may be performed in the atmosphere, or in an inert gas into which a small volume of oxygen is introduced, as required. By an appropriate introduction of oxygen, an oxygen obstruction dares to be generated in the outer surface of the transparent protective film (of the laminated body), onto which the electron beams initially hit. As a result, the transparent protective film can be prevented from being damaged, this situation being varied in the material of the transparent protective film, so that the electron beam can be radiated only to the adhesive efficiently.

In the ultraviolet-curable type active-energy-ray-curable adhesive, the light radiation intensity is not particularly limited, and thus the intensity depends on the composition of the adhesive. The intensity is preferably from 10 to 5000 mW/cm$^2$. If the light radiation intensity to the adhesive is less than 10 mW/cm$^2$, the reaction period becomes too long. If the intensity is more than 5000 mW/cm$^2$, the constituent material(s) of the adhesive may be yellowed or the layer thereof may be deteriorated by heat radiated from the light source and heat generated when the composition is polymerized. The radiation intensity is the intensity of rays preferably of wavelengths effective for activating the cation photopolymerization initiator, more preferably of wavelengths of 400 nm or less, even more preferably of wavelengths of 280 to 320 nm. It is preferred to radiate light one or more times to set the cumulative light quantity thereof to 10 mJ/cm$^2$ or more, preferably into the range of 10 to 5,000 mJ/cm$^2$. If the cumulative light quantity to the adhesive is less than 10 mJ/cm$^2$, active species originating from the polymerization initiator are not sufficiently generated so that the adhesive is not sufficiently cured. By contrast, if the cumulative light quantity is more than 5,000 mJ/cm$^2$, the radiation period becomes very long to be unfavorable for an improvement in the productivity of laminated bodies of the invention. At this time, it is varied in accordance with the used film or a combination of the species of the adhesive and others what wavelength range is required (for example, the UVA (320 to 390 nm) or UVB (280 to 320 nm) range) for the cumulative light quantity.

The light source for radiating the active energy ray(s) is not particularly limited. Examples thereof include a low-pressure mercury lamp, a middle-pressure mercury lamp, a high-pressure mercury lamp, a super-high-pressure mercury lamp, a xenon lamp, a halogen lamp, a carbon arc light, a tungsten lamp, a gallium lamp, an excimer laser, an LED source emitting light having a wavelength range from 380 to 440 nm, a chemical lamp, a black light lamp, a microwave excited mercury lamp, and a metal halide lamp. The light source is preferably an ultraviolet ray source having a light emission distribution of wavelengths of 400 nm or less since the energy thereof is stable and a device therefor is simple.

[Sticker]

The sticker may be a pressure sensitive sticker.

The sticker can be obtained by radical-polymerizing an acrylic monomer mixture in the presence of a polymerization initiator, this mixture containing a (meth)acrylate as a main component, and a (meth)acrylic monomer having a functional group. The sticker is preferably an acrylic sticker containing an acrylic resin having a glass transition temperature Tg of 0° C. or lower, and a crosslinking agent.

The (meth)acrylate is preferably an alkyl acrylate, more preferably n-butyl acrylate, 2-methoxyethyl acrylate or ethoxymethyl acrylate.

The (meth)acrylic monomer having a functional group is a compound having a (meth)acryloyl group, which is an olefinic double bond, and further having a polar functional group such as a hydroxyl, carboxyl, amide, amino, or epoxy group. Particularly preferred is an acrylic monomer in which its olefinic double bond is an acryloyl group. The monomer having a hydroxyl group is preferably 2-hydroxyethyl acrylate, and the monomer having a carboxyl group is preferably acrylic acid.

The acrylic monomer mixture may further contain a monomer different from the (meth)acrylate and the (meth)acrylic monomer having a functional group (hereinafter the different monomer may be referred to as the "third monomer"). Examples of the third monomer include any monomer having an olefinic double bond and at least one aromatic ring, any styrene monomer, any (meth)acrylate having an alicyclic structure, any vinyl monomer, and any monomer having (meth)acryloyl groups.

The monomer having an olefinic double bond and at least one aromatic ring is preferred, and is preferably 2-phenoxyethyl(meth)acrylate, 2-(2-phenoxyethoxyl)ethyl(meth)acrylate, a (meth)acrylate of ethylene-oxide-modified nonyl phenol, or 2-(o-phenylphenoxy)ethyl(meth)acrylate, more preferably 2-phenoxyethyl acrylate.

About the third monomer, different species thereof may be used together. The amount of structural units originating from the third monomer is usually from 0 to 20% by mass, preferably from 0 to 10% by mass of the whole of the acrylic resin.

About the acrylic resin, the weight-average molecular weight Mw thereof is preferably from 1,000,000 to 2,000,000, the molecular weight Mw being a molecular weight in terms of that of a standard polystyrene according to gel permeation chromatography (GPC). When the weight-average molecular weight Mw is 1,000,000 or more, the sticker is improved in adhesiveness at high temperature and high humidity to produce favorably a tendency that the possibility is decreased that a space or a peel is generated between the adhesive layer and the member adjacent thereto, such as the adherend, and a tendency that the adhesive layer is improved in re-workability. When the weight-average molecular weight Mw of the acrylic resin is 2,000,000 or less, the adhesive layer follows, even when the layer concerned is changed in dimension, the dimension change to be varied to produce favorably a tendency that the display concerned is restrained from undergoing light leakage or color unevenness. Furthermore, the ratio of the weight-average molecular weight Mw to the number-average molecular weight Mn, the ratio Mw/Mn representing the molecular weight distribution, is preferably from 3 to 7.

The acrylic resin may be made of a resin having a relatively high molecular weight as described above, or made of a mixture of such a resin and an acrylic resin different from the resin.

The acrylic resin can be produced by a known method that may be of various types, such as solution polymerization, emulsion polymerization, bulk polymerization, or suspension polymerization. In the production of the acrylic resin, a polymerization initiator is usually used. Examples of the polymerization initiator include azo compounds, organic peroxides, inorganic peroxides, and redox initiators in each of which a peroxide and a reducing agent are used together. Specific examples thereof include 2,2'-azobisisobutyronitrile, benzoyl peroxide, and ammonium persulfate. The use amount of the polymerization initiator is usually from 0.001 to 5 parts by mass for 100 parts by mass of the whole of one or more monomers as the raw material of the acrylic resin.

The crosslinking agent is a compound having at least two functional groups capable of undergoing a crosslinking reaction with structural units each originating from the monomer having a polar functional group in the acrylic resin, and is, for example, an isocyanate compound, an epoxy compound, a metal chelate compound or an aziridine compound.

The crosslinking agent is preferably an isocyanate compound. Examples thereof include any compound having at least two isocyanato groups (—NCO); any adduct product obtained by causing the compound to react with a polyol; and any dimer or trimer of the compound. Specific examples thereof include tolylene diisocyanate, any adduct product obtained by causing tolylene diisocyanate to react with a polyol, a dimer of tolylene diisocyanate, a trimer of tolylene diisocyanate, hexamethylene diisocyanate, any adduct product obtained by causing hexamethylene diisocyanate to react with a polyol, a dimer of hexamethylene diisocyanate, and a trimer of hexamethylene diisocyanate.

The amount of the crosslinking agent is usually from 0.01 to 5 parts by mass, preferably from 0.1 to 5 parts by mass, more preferably from 0.2 to 3 parts by mass for 100 parts by mass of the acrylic resin. When the amount of the crosslinking agent is adjusted to 0.01 part or more by mass, preferably 0.1 part or more by mass for 100 parts by mass of the acrylic resin, the adhesive layer tends to be improved in endurance.

The sticker may contain a different component. Examples of the different component include fine conductive particles such as fine metal particles, fine metal oxide particles, and fine particles coated with, for example, a metal; an ionic conductive composition; an ionic compound having an organic cation or anion; a silane coupling agent; a crosslinking catalyst; a weather-resistant stabilizer; a tackifier; a plasticizer; a softener; a dye; a pigment; an inorganic filler; any resin other than the acrylic resin; and light-diffusing fine particles such as organic beads. It is useful to blend an ultraviolet curable compound into the sticker to form an adhesive layer, and then radiate ultraviolet rays thereto to cure the compound, thereby making the adhesive layer harder.

Individual components constituting the sticker are dissolved into an appropriate solvent such as ethyl acetate to yield a sticker composition, and the sticker composition is applied onto a substrate and dried to form an adhesive layer. When one or more insoluble components are present in the whole of the components, it is sufficient for the insoluble component (s) to be in the state of being dispersed in the system.

The thickness of the adhesive layer made of the sticker is preferably from 5 to 50 µm, more preferably from 5 to 30 µm. When the thickness of the adhesive layer is set to 30 µm or less, the layer is improved in adhesiveness at high temperature and high humidity to produce a tendency that the possibility is decreased that a space or a peel is generated between the adhesive layer and the adherend, and a tendency that the adhesive layer is improved in re-workability. When the thickness is set to 5 µm or more, the adhesive layer can follow, even when the adherend is changed in dimension, the dimension change to be varied.

<Method for Forming Adhesive Layer>

Examples of the method for forming the adhesive layer (detailed above) include a method of using a peelable film as a substrate, applying an adhesive or sticker onto the substrate or a layer laid over the substrate to form the adhesive layer, and transferring the resultant adhesive layer (hereinafter referred to as the "transfer adhesive layer") onto a surface of an adherend; and a method of applying an adhesive or sticker directly onto a surface of an adherend to form the adhesive layer. It is allowable to form an adhesive layer onto a peelable film or a layer laid over a peelable film, and bond another peelable film onto the adhesive layer to make a double-surface-separable sheet. As required, one of the peelable films is peeled from the double-surface-separable sheet, and then the sheet is bonded onto an adherend. Examples of a commercially available product of the double-surface-separable sheet include non-carrier sticker films and non-carrier sticker sheets sold from Lintec Corp., and Nitto Denko Corp.

The peelable films are each, for example, a film obtained by preparing a film as a substrate, applying a releasing treatment, such as silicone treatment, onto a surface of this substrate onto which an adhesive layer is to be joined, this film being made of a resin that may be of various types, such as polyethylene terephthalate, polybutylene terephthalate, polycarbonate, polyarylate, polypropylene or polyethylene. The peelable films are also called separate films or separators.

<Method for Producing Retardation Layer>

The retardation layer (detailed above) can be produced in a continuous production method (roll-to-roll manner).

A method for producing the retardation layer includes the steps of:

preparing a first roll in which a substrate is rolled up on a first roll core;

unrolling out the substrate continuously from the first roll;

applying an oriented-film-forming composition containing a solvent continuously onto the substrate to form a first applied film;

drying the applied oriented-film-forming composition to remove the solvent, thereby forming a first dry applied film on the substrate;

subjecting the first dry applied film to orientation treatment to form an oriented film, thereby yielding a laminated body continuously;

applying a retardation-layer-forming composition containing a polymerizable liquid crystal onto the oriented film to form a second applied film continuously on the oriented film;

drying the second applied film under a condition that the polymerizable liquid crystal contained therein is not polymerized, thereby forming a second dry applied film on the oriented film;

polymerizing the polymerizable liquid crystal while the polymerizable liquid crystal contained in the second dry applied film is kept in a liquid crystal state, thereby forming a retardation layer continuously; and rolling up the continuously yielded retardation-layer-attached substrate onto a second roll core to yield a second roll.

The first roll, in which a substrate is rolled up on a roll core, is commercially available.

The method for unrolling the substrate from the first roll is performed by setting an appropriate rotating means to the roll core of the first roll, and rotating the first roll through the rotating means. The method may be a method of setting an appropriate assistant roll to a position along the direction in which the substrate is carried from the first roll, and unrolling the substrate through a rotating means for the assistant roll. The method may be a method of setting a rotating means to each of the first roll core and such an assistant roll, thereby unrolling the substrate while an appropriate tension is applied to the substrate.

When the substrate unrolled from the first roll is passed through an applicator, an oriented-film-forming composition is applied onto a surface of the substrate through the applicator. In order to apply the oriented-film-forming composition continuously in this way, a coating method, such as a gravure coating or die coating method, or a printing method, such as flexography, is performed through the applicator, as described above.

The substrate passed through the applicator is carried to a drying furnace, and heated in this drying furnace to form a first dry applied film continuously on the substrate. The drying furnace is, for example, a hot-wind type drying furnace. The set temperature of the drying furnace is decided in accordance with the kind of the solvent contained in the oriented-film-forming composition applied through the applicator, and other factors. The drying furnace may be a furnace of a type in which the inside thereof is divided into plural zones and the divided zones have different set temperatures, or a drying furnace unit of a type in which plural drying furnaces are arranged in series and the furnaces have different set temperatures.

About the first dry applied film formed continuously (on the substrate) by the passage through the drying furnace, the first dry applied film side surface of the substrate is subsequently subjected to an orientation treatment, using a rubbing device, polarized UV radiating device, or nano-imprinting device, so that the first dry applied film is rendered an oriented film. At this time, the substrate-carrying direction and the orientation direction of the formed oriented film are not made parallel or orthogonal to each other. The angle between these two is decided at will in accordance with the kind of the retardation layer to be formed. In the case of using only a λ/4 layer as a wavelength plate (in the laminated body of the present invention), the orientation treatment is conducted to set the angle substantially to 45°. In the case of combining a λ/2 layer with a λ/4 layer to form a broad band λ/4 layer, the respective angles of the former and the latter (to the substrate-carrying direction) are set substantially to 15° and 75°. When the liquid crystal is vertically oriented, it is not necessarily essential to use any oriented film nor any orientation treatment.

The substrate on which the oriented film is continuously formed is subsequently passed through a second applicator to apply a retardation-layer-forming composition onto the oriented film, and is then passed through a drying furnace. By the passage through the drying furnace, a polymerizable liquid crystal contained in the retardation-layer-forming composition turns into a liquid crystal state so that a second dry applied film is formed. The drying furnace fulfils a function of drying the retardation-layer-forming composition to remove a solvent therein and a function of giving thermal energy to the composition to make the polymerizable liquid crystal contained in the second dry applied film into a liquid crystal state. In order to conduct multistage heating treatment under different heating conditions, the drying furnace may be a furnace of a type in which the inside thereof is divided into plural zones and the divided zones have different set temperatures, or a drying furnace unit of a type in which plural drying furnaces are arranged in series and the furnaces have different set temperatures.

About the substrate passed through the drying furnace, the solvent contained in the retardation-layer-forming composition is sufficiently removed, and the substrate is then carried into a light radiating device while the polymerizable liquid crystal in the second dry applied film keeps the liquid crystal state thereof. By radiating light to this workpiece from the light radiating device, the polymerizable liquid crystal is photopolymerized while keeping the liquid crystal state. In this way, a retardation layer is continuously formed on the oriented film.

The thus continuously formed retardation layer is rolled up, on a second roll core, in the form of a laminated body containing the transparent substrate and the oriented film. In this way, a second roll is obtained. When the second roll is obtained by rolling up the formed retardation layer, an appropriate spacer may be used to co-roll the laminated body and the spacer.

In this way, the substrate is passed through the first roll, the first applicator, the first drying furnace, the orientation treatment device, the second applicator, the second drying furnace, and the light radiating device in this order, whereby a retardation layer is continuously formed on the oriented film on the substrate.

The retardation layer may be produced as follows: the substrate is passed through the first roll, the first applicator, the first drying furnace, and the orientation treatment device in this order, thereby rolling up the continuously formed laminated body on a roll core to produce the laminated body in a roll form; and the laminated body is unrolled from the roll, and the unrolled laminated body is passed through the second applicator, the second drying furnace, and the light radiating device in this order.

The retardation layer yielded by this method is in a long film form. The λ/2 layer, the λ/4 layer and/or the positive C layer, which constitute(s) the retardation layer, may be further continuously bonded to a polarization layer while the long film form is kept. In this case, a long retardation-layer-attached polarizing plate roll can be produced.

The retardation layer may be used in the state that the oriented film and the substrate are peeled therefrom, or may be used as it is to keep the form that the substrate, the oriented film and the retardation layer are laminated on each other.

When the laminated body of the present invention is produced by any continuous production method, it is allowable to unroll its roll-form retardation layer, or polarization layer, and bond the two layers to each other in the state that either one or each of the two is cut into a predetermined size. It is also allowable to prepare each of the retardation layer and the polarization layer in a long roll state, and produce a long-film form laminated body continuously.

<Method of the Invention for Producing Laminated Body>

The production method of the present invention is a method for producing a laminated body including a polarization layer, a λ/2 layer, a λ/4 layer, a positive C layer, and a transfer adhesive layer; and this laminated body is a laminated body including the polarization layer, the λ/2 layer and the λ/4 layer in this member-described order, including the positive C layer between the polarization layer and the λ/4 layer, or at the side of the λ/4 layer that is opposite to the λ/2-layer-arranged side of the λ/4 layer, and including the transfer adhesive layer between the polarization layer, and the λ/4 layer or positive C layer. This production method also includes the step of bonding a bonding body including a substrate and the transfer adhesive layer to an adherend through the transfer adhesive layer, and peeling the substrate from the resultant.

The bonding body includes one or more selected from the group consisting of the polarization layer, the λ/2 layer, the λ/4 layer and the positive C layer; the substrate; and the transfer adhesive layer.

The adherend includes one or more selected from the group consisting of the polarization layer, the λ/2 layer, the λ/4 layer, and the positive C layer.

The substrate is equivalent to the aforementioned substrate. The transfer adhesive layer is equivalent to the aforementioned transfer adhesive layer.

The laminated body of the present invention is a laminated body including the transfer adhesive layer between the polarization layer and the λ/4 layer or positive C layer. It is sufficient for the laminated body to include at least one transfer adhesive layer.

In the laminated body of the present invention, its adhesive regions to be bonded through a member other than the transfer adhesive layer may be another transfer adhesive layer, or may be an adhesive layer formed by another method, for example, a method of applying an adhesive or sticker directly onto a predetermined surface of the adherend to form the adhesive layer; or the adhesive regions may be bonded to each other by direct application (or painting).

FIG. 1 is a schematic view illustrating a first laminated body yielded by a first production method of the present invention. The first production method of the invention is a method for producing a laminated body including a polarization layer 1, a transfer adhesive layer 5, a positive C layer 2, a λ/2 layer 3, and a λ/4 layer 4 in this member-described order;

the above-defined bonding body being:

a ready-prepared laminated body including the transfer adhesive layer, the positive C layer, and the substrate in this member-described order, a ready-prepared laminated body including the transfer adhesive layer, the positive C layer, the λ/2 layer, and the substrate in this member-described order, or a ready-prepared laminated body including the transfer adhesive layer, the positive C layer, the λ/2 layer, the λ/4 layer, and the substrate in this member-described order;

the above-defined adherend being an adherend including the polarization layer; and the method including the step of bonding the transfer adhesive layer side outer surface of the bonding body to the polarization layer side outer surface of the adherend through the transfer adhesive layer, and peeling the substrate from the resultant.

In the first laminated body of the invention, the positive C layer and the λ/2 layer may be bonded to each other through the transfer adhesive layer, or may be bonded to each other by a different method, for example, a method of applying an adhesive or sticker directly onto a predetermined surface of the adherend to form an adhesive layer.

The λ/2 layer may be formed by applying a λ/2-layer-forming composition onto the positive C layer, drying the resultant, orienting a polymerizable liquid crystal therein, and polymerizing the liquid crystal. The positive C layer may be formed by applying a positive-C-layer-forming composition onto the λ/2 layer, drying the resultant, orienting a polymerizable liquid crystal therein, and polymerizing the liquid crystal.

In the first laminated body of the invention, the λ/2 layer and the λ/4 layer may be bonded to each other through the transfer adhesive layer, or may be bonded to each other by a different method, for example, a method of applying an adhesive or sticker directly onto a predetermined surface of the adherend to form an adhesive layer.

The λ/4 layer may be formed by applying a λ/4-layer-forming composition onto the λ/2 layer, drying the resultant, orienting a polymerizable liquid crystal therein, and polymerizing the liquid crystal. The λ/2 layer may be formed by applying a λ/2-layer-forming composition onto the λ/4 layer, drying the resultant, orienting a polymerizable liquid crystal therein, and polymerizing the liquid crystal.

Figure 2:
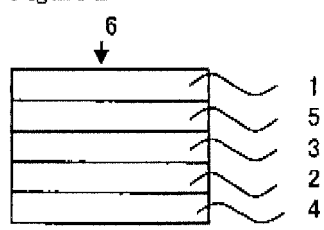
FIG. 2 is a schematic view illustrating a second laminated body yielded by a second production method of the invention.

FIG. 2 is a schematic view illustrating a second laminated body yielded by a second production method of the present invention. The second production method of the invention is a method for producing a laminated body including a polarization layer 1, a transfer adhesive layer 5, a λ/2 layer 3, a positive C layer 2, and a λ/4 layer 4 in this member-described order;

the above-defined bonding body being:

a ready-prepared laminated body including the transfer adhesive layer, the λ/2 layer, and a substrate in this member-described order, a ready-prepared laminated body including the transfer adhesive layer, the λ/2 layer, the positive C layer, and a substrate in this member-described order, or a ready-prepared laminated body including the transfer adhesive layer, the λ/2 layer, the positive C layer, the λ/4 layer, and a substrate in this member-described order;

the above-defined adherend being an adherend including the polarization layer; and the method including the step of bonding the transfer adhesive layer side outer surface of the bonding body to the polarization layer side outer surface of the adherend through the transfer adhesive layer, and peeling the substrate from the resultant.

In the second laminated body of the invention, the λ/2 layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the λ/2 layer, drying the resultant, orienting a polymerizable liquid crystal therein, and polymerizing the liquid crystal. The λ/2 layer may be formed by applying a λ/2-layer-forming composition onto the positive C layer, drying the resultant, orienting a polymerizable liquid crystal therein, and polymerizing the liquid crystal.

In the second laminated body of the invention, the positive C layer and the λ/4 layer may be bonded to each other through the transfer adhesive layer, or may be bonded to each other by a different method, for example, a method of applying an adhesive or sticker directly onto a predetermined surface of the adherend to form an adhesive layer.

The λ/4 layer may be formed by applying a λ/4-layer-forming composition onto the positive C layer, drying the resultant, orienting a polymerizable liquid crystal therein, and polymerizing the liquid crystal. The positive C layer may be formed by applying a positive-C-layer-forming composition onto the λ/4 layer, drying the resultant, orienting a polymerizable liquid crystal therein, and polymerizing the liquid crystal.

Figure 3:
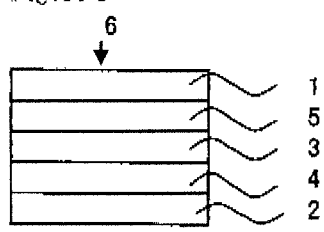
FIG. 3 is a schematic view illustrating a third laminated body yielded by a third production method of the invention.

FIG. 3 is a schematic view illustrating a third laminated body yielded by a third production method of the present invention. The third production method of the invention is a method for producing the laminated body including a polarization layer 1, a transfer adhesive layer 5, a λ/2 layer 3, a λ/4 layer 4, and a positive C layer 2 in this member-described order;

the above-defined bonding body being:

a ready-prepared laminated body including the transfer adhesive layer, the λ/2 layer, and a substrate in this member-described order, a ready-prepared laminated body including the transfer adhesive layer, the λ/2 layer, the λ/4 layer, and a substrate in this member-described order, or a ready-prepared laminated body including the transfer adhesive layer, the λ/2 layer, the λ/4 layer, the positive C layer, and a substrate in this member-described order;

the above-defined adherend being an adherend including the polarization layer; and the method including the step of bonding the transfer adhesive layer side outer surface of the bonding body to the polarization layer side outer surface of the adherend through the transfer adhesive layer, and peeling the substrate from the resultant.

In the third laminated body of the invention, the λ/2 layer and the λ/4 layer may be bonded to each other through the transfer adhesive layer, or may be bonded to each other by a different method, for example, a method of applying an adhesive or sticker directly onto a predetermined surface of the adherend to form an adhesive layer.

The λ/4 layer may be formed by applying a λ/4-layer-forming composition onto the λ/2 layer, drying the resultant, orienting a polymerizable liquid crystal therein, and polymerizing the liquid crystal. The λ/2 layer may be formed by applying a λ/2-layer-forming composition onto the λ/4 layer, drying the resultant, orienting a polymerizable liquid crystal therein, and polymerizing the liquid crystal.

In the third laminated body of the invention, the λ/4 layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the λ/4 layer, drying the resultant, orienting a polymerizable liquid crystal therein, and polymerizing the liquid crystal. The λ/4 layer may be formed by applying a λ/4-layer-forming composition onto the positive C layer, drying the resultant, orienting a polymerizable liquid crystal therein, and polymerizing the liquid crystal.

Figure 4:
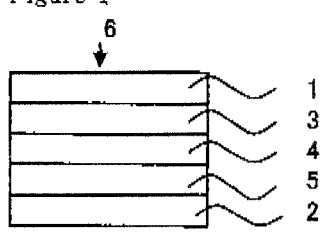
FIG. 4 is a schematic view illustrating a fourth laminated body yielded by a fourth production method of the invention.

FIG. 4 is a schematic view illustrating a fourth laminated body yielded by a fourth production method of the present invention. The fourth production method of the invention is a method for producing a laminated body including a polarization layer 1, a λ/2 layer 3, a λ/4 layer 4, a transfer adhesive layer 5, and a positive C layer 2 in this member-described order;

the above-defined bonding body being a ready-prepared laminated body including the transfer adhesive layer, the positive C layer, and a substrate in this member-described order;

the above-defined adherend being:

an adherend including the λ/4 layer, a ready-prepared laminated body including the λ/4 layer, and the λ/2 layer in this member-described order, or a ready-prepared laminated body including the λ/4 layer, the λ/2 layer and the polarization layer in this member-described order; and the method including the step of bonding the transfer adhesive layer side outer surface of the bonding body to the λ/4 layer side outer surface of the adherend through the transfer adhesive layer, and peeling the substrate from the resultant.

In the fourth laminated body of the invention, the polarization layer and the λ/2 layer may be bonded to each other through the transfer adhesive layer, or may be bonded to each other by a different method, for example, a method of applying an adhesive or sticker directly onto a predetermined surface of the adherend to form an adhesive layer.

The λ/2 layer may be formed by applying a λ/2-layer-forming composition onto the polarization layer, drying the resultant, orienting a polymerizable liquid crystal therein, and polymerizing the liquid crystal. The polarization layer may be formed by applying a polarization-layer-forming composition onto the λ/2 layer, drying the resultant, orienting a polymerizable liquid crystal therein, and polymerizing the liquid crystal.

In the fourth laminated body of the invention, the λ/2 layer and the λ/4 layer may be bonded to each other through the transfer adhesive layer, or may be bonded to each other by a different method, for example, a method of applying an adhesive or sticker directly onto a predetermined surface of the adherend to form an adhesive layer.

The λ/4 layer may be formed by applying a λ/4-layer-forming composition onto the λ/2 layer, drying the resultant, orienting a polymerizable liquid crystal therein, and polymerizing the liquid crystal. The λ/2 layer may be formed by applying a λ/2-layer-forming composition onto the λ/4 layer, drying the resultant, orienting a polymerizable liquid crystal therein, and polymerizing the liquid crystal.

Figure 5:
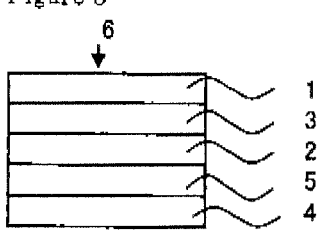
FIG. 5 is a schematic view illustrating a fifth laminated body yielded by a fifth production method of the invention.

FIG. 5 is a schematic view illustrating a fifth laminated body yielded by a fifth production method of the present invention. The fifth production method of the invention is a method for producing a laminated body including a polarization layer 1, a λ/2 layer 3, a positive C layer 2, a transfer adhesive layer 5, and a λ/4 layer 4 in this member-described order;

the above-defined bonding body being a ready-prepared laminated body including the transfer adhesive layer, the λ/4 layer, and a substrate in this member-described order;

the above-defined adherend being:

an adherend including the positive C layer, a ready-prepared laminated body including the positive C layer and the λ/2 layer in this member-described order, or a ready-prepared laminated body including the positive C layer, the λ/2 layer, and the polarization layer in this member-described order; and the method including the step of bonding the transfer adhesive layer side outer surface of the bonding body to the positive C layer side outer surface of the adherend through the transfer adhesive layer, and peeling the substrate from the resultant.

In the fifth laminated body of the invention, the polarization layer and the λ/2 layer may be bonded to each other through the transfer adhesive layer, or may be bonded to each other by a different method, for example, a method of applying an adhesive or sticker directly onto a predetermined surface of the adherend to form an adhesive layer.

The λ/2 layer may be formed by applying a λ/2-layer-forming composition onto the polarization layer, drying the resultant, orienting a polymerizable liquid crystal therein, and polymerizing the liquid crystal. The polarization layer may be formed by applying a polarization-layer-forming composition onto the λ/2 layer, drying the resultant, orienting a polymerizable liquid crystal therein, and polymerizing the liquid crystal.

In the fifth laminated body of the invention, the λ/2 layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the λ/2 layer, drying the resultant, orienting a polymerizable liquid crystal therein, and polymerizing the liquid crystal. The λ/2 layer may be formed by applying a λ/2-layer-forming composition onto the positive C layer, drying the resultant, orienting a polymerizable liquid crystal therein, and polymerizing the liquid crystal.

Figure 6:
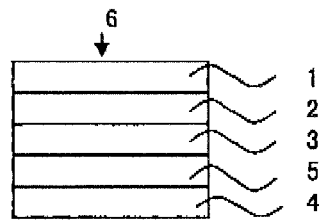
FIG. 6 is a schematic view illustrating a sixth laminated body yielded by a sixth production method of the invention.

FIG. 6 is a schematic view illustrating a sixth laminated body yielded by a sixth production method of the present invention. The sixth production method of the invention is a method for producing a laminated body including a polarization layer 1, a positive C layer 2, a λ/2 layer 3, a transfer adhesive layer 5, and a λ/4 layer 4 in this member-described order;

the above-defined bonding body being a ready-prepared laminated body including the transfer adhesive layer, the λ/4 layer, and a substrate in this member-described order;

the above-defined adherend being:

an adherend including the λ/2 layer, a ready-prepared laminated body including the λ/2 layer and the positive C layer in this member-described order, or a ready-prepared laminated body including the λ/2 layer, the positive C layer, and the polarization layer in this member-described order; and the method including the step of bonding the transfer adhesive layer side outer surface of the bonding body to the λ/2 layer side outer surface of the adherend through the transfer adhesive layer, and peeling the substrate from the resultant.

In the sixth laminated body of the invention, the polarization layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the polarization layer, drying the resultant, orienting a polymerizable liquid crystal therein, and polymerizing the liquid crystal. The polarization layer may be formed by applying a polarization-layer-forming composition onto the positive C layer, drying the resultant, orienting a polymerizable liquid crystal therein, and polymerizing the liquid crystal.

In the sixth laminated body of the invention, the positive C layer and the λ/2 layer may be bonded to each other through the transfer adhesive layer, or may be bonded to each other by a different method, for example, a method of applying an adhesive or sticker directly onto a predetermined surface of the adherend to form an adhesive layer.

The λ/2 layer may be formed by applying a λ/2-layer-forming composition onto the positive C layer, drying the resultant, orienting a polymerizable liquid crystal therein, and polymerizing the liquid crystal. The positive C layer may be formed by applying a positive-C-layer-forming composition onto the λ/2 layer, drying the resultant, orienting a polymerizable liquid crystal therein, and polymerizing the liquid crystal.

Figure 7:
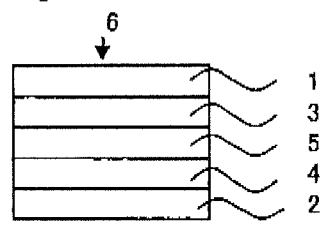
FIG. 7 is a schematic view illustrating a seventh laminated body yielded by a seventh production method of the invention.

FIG. 7 is a schematic view illustrating a seventh laminated body yielded by a seventh production method of the present invention. The seventh production method of the invention is a method for producing a laminated body including a polarization layer 1, a λ/2 layer 3, a transfer adhesive layer 5, a λ/4 layer 4, and a positive C layer 2 in this member-described order;

the above-defined bonding body being:

a bonding body including the transfer adhesive layer, the λ/4 layer, and a substrate, or a bonding body including the transfer adhesive layer, the λ/4 layer, the positive C layer, and a substrate in this member-described order;

the above-defined adherend being:

an adherend including the λ/2 layer, or a ready-prepared laminated body including the λ/2 layer and the polarization layer in this member-described order; and the method including the step of bonding the transfer adhesive layer side outer surface of the bonding body to the λ/2 layer side outer surface of the adherend through the transfer adhesive layer, and peeling the substrate from the resultant.

In the seventh laminated body of the invention, the polarization layer and the λ/2 layer may be bonded to each other through the transfer adhesive layer, or may be bonded to each other by a different method, for example, a method of applying an adhesive or sticker directly onto a predetermined surface of the adherend to form an adhesive layer.

The λ/2 layer may be formed by applying a λ/2-layer-forming composition onto the polarization layer, drying the resultant, orienting a polymerizable liquid crystal therein, and polymerizing the liquid crystal. The polarization layer may be formed by applying a polarizing-layer-forming composition onto the λ/2 layer, drying the resultant, orienting a polymerizable liquid crystal therein, and polymerizing the liquid crystal.

In the seventh laminated body of the invention, the λ/4 layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the λ/4 layer, drying the resultant, orienting a polymerizable liquid crystal therein, and polymerizing the liquid crystal. The λ/4 layer may be formed by applying a λ/4-layer-forming composition onto the positive C layer, drying the resultant, orienting a polymerizable liquid crystal therein, and polymerizing the liquid crystal.

Figure 8:
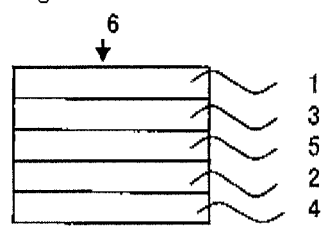
FIG. 8 is a schematic view illustrating an eighth laminated body yielded by an eighth production method of the invention.

FIG. 8 is a schematic view illustrating an eighth laminated body yielded by an eighth production method of the present invention. The eighth production method of the invention is a method for producing a laminated body including a polarization layer 1, a λ/2 layer 3, a transfer adhesive layer 5, a positive C layer 2, and a λ/4 layer 4 in this member-described order;

the above-defined bonding body being:

a bonding body including the transfer adhesive layer, the positive C layer, and a substrate, or a bonding body including the transfer adhesive layer, the positive C layer, the λ/4 layer, and a substrate in this member-described order;

the above-defined adherend being:

an adherend including the λ/2 layer, or a ready-prepared laminated body including the λ/2 layer and the polarization layer in this member-described order; and the method including the step of bonding the transfer adhesive layer side outer surface of the bonding body to the $\lambda/2$ layer side outer surface of the adherend through the transfer adhesive layer, and peeling the substrate from the resultant.

In the eighth laminated body of the invention, the polarization layer and the $\lambda/2$ layer may be bonded to each other through the transfer adhesive layer, or may be bonded to each other by a different method, for example, a method of applying an adhesive or sticker directly onto a predetermined surface of the adherend to form an adhesive layer.

The $\lambda/2$ layer may be formed by applying a $\lambda/2$-layer-forming composition onto the polarization layer, drying the resultant, orienting a polymerizable liquid crystal therein, and polymerizing the liquid crystal. The polarization layer may be formed by applying a polarization-layer-forming composition onto the $\lambda/2$ layer, drying the resultant, orienting a polymerizable liquid crystal therein, and polymerizing the liquid crystal.

In the eighth laminated body of the invention, the positive C layer and the $\lambda/4$ layer may be bonded to each other through the transfer adhesive layer, or may be bonded to each other by a different method, for example, a method of applying an adhesive or sticker directly onto a predetermined surface of the adherend to form an adhesive layer.

The $\lambda/4$ layer may be formed by applying a $\lambda/4$-layer-forming composition onto the positive C layer, drying the resultant, orienting a polymerizable liquid crystal therein, and polymerizing the liquid crystal. The positive C layer may be formed by applying a positive-C-layer-forming composition onto the $\lambda/4$ layer, drying the resultant, orienting a polymerizable liquid crystal therein, and polymerizing the liquid crystal.

Figure 9:
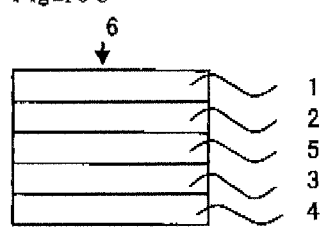
FIG. 9 is a schematic view illustrating a ninth laminated body yielded by a ninth production method of the invention.

FIG. 9 is a schematic view illustrating a ninth laminated body yielded by a ninth production method of the present invention. The ninth production method of the invention is a method for producing a laminated body including a polarization layer 1, a positive C layer 2, a transfer adhesive layer 5, a $\lambda/2$ layer 3, and a $\lambda/4$ layer 4 in this member-described order;

the above-defined bonding body being:
a bonding body including the transfer adhesive layer, the $\lambda/2$ layer, and a substrate, or
a bonding body including the transfer adhesive layer, the $\lambda/2$ layer, the $\lambda/4$ layer, and a substrate in this member-described order;

the above-defined adherend being:
an adherend including the positive C layer, or
a ready-prepared laminated body including the positive C layer and the polarization layer in this member-described order; and the method including the step of bonding the transfer adhesive layer side outer surface of the bonding body to the positive C layer side outer surface of the adherend through the transfer adhesive layer, and peeling the substrate from the resultant.

In the ninth laminated body of the invention, the polarization layer and the positive C layer may be bonded to each other through the transfer adhesive layer, or may be bonded to each other by a different method, for example, a method of applying an adhesive or sticker directly onto a predetermined surface of the adherend to form an adhesive layer.

The positive C layer may be formed by applying a positive-C-layer-forming composition onto the polarization layer, drying the resultant, orienting a polymerizable liquid crystal therein, and polymerizing the liquid crystal. The polarization layer may be formed by applying a polarization-layer-forming composition onto the positive C layer, drying the resultant, orienting a polymerizable liquid crystal therein, and polymerizing the liquid crystal.

In the ninth laminated body of the invention, the $\lambda/2$ layer and the $\lambda/4$ layer may be bonded to each other through the transfer adhesive layer, or may be bonded to each other by a different method, for example, a method of applying an adhesive or sticker directly onto a predetermined surface of the adherend to form an adhesive layer.

The $\lambda/4$ layer may be formed by applying a $\lambda/4$-layer-forming composition onto the $\lambda/2$ layer, drying the resultant, orienting a polymerizable liquid crystal therein, and polymerizing the liquid crystal. The $\lambda/2$ layer may be formed by applying a $\lambda/2$-layer-forming composition onto the $\lambda/4$ layer, drying the resultant, orienting a polymerizable liquid crystal therein, and polymerizing the liquid crystal.

<Circularly Polarizing Plate>

The laminated body obtained by the production method of the present invention is usable as a circularly polarizing plate. The resultant circularly polarizing plate can be caused to express an antireflective function by bonding an EL display device to this plate through a sticker. At this time, the laminated body is usable in the state of being cut from the roll form into an arbitrary size in accordance with a target size of the EL display device.

<Use of Circularly Polarizing Plate>

The circularly polarizing plate obtained by the production method of the present invention is usable for various display devices. The display devices are each a device having a display element, and may contain, as a light emitting source, a light emitting element or a light emitting unit. Examples of the display devices include liquid crystal display devices, organic electroluminescence (EL) display devices, inorganic EL display devices, electron emission display devices (such as field emission display devices (FEDs) and surface field emission display devices (SEDs)), display devices using an electronic paper (electronic ink) or an electrophoresis element, plasma display devices, projection type display devices (such as grating light valve (GLV) display devices, and display devices having a digital micro-mirror device (DMD)), and piezoelectric ceramic displays. The liquid crystal display devices include transmissive liquid crystal display devices, transflective liquid crystal display devices, reflective liquid crystal display devices, direct viewing type liquid crystal display devices, and projection type liquid crystal display devices. These display devices may be display devices for displaying two-dimensional images, or three-dimensional display devices for displaying three-dimensional images.

<EL Display Deice>

Figure 10:
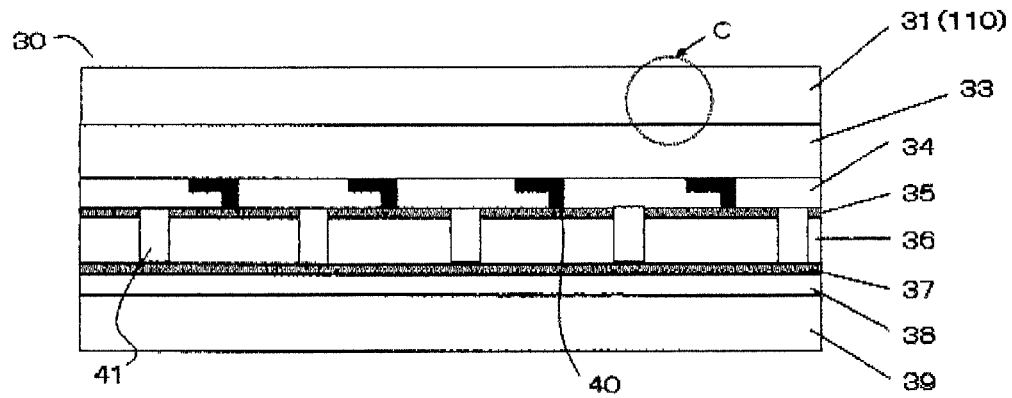
FIG. 10 is a schematic view illustrating an organic EL display device including a circularly polarizing plate yielded by the production method of the invention.
Figure 11:
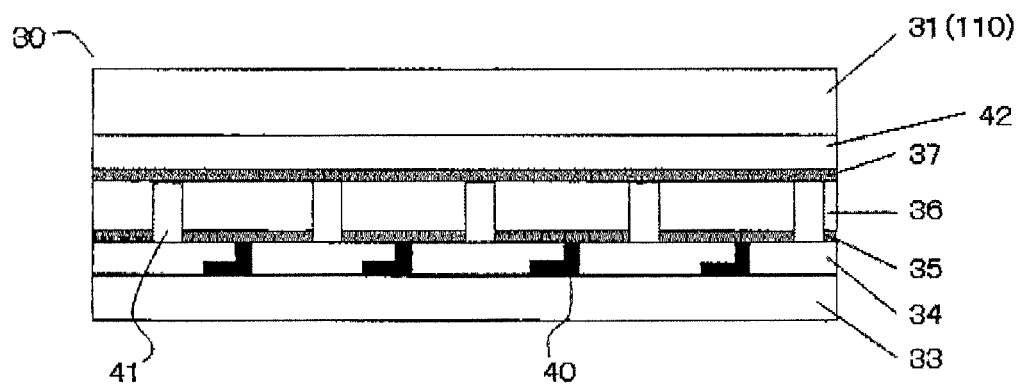
FIG. 11 is a schematic view illustrating an organic EL display device including a circularly polarizing plate yielded by the production method of the invention.
Figure 12:
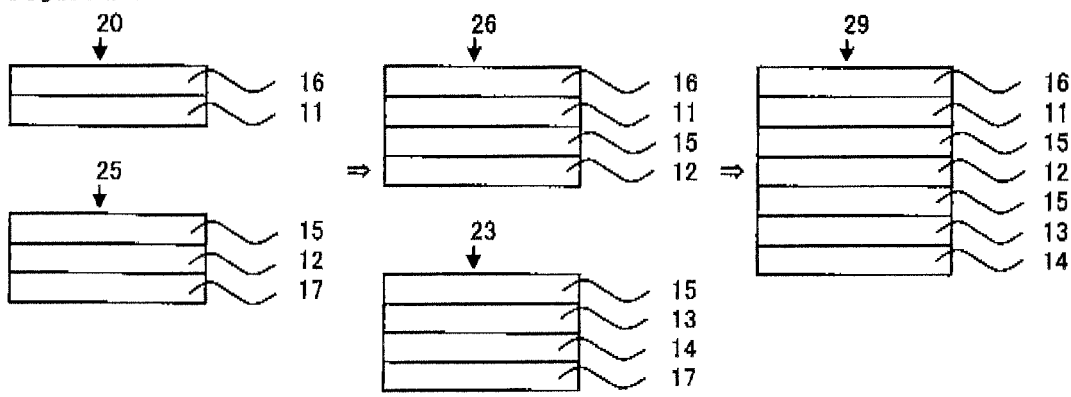
FIG. 12 is a schematic view illustrating Example 1 of the invention.
Figure 13:
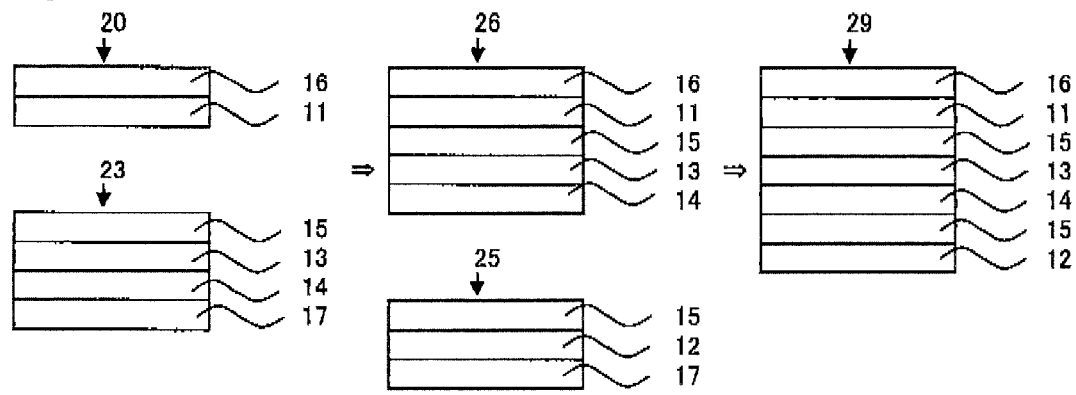
FIG. 13 is a schematic view illustrating Example 2 of the invention.
Figure 14:
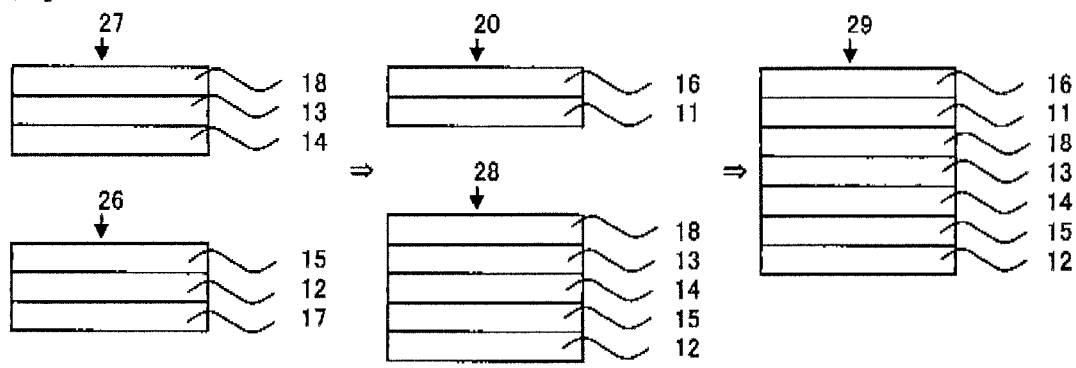
FIG. 14 is a schematic view illustrating Example 3 of the invention.
Figure 15:
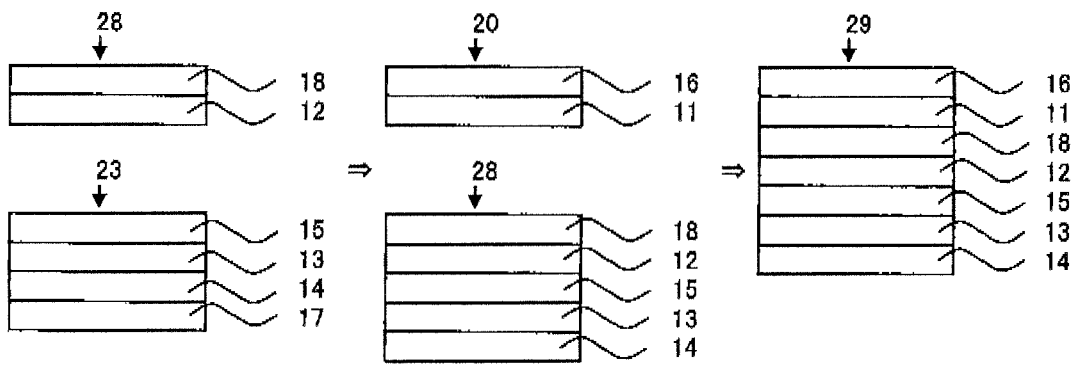
FIG. 15 is a schematic view illustrating Example 4 of the invention.
Figure 16:
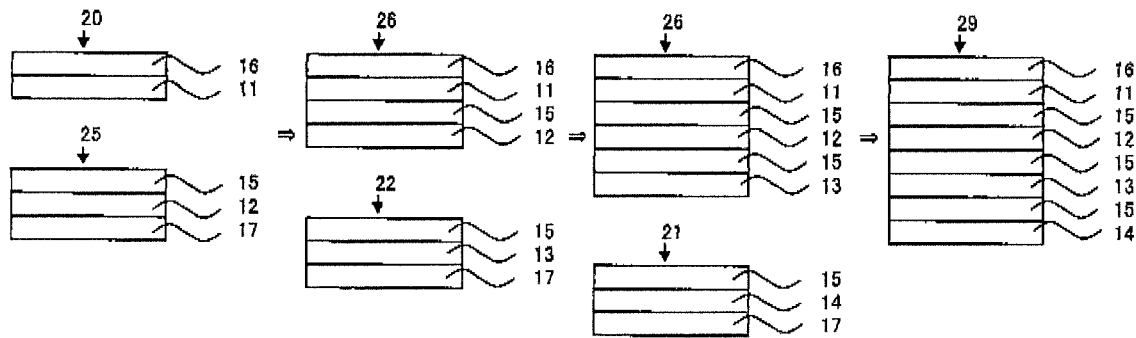
FIG. 16 is a schematic view illustrating Example 5 of the invention.
Figure 17:
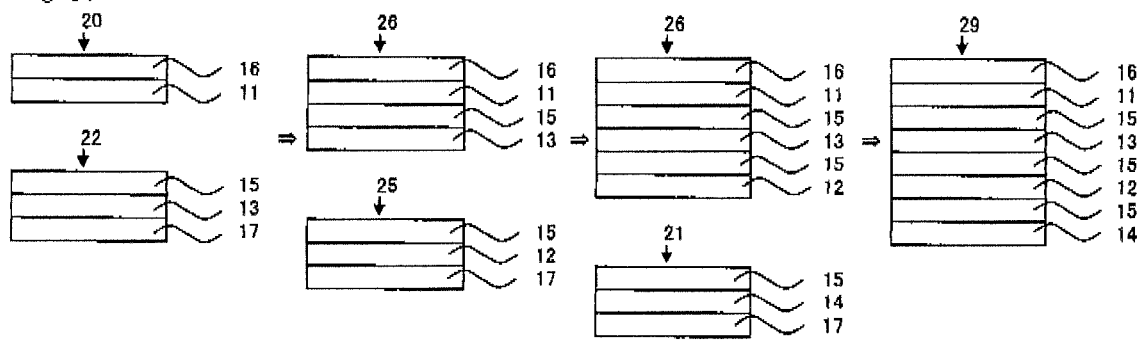
FIG. 17 is a schematic view illustrating Example 6 of the invention.
Figure 18:
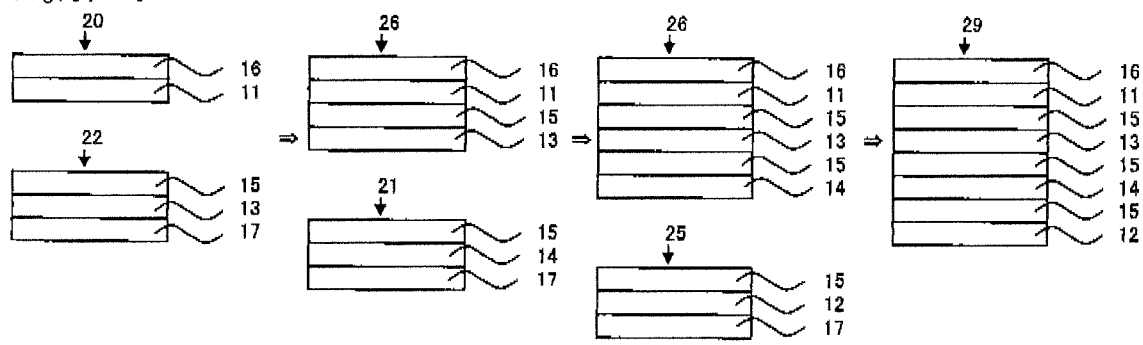
FIG. 18 is a schematic view illustrating Example 7 of the invention.

With reference to FIGS. 10 and 11, a description is made about an EL display device 30 having a circularly polarizing plate 110. The EL display device 30 is a device in which an organic functional layer 36 that is a light emission source and a cathode 37 are laminated over a substrate 33 on which pixel electrodes 35 are formed. A circularly polarizing plate 31 is arranged on the substrate 33 to be located at the side of the substrate 33 that is opposite to the organic-functional-layer-36 side of the substrate 33. As this circularly polarizing plate 31, the circularly polarizing plate 110 is used. By applying a plus voltage to any one of the pixel electrodes 35, applying a minus voltage to the cathode 37, and applying a direct current to the pixel electrode 35 and the cathode 37 across these electrodes, the organic functional layer 36 emits light. The organic functional layer 36, as the light emission source, is composed of, for example, an electron transporting layer, a light emission layer and a hole transporting layer.

Light emitted from the organic functional layer 36 passes through the pixel electrode 35, an interlayer dielectric film 34, the substrate 33, and the circularly polarizing plate 31 (the circularly polarizing plate 110). This organic EL display device, which has the organic functional layer 36, will be described below. The description is applicable to an inorganic EL display device having an inorganic functional layer.

In order to produce an EL display device as the display device 30, thin film transistors 40 are formed into a desired form on a substrate 33. An interlayer dielectric film 34 is formed thereon. Next, a film for pixel electrodes 35 is formed by sputtering, and the film is patterned into the pixel electrodes 35. Thereafter, an organic functional layer 36 is laminated thereon.

Next, a circularly polarizing plate 31 (circularly polarizing plate 110) is laid onto the substrate 33 to be located at the side of the substrate 33 that is opposite to the thin-film-transistor-40 formed side of the substrate 33.

In recent years, cases of adopting a touch panel in a mobile electronic terminal such as a smartphone have been increasing. When the EL display device is combined with a touch panel to produce a display device, an antireflective property may be given thereto in the same manner as described above by mounting the circularly polarizing plate 110 on the touch panel side of this display device.

The following will describe the members other than the retardation layer 31 (circularly polarizing plate 110) of the EL display device 30.

The substrate 33 may be, for example, a glass substrate, such as a sapphire glass substrate, a quartz glass substrate or a soda glass substrate; a ceramic substrate such as an alumina substrate; a metallic substrate such as a copper substrate; or a plastic substrate.

A thermoconductive film may be formed on the substrate 33, which is not illustrated. The thermoconductive film is, for example, a diamond thin film such as a diamond-like carbon thin film. When the pixel electrodes 35 are made into a reflective type, light is radiated out in the direction opposite to the substrate-33-side. Accordingly, the substrate may be made of a light-impermeable material such as stainless steel, as well as a transparent material. The substrate may be made of a single member, or may be a laminated substrate in which plural sub-substrates are bonded to each other through an adhesive. The substrate is not limited into a plate form, and thus the substrate may be in a film form.

The thin film transistors 40 are, for example, polycrystal silicon transistors. The thin film transistors 40 are each arranged on an edge region of one of the pixel electrodes 35. The transistors 40 each have a length or width of 10 to 30 µm. The pixel electrodes 35 each have a size of 20 µm×20 µm to 300 µm×300 µm.

On the substrate 33, an interconnection electrode is laid for the thin film transistors 40. The interconnection electrode is low in resistance, and is electrically connected to the pixel electrodes 35 to have a function of controlling the resistance value thereof into a low value. The interconnection electrode generally contains one or more selected from Al; Al and any transition metal (other than Ti); and Ti or titanium nitride (TiN).

Between the thin film transistors 40 and the pixel electrodes 35, the interlayer dielectric film 34 is laid. The interlayer dielectric film 34 may be any film as far as the film has insulating property, examples of the film including a film formed by sputtering or vacuum-evaporating (i.e., vapor-depositing) an inorganic material, such as a silicon oxide such as $SiO_2$, or silicon nitride; a silicon oxide layer formed using SOG (spin-on-glass); a photoresist; and an applied film made of a resin material such as polyimide or acrylic resin.

Ribs 41 are formed on the interlayer dielectric film 34. The ribs 41 are arranged on regions around the pixel electrodes 35 (i.e., between any adjacent ones of the pixels). Examples of the material of the ribs 41 include acrylic resin and polyimide resin. The thickness of the ribs 41 is preferably from 1.0 to 3.5 µm both inclusive, more preferably from 1.5 to 2.5 µm both inclusive.

The following will describe an EL element composed of any one of the pixel electrodes 35 which are transparent electrodes, the organic functional layer 36 which is a light emission source, and the cathode 37. The organic functional layer 36 has one or more hole transporting layers, and one or more light emission layers, and has, for example, an electron injecting/transporting layer, a light emission layer, a hole transporting layer, and a hole injecting layer in turn.

Examples of the constituent material of the pixel electrode 35 include ITO (indium tin oxide), IZO (indium zinc oxide), IGZO, ZnO, $SnO_2$, and $In_2O_3$. ITO and IZO are particularly preferred. It is sufficient for the thickness of the pixel electrode 35 to be equal to or more than a thickness for attaining hole injection satisfactorily. The thickness is preferably from 10 to 500 nm.

The pixel electrode 35 can be formed by a vacuum evaporation method (preferably, sputtering). Examples of a gas for the sputtering include inert gases such as Ar, He, Ne, Kr and Xe; and any mixed gas of two or more thereof.

Examples of the constituent material of the cathode 37 include K, Li, Na, Mg, La, Ce, Ca, Sr, Ba, Al, Ag, In, Sn, Zn, Zr, and other metal elements. In order to improve the cathode in operation stability, it is preferred to use an alloy system composed of two or three selected from the described examples of the metal element. The alloy system is preferably Ag/Mg (Ag: 1 to 20% by atom), Al/Li (Li: 0.3 to 14% by atom), In/Mg (Mg: 50 to 80% by atom), or Al/Ca (Ca: 5 to 20% by atom).

The cathode 37 is formed by vacuum evaporation, sputtering or some other method. The thickness of the cathode 37 is preferably 0.1 nm or more, more preferably from 1 to 500 nm.

The hole injecting layer has a function of making the injection of holes from the pixel electrode 35 easy. The hole transporting layer has a function of transporting holes and a function of blocking electrons. The former and latter layers are also called the charge injecting layer and the charge transporting layer, respectively.

The thickness of the light emission layer, the total thickness of the hole injecting layer and the hole transporting layer, and the thickness of the electron injecting/transporting layer are each varied in accordance with the formation method thereof, and are each preferably from 5 to 100 nm. The hole injecting layer and the hole transporting layer contain an organic compound that may be of various types. The method for forming the hole injecting/transporting layer, the light emission layer, and the electron injecting/transporting layer is preferably a vacuum evaporation method since the method makes it possible to form a homogeneous thin film.

Examples of the organic functional layer 36, which is a light emission source, include a layer using light (fluorescence) emitted from a singlet exciton; a layer using light (phosphorescence) emitted from a triplet exciton; a layer using light (fluorescence) emitted from a singlet exciton and light (phosphorescence) emitted from a triplet exciton; a layer made of an organic substance; a layer composed of an organic substance and an inorganic substance; a layer containing a high molecular weight material; a layer containing a low molecular weight material; and a layer containing a high molecular weight material and a low molecular weight material. However, the organic functional layer 36 is not limited to these layers. Thus, the organic functional layer 36 selected from various organic functional layers known for an EL element is usable for the EL display device 30.

A desiccant 38 is arranged in a space between the cathode 37 and a sealing lid 39 since the organic functional layer 36 is weak against humidity. The desiccant 38 absorbs water to prevent the organic functional layer 36 from being deteriorated by water.

FIG. 11 is a schematic view illustrating a sectional structure of another embodiment of the EL display device 30. This EL display device 30 has a sealing structure in which a sealing thin film 42 is used. Radiated-out light can be obtained also from an opposite surface of its array substrate.

The sealing thin film 42 is preferably a diamond-like carbon (DLC) film, in which DLC is vacuum-evaporated on a film of an electrolytic capacitor. The DLC film has a property of very low water permeability to be high in moisture-proof performance. The sealing thin film 42 may be formed by direct vacuum-evaporation of a DLC film or the like onto the outer surface of the cathode 37. The sealing thin film 42 may be formed by laminating a resin thin film and a metal thin film into a multilayered form.

EXAMPLES

Hereinafter, the present invention will be described in more detail by way of working examples thereof. In the examples, the symbol "%" and the word "part(s)" denote "% by mass" and "part(s) by mass", respectively, unless otherwise specified.

Example 1

Preparation of an Optically-Oriented-Film-Forming Composition

The following components were mixed with each other, and the resultant mixture was stirred at 80° C. for 1 hour to yield an optically-oriented-film-forming composition (1):

Optically orienting material (5 parts):

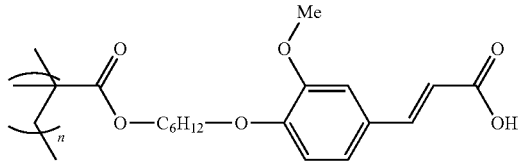

and

Solvent (95 parts): cyclopentanone.

[Preparation of an Orienting Polymer Composition]

To a commercially available orienting polymer, Sunever SE-610 (manufactured by Nissan Chemical Industries, Ltd.), was added 2-butoxyethanol to yield an orienting polymer composition (1). About the content by percentage of each of the components in the total amount of the prepared composition, the solid content by percentage in the orienting polymer composition was set to 1.0%; and the solvent content by percentage, to 99.0%. About the product SE-610, the solid content by percentage therein was converted from the concentration described in a delivered specification thereof.

[Preparation of Retardation-Layer-Forming Compositions]

The composition of each of retardation-layer-forming compositions is shown in Table 1. Individual components of the composition were mixed with each other, and the resultant solution was stirred at 80° C. for 1 hour. The solution was then cooled to room temperature to yield the retardation-layer-forming composition.

TABLE 1

| Composition | Polymerizable liquid crystal | Polymerization initiator | Levelling agent | Additive | Solvent |
|---|---|---|---|---|---|
| (1) | LC242 (20.3%) | Irg907 (0.5%) | BYK-361N (0.1%) | — | PGMEA (79.1%) |
| (2) | LC242 (19.2%) | Irg907 (0.5%) | BYK-361N (0.1%) | LR9000 (1.1%) | PGMEA (79.1%) |

In Table 1, a value in each parenthesis represents the content by percentage of the corresponding component in the total amount of the prepared composition.

LR 9000: Laromer (registered trademark) LR-9000 (manufactured by BASF Japan Ltd.), Irg 907: Irgacure (registered trademark) 907 (manufactured by BASF Japan Ltd.), BYK-361N: a product (manufactured by BYK-Chemie Japan K.K.), LC242: a polymerizable liquid crystal represented by a formula illustrated below (manufactured by BASF), and PGMEA: propylene glycol 1-monomethyl ether 2-acetate.

LC242

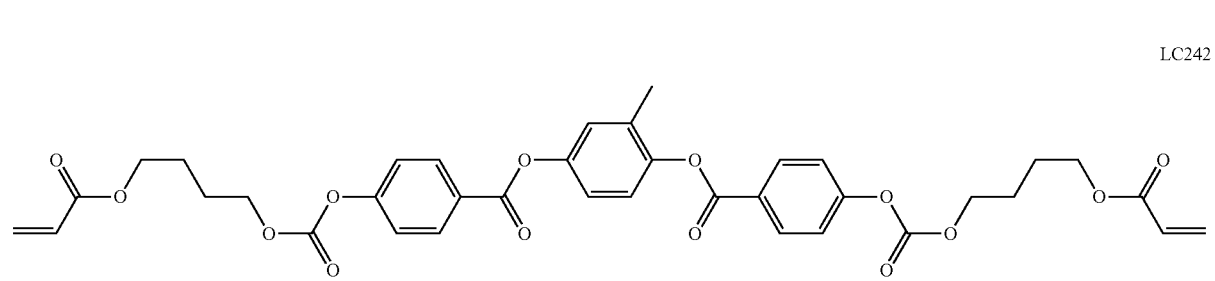

[Production of Each λ/2 Layer (1) and Each λ/4 Layer (1)]

A corona treatment device (AGF-B10, manufactured by Kasuga Electric Works Ltd.) was used to subject a surface of each undrawn substrate (cycloolefin polymer film: ZF-14 manufactured by Zeon Corp.; thickness: 23 μm) to corona treatment one time at a power of 0.3 kW and a treatment speed of 3 m/minute. A bar coater was used to apply the optically-oriented-film-forming-composition (1) onto the corona-treated surface, and the workpiece was dried at 80° C. for 1 minute. A polarized UV radiating device (SPOT CURE SP-7, manufactured by Ushio Inc.) was used to radiate polarized UVs to the workpiece to give a cumulative light quantity of 100 mJ/cm². A laser microscope (LEXT, manufactured by Olympus Corp.) was used to measure the film thickness of the resultant oriented film. The thickness was 100 nm.

Subsequently, a bar coater was used to apply the retardation-layer-forming composition (1) onto the resultant individual oriented films, and the workpieces were dried at 120° C. for 1 minute. A high-pressure mercury lamp (UNICURE VB-15201BY-A, manufactured by Ushio Inc.) was then used to radiate ultraviolet rays (wavelength: 365 nm; cumulative light quantity at the wavelength of 365 nm: 1000 mJ/cm²) to the workpieces in the atmosphere of nitrogen to form retardation layers. In this case, by varying the thickness of wire bars used at the time of the application of the retardation-layer-forming composition with the bar coater, the thickness of the resultant applied films was adjusted to be varied. In this way, the retardation value of the resultant retardation layers was controlled.

A measurement was made at a wavelength of 550 nm about the retardation value of the retardation layers obtained by setting the dried film thickness of the retardation layers to 1 μm. As a result, λ/4 layers (1) were each produced in which $R_e(550)=138$ nm, and $R_{th}(550)=68$ nm.

A measurement was made at a wavelength of 550 nm about the retardation value of the retardation layers obtained by setting the dried film thickness of the retardation layers to 2 μm. As a result, λ/2 layers (1) were each produced in which $R_e(550)=270$ nm, and $R_{th}(550)=138$ nm.

[Production of Each Broad Band λ/4 Layer (1)]

The outer surface of the λ/4 layer (1) was subjected to corona treatment and orientation treatment in the same manner as described above, and further the retardation-layer-forming composition (1) was used to form a retardation layer thereon. At this time, the formation of the retardation layer was attained to set the dried film thickness of the retardation layer to 2 μm, thereby causing this layer to function as a λ/2 layer. The direction of polarized UVs radiated to the workpiece was set to 60° to the optical axis (slow axis) of the λ/4 layer, so that the respective optical axes of the λ/4 layer and the λ/2 layer were caused to cross each other. The retardation value of the thus obtained layer was measured at respective wavelengths of 450 nm, 550 nm and 650 nm. The results were as follows: $R_e(550)=140$ nm, $R_e(450)=113$ nm, and $R_e(650)=160$ nm. These measured values were used to calculate the above-mentioned definition expressions (12), (13) and (14). As a result, it was verified that each broad band λ/4 layer (1) was successfully produced.

$$\Delta n(450)/\Delta n(550)=R_e(450)/R_e(550)=0.81$$

$$\Delta n(650)/\Delta n(550)=R_e(650)/R_e(550)=1.14$$

[Production of Each Broad Band λ/4 Layer (2)]

In the same way as described above, the outer surface of the λ/2 layer (1) was subjected to corona treatment and orientation treatment, and further the retardation-layer-forming composition (1) was used to form a retardation layer thereon. At this time, the formation of the retardation layer was attained to set the dried film thickness of the retardation layer to 1 μm, thereby causing the layer to function as a λ/4 layer. The retardation value of the resultant layer was measured at respective wavelengths of 450 nm, 550 nm and 650 nm. The results were as follows: $R_e(550)=138$ nm, $R_e(450)=112$ nm, and $R_e(650)=157$ nm. These measured values were used to calculate the above-mentioned definition expressions (12), (13) and (14). As a result, it was verified that each broad band λ/4 layer (2) was successfully produced.

[Production of Each λ/2 Layer (2) and Each λ/4 Layer (2)]

Each λ/2 layer (2) and each λ/4 layer (2) were produced in the same way as described in the item [Production of each λ/2 layer (1) and each λ/4 layer (1)] except that the retardation-layer-forming composition (2) was used.
[Production of Each Broad Band λ/4 Layer (3)]

Each broad band λ/4 layer (3) was produced in the same way as described in the item [Production of each broad band λ/4 layer (1)] except that the retardation-layer-forming composition (2) was used.
[Production of Each Broad Band λ/4 Layer (4)]

Each broad band λ/4 layer (4) was produced in the same way as described in the item [Production of each broad band λ/4 layer (2)] except that the retardation-layer-forming composition (2) was used.
[Production of Each Positive C Layer (1)]

The corona treatment device was used to subject a surface of each undrawn substrate (cycloolefin polymer film: ZF-14 manufactured by Zeon Corp.; thickness: 23 μm) to corona treatment one time at a power of 0.3 kW and a treatment speed of 3 m/minute. A bar coater was used to apply the orienting polymer composition (1) onto the corona-treated surface, and the workpiece was dried at 90° C. for 1 minute. A laser microscope (LEXT, manufactured by Olympus Corp.) was used to measure the film thickness of the resultant oriented film. The thickness was 34 nm.

Subsequently, a bar coater was used to apply the retardation-layer-forming composition (1) onto the oriented film, and the workpiece was dried at 90° C. for 1 minute. A high-pressure mercury lamp (UNICURE VB-15201BY-A, manufactured by Ushio Inc.) was then used to radiate ultraviolet rays (wavelength: 365 nm; cumulative light quantity at the wavelength of 365 nm: 1000 mJ/cm$^2$) to the workpiece in the atmosphere of nitrogen to form a retardation layer. A laser microscope was used to measure the film thickness of the resultant retardation layers. The film thickness was 450 nm. The retardation value of the resultant retardation layer (i.e., each of the resultant retardation layers) was measured at a wavelength of 550 nm. The results were as follows: $R_e(550)$=1 nm, and $R_{th}(550)$=−70 nm. In conclusion, it was verified that a relationship between three-dimensional refractive indexes of the resultant retardation layer was $n_x \cong n_y < n_z$ so that the resultant retardation layer had an optical property as a positive C layer.

The resultant positive C layer is called a positive C layer (1).
[Production of Each Positive C Layer (2)]

Each positive C layer (2) was produced in the same way as described in the item [Production of each positive C layer (1)] except that the retardation-layer-forming composition (2) was used.
[Production of Bonding Bodies]

The corona treatment device was used to subject the outer surface of each of the resultant λ/2 layers, λ/4 layers, broad band λ/4 layers, and positive C layers to corona treatment one time at a power of 0.3 kW and a treatment speed of 3 m/minute. An acrylic sticker (separator-film-attached non-carrier film, manufactured by Lintec Corp.) having a thickness of 5 μm was applied to the corona-treated surface to lay a transfer adhesive layer onto the surface. Bonding bodies 21 to 26 were then produced.

Each of the boding bodies 21: a bonding body including a substrate 17, a λ/4 layer 14 (λ/4 layer (1)), and a transfer adhesive layer 15 in this member-described order, Each of the bonding bodies 22: a bonding body including the substrate 17, a λ/2 layer 13 (λ/2 layer (1)), and the transfer adhesive layer 15 in this member-described order, Each of the bonding bodies 23: a bonding body including the substrate 17, the broad band λ/4 layer (1) [=the λ/4 layer 14 (λ/4 layer (1))+the λ/2 layer 13 (λ/2 layer (1))], and the transfer adhesive layer 15 in this member-described order, Each of the bonding bodies 24: a bonding body including the substrate 17, the broad band λ/4 layer (2) [=the λ/2 layer 13 (λ/2 layer (1))+the λ/4 layer 14 (λ/4 layer (1))], and the transfer adhesive layer 15 in this member-described order, Each of the bonding bodies 25: a bonding body including the substrate 17, a positive C layer 12 (positive C layer (1)), and transfer adhesive layer 15 in this member-described order, and Each of the bonding bodies 26: a bonding body including the substrate 17, a positive C layer 12 (positive C layer (2)), and the transfer adhesive layer 15 in this member-described order.
[Production of Each Polarization Layer]

Each film, 75 μm in thickness, of a polyvinyl alcohol having an average polymerization degree of about 2,400 and a saponification degree of 99.9% or more by mole was immersed in pure water of 30° C. temperature, and then immersed in an aqueous solution of iodine, potassium iodide and water (ratio by mass=0.02/2/100) at 30° C. to dye the film with iodine. Thereafter, the workpiece was immersed in an aqueous solution of potassium iodide, boric acid, and water (ratio by mass=12/5/100) at 56.5° C. to treat the workpiece with boric acid. Subsequently, the workpiece was washed with pure water of 8° C. temperature, and then dried at 65° C. to produce a polarization layer in which iodine was adsorbed and oriented in the polyvinyl alcohol (the layer thickness: 27 μm after the layer was drawn). The drawing was attained mainly through the iodine dyeing step and the boric acid treatment step. The total draw ratio thereof was 5.3. The resultant polarization layer was bonded to a saponified triacetylcellulose film (KC4UYTAC, manufactured by Konica Minolta, Inc.; thickness: 40 μm) as a transparent protective film through a water based adhesive, using a nip roll. While a tension of 430 N/m applied to the layer/film-bonded body was kept, the body was dried at 60° C. for 2 minutes to produce a polarizing plate having, on one of the surfaces thereof, the protective film. The water based adhesive was an adhesive prepared by adding, to 100 parts of water, 3 parts of a carboxyl-modified polyvinyl alcohol (Kuraray Poval KL318, manufactured by Kuraray Co., Ltd. and 1.5 parts of a water-soluble polyamide epoxy resin (aqueous solution of the resin having a solid concentration of 30%, Sumirez Resin 650, manufactured by Sumika Chemtex Co., Ltd.).

Example 1

One of the bonding bodies 25 was put onto a polarization layer 11 of one of adherends 20 (polarizing plates), each made of the transparent protective film 16 and the polarization layer 11, while its separator film was peeled. Thereafter, the substrate 17 was peeled from the bonding body 25, and then the positive C layer 12 was transferred onto the polarization layer 11. Furthermore, one of the bonding bodies 23 was put thereonto while its separator film was peeled. Thereafter, the substrate 17 was peeled from the bonding body 23, and the λ/4 layer 14 and the λ/2 layer 13 were transferred onto the positive C layer 12 to yield a laminated body. The thickness of this laminated body was 81 μm. Thus, a very thin stretch circularly polarizing plate was produced.

Example 2

One of the bonding bodies 23 was put onto the polarization layer 11 of one of adherends 20 (polarizing plates), each made of the transparent protective film 16 and the polarization layer 11, while its separator film was peeled. Thereafter, the substrate 17 was peeled from the bonding body 23, and then the λ/2 layer 13 and the λ/4 layer 14 were transferred onto the polarization layer 11. Furthermore, one of the bonding bodies 25 was put thereonto while its separator film was peeled. Thereafter, the substrate 17 was peeled from the bonding body 25, and the positive C layer 12 was transferred onto the λ/4 layer 14 to yield a laminated body. The thickness of this laminated body was 81 μm. Thus, a very thin stretch circularly polarizing plate was produced.

Example 3

One of the bonding bodies 26 was put onto the λ/4 layer 14 (λ/4 layer (2)) of one of adherends 27 (broad band λ/4 layers (4)) while its separator film was peeled. Thereafter, the substrate 17 was peeled from the bonding body 26, and then the positive C layer 12 was transferred onto the adherend 27. Furthermore, the substrate 18 of the adherend 27 was bonded to the polarization layer 11 of one of the polarizing plates through a water based adhesive to yield a laminated body. The thickness of this laminated body was 99 μm. Thus, a very thin stretch circularly polarizing plate was produced.

Example 4

One of the bonding bodies 23 was put onto the positive C layer 12 of one of adherends 28, each composed of the substrate 18 and positive C layer 12 (positive C layer (2)), while its separator film was peeled. Thereafter, the substrate 17 was peeled from the bonding body 23, and then the λ/2 layer 13 and the λ/4 layer 14 were transferred onto the positive C layer 12. Furthermore, the substrate 18 of the positive C layer 12 was bonded to the polarization layer 11 of one of the polarizing plates through a water based adhesive to yield a laminated body. The thickness of this laminated body was 99 μm. Thus, a very thin stretch circularly polarizing plate was produced.

Example 5

One of the bonding bodies 25 was put onto the polarization layer 11 of one of adherends 20 (polarizing plates), each made of the transparent protective film 16 and the polarization layer 11, while its separator film was peeled. Thereafter, the substrate 17 was peeled from the bonding body 25, and then the positive C layer 12 was transferred onto the polarization layer 11. Furthermore, one of the bonding bodies 22 was put thereonto while its separator film was peeled. Thereafter, the substrate 17 was peeled from the bonding body 22, and the λ/2 layer 13 was transferred onto the positive C layer 12. Furthermore, one of the bonding bodies 21 was put thereonto while its separator film was peeled. Thereafter, the substrate 17 was peeled from the bonding body 21, and the λ/4 layer 14 was transferred onto the λ/2 layer 13 to yield a laminated body. The thickness of this laminated body was 86 μm. Thus, a very thin stretch circularly polarizing plate was produced.

Example 6

One of the bonding bodies 22 was put onto the polarization layer 11 of one of adherends 20 (polarizing plates), each made of the transparent protective film 16 and the polarization layer 11, while its separator film was peeled. Thereafter, the substrate 17 was peeled from the bonding body 22, and then the λ/2 layer 13 was transferred onto the polarization layer 11. Furthermore, one of the bonding bodies 25 was put thereonto while its separator film was peeled. Thereafter, the substrate 17 was peeled from the bonding body 25, and the positive C layer 12 was transferred onto the λ/2 layer 13. Furthermore, one of the bonding bodies 21 was put thereonto while its separator film was peeled. Thereafter, the substrate 17 was peeled from the bonding body 21, and the λ/4 layer 14 was transferred onto the positive C layer 12 to yield a laminated body. The thickness of this laminated body was 86 μm. Thus, a very thin stretch circularly polarizing plate was produced.

Example 7

One of the bonding bodies 22 was put onto the polarization layer 11 of one of adherends 20 (polarizing plates), each made of the transparent protective film 16 and the polarization layer 11, while its separator film was peeled. Thereafter, the substrate 17 was peeled from the bonding body 22, and then the λ/2 layer 13 was transferred onto the polarization layer 11. Furthermore, one of the bonding bodies 21 was put thereonto while its separator film was peeled. Thereafter, the substrate 17 was peeled from the bonding body 21, and the λ/4 layer 14 was transferred onto the λ/2 layer 13. Furthermore, one of the bonding bodies 25 was put thereonto while its separator film was peeled. Thereafter, the substrate 17 was peeled from the bonding body 25, and the positive C layer 12 was transferred onto the λ/4 layer 14 to yield a laminated body. The thickness of this laminated body was 86 μm. Thus, a very thin stretch circularly polarizing plate was produced.

A sticker was used to bond the laminated body produced in each of Examples 1 to 7 to a mirror plane to locate its polarization layer at the viewing side of the resultant product, and then the antireflective property thereof was observed. It was then verified that even when the product was viewed from any direction, coloring was not observed so that a good antireflective property was obtained.

According to the present invention, at the time when an organic EL display device shows a back display, light leakage can be decreased in any oblique viewing field thereof, and further a thin optical laminated body can be produced.

EXPLANATION OF REFERENCE NUMERALS 1, 11 polarization layer
2, 12 positive C layer
3, 13 a λ/2 layer
4, 14 λ/4 layer
5, 15 transfer adhesive layer
6, 29 transparent protective film
17, 18 a substrate
20 an adherend (a polarizing plate)
21, 22, 23, 24, 25, 26 a bonding body
27, 28 an adherent
30 an organic EL display device
31, 110 a circularly polarizing plate
33 a substrate
34 an interlayer dielectric film
35 a pixel electrode
36 an organic functional layer
37 a cathode
38 a desiccant
39 a sealing lid

40 thin film transistors
41 ribs
42 a sealing thin film

What is claimed is:

1. A method for producing a laminated body comprising a polarization layer, a $\lambda/2$ layer, a $\lambda/4$ layer, a positive C layer, and a transfer adhesive layer;

the laminated body being a laminated body comprising the polarization layer, the $\lambda/2$ layer, the $\lambda/4$ layer, the transfer adhesive layer, and the positive C layer in this member-described order, the polarization layer, the adhesive layer and the $\lambda/2$ layer being laminated in contact with each other in this order, each of the $\lambda/2$ layer and the $\lambda/4$ layer comprising a polymerized and oriented liquid crystal, and the $\lambda/4$ layer having a thickness of 0.2 to 5 µm, the method comprising the step of bonding a bonding body comprising a substrate to an adherend by bonding the transfer adhesive layer side outer surface of the bonding body to the $\lambda/4$ layer side outer surface of the adherend through the transfer adhesive layer, and the step of peeling the substrate from the laminated body, the bonding body being a ready-prepared laminated body comprising the transfer adhesive layer, the positive C layer, and the substrate in this member-described order;

the adherend being:

an adherend comprising the $\lambda/4$ layer, a ready-prepared laminated body comprising the $\lambda/4$ layer and the $\lambda/2$ layer in this member-described order, or a ready-prepared laminated body comprising the $\lambda/4$ layer, the $\lambda/2$ layer and the polarization layer in this member-described order.

\* \* \* \* \*